US012625655B2

(12) United States Patent
Vehling et al.

(10) Patent No.: US 12,625,655 B2
(45) Date of Patent: May 12, 2026

(54) VIDEO TRANSPORT WITHIN A MOBILE DEVICE

(71) Applicant: HYPHY USA Inc., San Jose, CA (US)

(72) Inventors: Timothy J. Vehling, San Jose, CA (US); Eyal Friedman, Cheltenham (AU); Alex Henzen, NM Bladel (NL); Robert Steven Hannebauer, Vancouver (CA); Dean Rubine, Lee, NH (US); Todd Rockoff, Holgate (AU)

(73) Assignee: HYPHY USA Inc., San Jose, CA (US)

( * ) Notice: Subject to any disclaimer, the term of this patent is extended or adjusted under 35 U.S.C. 154(b) by 58 days.

(21) Appl. No.: 18/442,447

(22) Filed: Feb. 15, 2024

(65) Prior Publication Data

US 2024/0281187 A1 Aug. 22, 2024

Related U.S. Application Data

(60) Provisional application No. 63/611,274, filed on Dec. 18, 2023, provisional application No. 63/516,220, (Continued)

(51) Int. Cl.
*G06F 3/14* (2006.01)
*H04N 5/268* (2006.01)
(Continued)

(52) U.S. Cl.
CPC .............. *G06F 3/14* (2013.01); *H04N 5/268* (2013.01); *H04N 9/68* (2013.01); *H04N 23/843* (2023.01)

(58) Field of Classification Search
CPC ........ H04N 23/843; H04N 9/68; H04N 5/268; G09G 5/006; G06F 3/14
(Continued)

(56) References Cited

U.S. PATENT DOCUMENTS 3,204,035 A 8/1965 Ballard et al.
3,795,765 A 3/1974 DeGroat et al.
(Continued)

FOREIGN PATENT DOCUMENTS

CN 101933277 12/2010
CN 101969319 2/2011
(Continued)

OTHER PUBLICATIONS

Eltokhy et al., "A Low Power Analog Matched-Filter with Smart Sliding Correlation", IEEJ Trans., EIS, vol. 123, No. 11, 2003, pp. 1970-1976.
(Continued)

*Primary Examiner* — Pritham D Prabhakher
(74) *Attorney, Agent, or Firm* — Beyer Law Group LLP

(57) ABSTRACT

Video samples from a camera or cameras of a mobile device are sent as analog levels to a system-on-chip (SoC) or other processor of the device. The analog levels are the analog video samples or be an encoded form of the video samples. The samples are converted to digital and interpolated within the SoC to produce digital RGB samples suitable for display. Or, the analog video samples are interpolated within the SoC using analog processing to produce analog RGB samples. Or, only the G samples are transmitted to the SoC, and processed using analog processing. After processing within the SoC, the samples are sent as analog levels or in encoded form to a corresponding receiver of a display integrated with column drivers. Digital functionality of the DDIC of the display is moved into the SoC or into circuitry separate from, and connected to, the SoC via an MIPI DSI interface.

36 Claims, 27 Drawing Sheets

Video Transport From Camera to System-on-Chip, Digital Processing

Related U.S. Application Data filed on Jul. 28, 2023, provisional application No. 63/500,341, filed on May 5, 2023, provisional application No. 63/447,241, filed on Feb. 21, 2023.

(51) Int. Cl.
*H04N 9/68* (2023.01)
*H04N 23/84* (2023.01)

(58) Field of Classification Search
USPC ...................................................... 348/223.1
See application file for complete search history.

(56) References Cited

U.S. PATENT DOCUMENTS

| | | | |
|---|---|---|---|
| 5,793,759 A | 8/1998 | Rakib et al. | |
| 5,796,774 A | 8/1998 | Kato | |
| 5,870,414 A | 2/1999 | Chaib et al. | |
| 5,936,997 A | 8/1999 | Kanda | |
| 5,938,787 A | 8/1999 | Stark et al. | |
| 5,956,333 A | 9/1999 | Zhou et al. | |
| 5,966,376 A | 10/1999 | Rakib et al. | |
| 6,018,547 A | 1/2000 | Arkhipkin | |
| 6,128,309 A | 10/2000 | Tariki et al. | |
| 6,154,456 A | 11/2000 | Rakib et al. | |
| 6,289,039 B1 | 9/2001 | Garodnick | |
| 6,310,923 B1 | 10/2001 | Lee et al. | |
| 6,456,607 B2 | 9/2002 | Arai et al. | |
| 6,480,559 B1 | 11/2002 | Dabak et al. | |
| 6,751,247 B1 | 6/2004 | Zhengdi | |
| 6,763,009 B1 | 7/2004 | Bedekar et al. | |
| 6,956,891 B2 | 10/2005 | Tan et al. | |
| 7,710,910 B2 | 5/2010 | Ode et al. | |
| 7,793,022 B2 | 9/2010 | Travers et al. | |
| 7,796,575 B2 | 9/2010 | Lim et al. | |
| 7,873,097 B1 | 1/2011 | Luecke et al. | |
| 7,873,980 B2 | 1/2011 | Horan et al. | |
| 7,908,634 B2 | 3/2011 | Keady et al. | |
| 7,937,605 B2 | 5/2011 | Rea et al. | |
| 7,996,584 B2 | 8/2011 | Keady et al. | |
| 8,073,647 B2 | 12/2011 | Horan et al. | |
| 8,094,700 B2 | 1/2012 | Okazaki | |
| 8,272,023 B2 | 9/2012 | Horan et al. | |
| 8,280,668 B2 | 10/2012 | Horan et al. | |
| 8,295,296 B2 | 10/2012 | Keady et al. | |
| 8,369,794 B1 | 2/2013 | Bharghavan et al. | |
| RE44,199 E | 5/2013 | Garodnick | |
| 8,520,776 B2 | 8/2013 | Rea et al. | |
| 8,546,688 B2 | 10/2013 | Horan et al. | |
| 8,674,223 B2 | 3/2014 | Horan et al. | |
| 8,674,224 B2 | 3/2014 | Horan et al. | |
| 8,674,225 B2 | 3/2014 | Horan et al. | |
| 8,674,226 B2 | 3/2014 | Horan et al. | |
| 8,680,395 B2 | 3/2014 | Horan et al. | |
| 8,705,588 B2 | 4/2014 | Odenwalder | |
| 9,324,478 B2 | 4/2016 | Horan et al. | |
| 9,970,768 B2 | 5/2018 | Monroe et al. | |
| 10,158,396 B2 | 12/2018 | Hannebauer et al. | |
| 10,672,358 B2 * | 6/2020 | Matsumoto | G09G 3/3685 |
| 10,715,168 B2 * | 7/2020 | Adjiwibawa | G09G 3/2088 |
| 10,763,914 B2 | 9/2020 | Hannebauer et al. | |
| 11,025,292 B2 | 6/2021 | Hannebauer et al. | |
| 11,394,422 B2 | 7/2022 | Hannebauer et al. | |
| 11,463,125 B2 | 10/2022 | Hannebauer et al. | |
| 11,600,235 B1 * | 3/2023 | Choi | G09G 3/3406 |
| 11,716,114 B2 | 8/2023 | Hannebauer | |
| 11,769,468 B2 * | 9/2023 | Friedman | G09G 5/18 |
| | | | 345/204 |
| 11,961,431 B2 * | 4/2024 | Wetzstein | G06N 3/09 |
| 12,106,736 B2 * | 10/2024 | Park | G09G 3/3696 |
| 12,266,300 B2 * | 4/2025 | Guan | G09G 3/2092 |
| 2002/0013926 A1 | 1/2002 | Kim et al. | |
| 2002/0097779 A1 | 7/2002 | Bang et al. | |
| 2002/0154620 A1 | 10/2002 | Azenkot et al. | |
| 2003/0139178 A1 | 7/2003 | Uesugi et al. | |
| 2004/0120415 A1 | 6/2004 | Song et al. | |
| 2005/0069020 A1 | 3/2005 | Lakkis | |
| 2008/0084920 A1 | 4/2008 | Okazaki | |
| 2008/0106306 A1 | 5/2008 | Keady et al. | |
| 2010/0013579 A1 | 1/2010 | Horan et al. | |
| 2010/0091990 A1 | 4/2010 | Etemad et al. | |
| 2010/0142723 A1 | 6/2010 | Bucklen | |
| 2010/0321591 A1 | 12/2010 | Onomatsu | |
| 2011/0044409 A1 | 2/2011 | Yoshimoto et al. | |
| 2011/0169870 A1 | 7/2011 | Yang et al. | |
| 2012/0014464 A1 | 1/2012 | Eiger et al. | |
| 2012/0047229 A1 | 2/2012 | Bennett | |
| 2013/0194284 A1 | 8/2013 | Bi | |
| 2014/0218616 A1 | 8/2014 | Toba et al. | |
| 2014/0340431 A1 | 11/2014 | Yamakawa | |
| 2016/0127087 A1 | 5/2016 | Feher | |
| 2018/0337687 A1 | 11/2018 | Adjiwibawa et al. | |
| 2019/0088227 A1 | 3/2019 | Matsumoto | |
| 2019/0174027 A1 | 6/2019 | Lv et al. | |
| 2019/0260629 A1 | 8/2019 | Nikopour et al. | |
| 2019/0342564 A1 | 11/2019 | Kurokawa | |
| 2020/0043440 A1 | 2/2020 | Qiu et al. | |
| 2021/0203904 A1 | 7/2021 | Wetzstein et al. | |
| 2022/0302953 A1 | 9/2022 | Hannebauer et al. | |
| 2022/0328000 A1 * | 10/2022 | Guan | G09G 3/2092 |
| 2022/0397931 A1 | 12/2022 | Song et al. | |
| 2023/0123776 A1 * | 4/2023 | Lee | G09G 5/39 |
| | | | 345/204 |
| 2023/0137060 A1 * | 5/2023 | Park | G09G 3/2092 |
| | | | 345/531 |
| 2023/0223981 A1 | 7/2023 | Hannebauer | |
| 2023/0230559 A1 | 7/2023 | Friedman | |
| 2023/0274682 A1 * | 8/2023 | Wang | G09G 3/2007 |
| | | | 345/690 |
| 2023/0330559 A1 * | 10/2023 | Brown | C12M 29/06 |

FOREIGN PATENT DOCUMENTS

| | | |
|---|---|---|
| CN | 101917209 | 7/2015 |
| CN | 210390948 | 4/2020 |
| EP | 0 727 881 | 8/1996 |
| EP | 1 079 536 | 2/2001 |
| EP | 1 968 324 | 9/2008 |
| JP | 08293818 | 11/1996 |
| JP | H09312590 | 12/1997 |
| JP | 2001/144653 | 5/2001 |
| JP | 2001156861 | 6/2001 |
| JP | 2001510658 | 7/2001 |
| JP | 2002281545 | 9/2002 |
| JP | 2007/150971 | 6/2007 |
| JP | 2011003331 | 6/2011 |
| WO | WO 97/02663 | 1/1997 |
| WO | WO 98/52365 | 11/1998 |
| WO | 2007/075052 | 7/2007 |
| WO | 2010/106330 | 9/2010 |
| WO | 2018-170546 | 9/2010 |
| WO | WO 2012/007785 | 1/2012 |
| WO | WO 2017/049347 | 3/2017 |

OTHER PUBLICATIONS

Van der Heijden, "An Analog Correlator for a High Speed DS-CDMA Modem", Eindhoven University of Technology, Department of Electrical Engineering Telecommunication Technology and Electromagnetics, 1998, 65 pages.

Shanmugam et al., "An Analog Spread-Spectrum Interface for Power-Line Data Communication in Home Networking", IEEE transactions on Power Delivery, vol. 20, No. 1, Jan. 2005.

Immink, "Construction of DC-free Codes Using the fast Hadamard Transform", Nov. 7, 2001, 6 pages.

International Search Report and Written Opinion dated May 29, 2024 from International Application No. PCT/US2024/016012.

* cited by examiner

Improved Video Transport within a Mobile Telephone

Video Transport From Camera to System-on-Chip, Digital Processing

Video Transport From Camera to System-on-Chip, Analog Processing

Video Transport From Camera to System-on-Chip, Analog Processing

Sampled Analog Video Transport From System-on-Chip to DDIC

FIG. 4A

SSVT from SoC to DDIC

SAVT Transmitter

SAVT Receiver at SoC

SAVT Receiver Input

16 Output Channels running at 1/16th rate, phase shifted by 1 input cycle.

Each output is delayed (phase shifted) by 1 Fsavt clock cycle 302    304                                    300

| S/H AMPLIFIER NUMBER | 0 | 0 | 1 | 2 | | 61 | 62 | 63 |
|---|---|---|---|---|---|---|---|---|
| | 1 | 64 | 65 | 66 | | 125 | 126 | 127 |
| | 2 | 128 | 129 | 130 | | 189 | 190 | 191 |
| | 3 | 192 | 193 | 194 | | 253 | 254 | 255 |
| | 4 | 256 | 257 | 258 | | 317 | 318 | 319 |
| | 5 | 320 | 321 | 322 | | 381 | 382 | 383 |
| | 6 | 384 | 385 | 386 | | 445 | 446 | 447 |
| | 7 | 448 | 449 | 450 | ... | 509 | 510 | 511 |
| | 8 | 512 | 513 | 514 | | 573 | 574 | 575 |
| | 9 | 576 | 577 | 578 | | 637 | 638 | 639 |
| | 10 | 640 | 641 | 642 | | 701 | 702 | 703 |
| | 11 | 704 | 705 | 706 | | 765 | 766 | 767 |
| | 12 | 768 | 769 | 770 | | 829 | 830 | 831 |
| | 13 | 832 | 833 | 834 | | 893 | 894 | 895 |
| | 14 | 896 | 897 | 898 | | 957 | 958 | 959 |
| | 15 | 0 | 1 | 2 | ... | 61 | 62 | 63 |

306

RGB SUB-PIXEL INDICES COLLECTED
BY EACH S/H AMPLIFIER

FIG. 8

INPUT VECTOR

| |
|---|
| SAMPLE Φ |
| SAMPLE 64 |
| SAMPLE 128 |
| ⋮ |
| SAMPLE 832 |
| SAMPLE 896 |
| CONTROL Φ |
| SAMPLE 1 |
| ⋮ |
| SAMPLE 897 |
| CONTROL 1 |
| SAMPLE 2 |
| ⋮ |
| CONTROL 63 |

320

→ SERIAL OUTPUT

RGB Sub-Pixels Indices
Collected by each S/H Amplifier of a
Source Driver

| Subpixel Order | ctl0 | ctl1 | ctl2 | ***** | ctl61 | ctl62 | ctl63 |
|---|---|---|---|---|---|---|---|
| 0 | 0 | 1 | 2 | | 61 | 62 | 63 |
| 1 | 64 | 65 | 66 | | 125 | 126 | 127 |
| 2 | 128 | 129 | 130 | | 189 | 190 | 191 |
| 3 | 192 | 193 | 194 | | 253 | 254 | 255 |
| 4 | 256 | 257 | 258 | | 317 | 318 | 319 |
| 5 | 320 | 321 | 322 | | 381 | 382 | 383 |
| 6 | 384 | 385 | 386 | ***** | 445 | 446 | 447 |
| 7 | 448 | 449 | 450 | | 509 | 510 | 511 |
| 8 | 512 | 513 | 514 | | 573 | 574 | 575 |
| 9 | 576 | 577 | 578 | | 637 | 638 | 639 |
| 10 | 640 | 641 | 642 | | 701 | 702 | 703 |
| 11 | 704 | 705 | 706 | | 765 | 766 | 767 |
| 12 | 768 | 769 | 770 | | 829 | 830 | 831 |
| 13 | 832 | 833 | 834 | | 893 | 894 | 895 |
| 14 | 896 | 897 | 898 | | 957 | 958 | 959 |
| 15 | 0 | 1 | 2 | ***** | 61 | 62 | 63 |

SHA Amplifier Number

RGB Sub-Pixels

Image Sensor with Modified Interpolation
or with Modified Readout

Color Interpolation in Analog Domain

930

Encoding of Analog Values

Encoding of Digital Values

Decoding Analog Input Levels

VIDEO TRANSPORT WITHIN A MOBILE DEVICE

CROSS-REFERENCE TO RELATED APPLICATIONS

This application claims priority to U.S. provisional patent application Nos. 63/516,220, filed Jul. 28, 2023, and 63/611, 274, filed Dec. 18, 2023, both entitled "VIDEO TRANSPORT WITHIN A MOBILE DEVICE."

This application claims priority to U.S. provisional patent application Nos. 63/447,241, filed Feb. 21, 2023, and 63/500,341, filed May 5, 2023, entitled "ANALOG VIDEO TRANSPORT TO A DISPLAY PANEL," and "ANALOG VIDEO TRANSPORT TO A DISPLAY PANEL AND SOURCE DRIVER INTEGRATION WITH A DISPLAY PANEL," respectively.

This application incorporates by reference U.S. application Ser. No. 15/925,123, filed on Mar. 19, 2018, now U.S. Pat. No. 10,158,396, issued Dec. 18, 2018, U.S. application Ser. No. 16/494,901 filed on Sep. 17, 2019, U.S. application Ser. No. 17/879,499 filed on Aug. 2, 2022, U.S. application Ser. No. 17/686,790, filed on Mar. 4, 2022, U.S. application Ser. No. 17/887,849 filed on Aug. 15, 2022, U.S. application Ser. No. 17/851,821, filed Jun. 28, 2022, U.S. application Ser. No. 18/448,330, filed Aug. 11, 2023, U.S. patent application Ser. No. 17/900,570 (HYFYP009), filed Aug. 31, 2022, U.S. application Ser. No. 17/946,479 filed on Sep. 16, 2022, U.S. application Ser. No. 18/095,801 filed on Jan. 11, 2023, U.S. patent application Ser. No. 18/098,612 (HYFYP013), filed Jan. 18, 2023, U.S. application Ser. No. 18/117,288 filed on Mar. 3, 2023 and U.S. application Ser. No. 18/442,491 filed on Feb. 15, 2023.

FIELD OF THE INVENTION

The present invention relates generally to video transport. More specifically, the present invention relates to transporting video within a mobile device from a camera to a processor and from a processor to a display.

BACKGROUND OF THE INVENTION

Image sensors, displays and video processors are continually racing to achieve larger formats, greater color depth, higher frame rates and higher resolutions. Video transport within a mobile device includes performance-scaling bottlenecks that throttle throughput and compromise performance while consuming ever more cost and power. Eliminating these bottlenecks can provide advantages.

For instance, instead of a traditional single rear camera of a mobile device, new mobile devices may now include two or three rear cameras (for a higher dynamic range, depth sensing, etc.) in addition to one or two front cameras, meaning more than one camera may be active and sending video at a time. In addition, the resolution of these cameras is increasing as well as the resolution of the displays on the mobile devices, all of which stresses the interface between cameras and processor and between processor and display, thus making it more difficult and costly to transport video within a mobile device. For instance, the display driver integrated circuit (DDIC) chip within a mobile telephone is a hybrid chip as it combines the functionality of a timing controller with that of a display controller it is a half-digital half-analog chip with digital-to-analog converters that can be complex to build.

Accordingly, new apparatuses and techniques are desirable to make it simpler to transport video within a mobile device in order to reduce size, complexity and cost of the components of a mobile device.

SUMMARY OF THE INVENTION

To achieve the foregoing, and in accordance with the purpose of the present invention, video transport techniques are disclosed that address the above deficiencies in the prior art.

A video signal is a list of brightness values. It is realized that precisely maintaining fixed-bit-width (i.e., digital) brightness values is inefficient for video transport, and because there is no requirement for bit-accurate reproduction of these brightness values, analog voltages offer much greater dynamic range. Therefore, embodiments of the present invention transport video signals as analog signals rather than as digital signals. And, instead of transporting video signals using a mobile industry processor interface (MIPI) standard within a mobile device, embodiments use novel video transports that transmit encoded or unencoded analog samples.

In one embodiment, video samples from a camera sensor are kept in the analog domain, transmitted to a system-on-chip (SoC), converted to digital for processing, and then the samples are transmitted in the analog domain to the display. A hybrid digital/analog DDIC chip at the display is not needed as analog samples arrive and are kept in the analog domain for display. No digital-to-analog converters for converting video samples are needed within a novel DDIC at the display.

In another embodiment, analog samples from a sensor are transmitted to an SoC, processed in the analog domain and then sent in the analog domain to the display. No digital processing of the samples is needed in the SoC. In another embodiment, only the G samples are transmitted from sensor to SoC. In another embodiment, two rows are read out at a time from the sensor.

In any embodiment, the functionality of the DDIC may be split into a DDIC-SD at the display and a DDIC-TCON at the SoC, thus moving the timing controller (TCON) function of the DDIC away from the display. Or, the DDIC-TCON may be integrated into the SoC, further simplifying connections and eliminating the MIPI interface. Advantages include fewer wires between cameras and the SoC, fewer wires between SoC and the display, reduced EMI and power consumption, and a reduction in clock rates.

BRIEF DESCRIPTION OF THE DRAWINGS

The invention, together with further advantages thereof, may best be understood by reference to the following description taken in conjunction with the accompanying drawings in which:

FIG. 4A illustrates in greater detail video transport from a system-on-a-chip to a novel DDIC of a display using SAVT;

FIG. 8 is a pixel transmission order showing how pixels and control signals are transmitted from an SAVT transmitter to the SAVT receiver;

FIG. 9 shows of an input vector of an SAVT transmitter having a predetermined permutation that provides for the sequence of sub-pixel transmission;

DETAILED DESCRIPTION OF THE INVENTION

It is realized that due to the greater number of cameras on a mobile device and the increased resolution of those cameras and of the display, that the digital interface used to transport video from a camera or cameras, and to the display, is nearing its limit. Typically, this digital interface is the MIPI CSI (Mobile Industry Processor Interface Camera Serial Interface) that transports video from each camera to the system-on-a-chip (SoC) of the mobile device, and the MIPI DSI (Mobile Industry Processor Interface Display Serial Interface) that transports video from the SoC of the mobile device to its display. Accordingly, we replace this digital interface (whether MIPI or other) with analog video transport between the camera and SoC, and between the SoC and the display. The analog video samples may be encoded or not.

We further realize that currently, even though each image sensor (i.e., each camera) senses analog values, these analog values are converted to digital, transported to the SoC, processed, and then the digital values are sent to the display where they are converted back to their analog values for display on the screen of a mobile device. We realize that analog-to-digital conversion within each camera module takes up space and increases the cost of that module, whereas this conversion can more efficiently be performed within the SoC. Further, the subsequent digital-to-analog conversion of video samples within a prior art DDIC of a mobile device can require thousands of digital-to-analog conversions, whereas these conversions can be performed much more efficiently within the SoC and require only a handful of DACs when our analog video transport technology is used. Thus, our improved DDIC becomes more of an analog device, does not require DACs for converting video samples, and becomes simpler and less expensive.

Thus, analog video samples (encoded or not) are sent from a camera or cameras to the SoC, converted to digital samples for processing within the SoC, are converted to analog samples after processing within the SoC, and then the analog samples are transported (encoded or not) from the SoC to the improved DDIC for display on a screen of a mobile device. No digital-to-analog conversion of video samples is necessary within the improved DDIC. Alternatively, the analog samples are received at the SoC, processed in the analog domain, and transported to the improved DDIC for display; no digital processing of the analog samples is needed in the SoC.

Prior Art Video Transport within a Mobile Device

Figure 1:
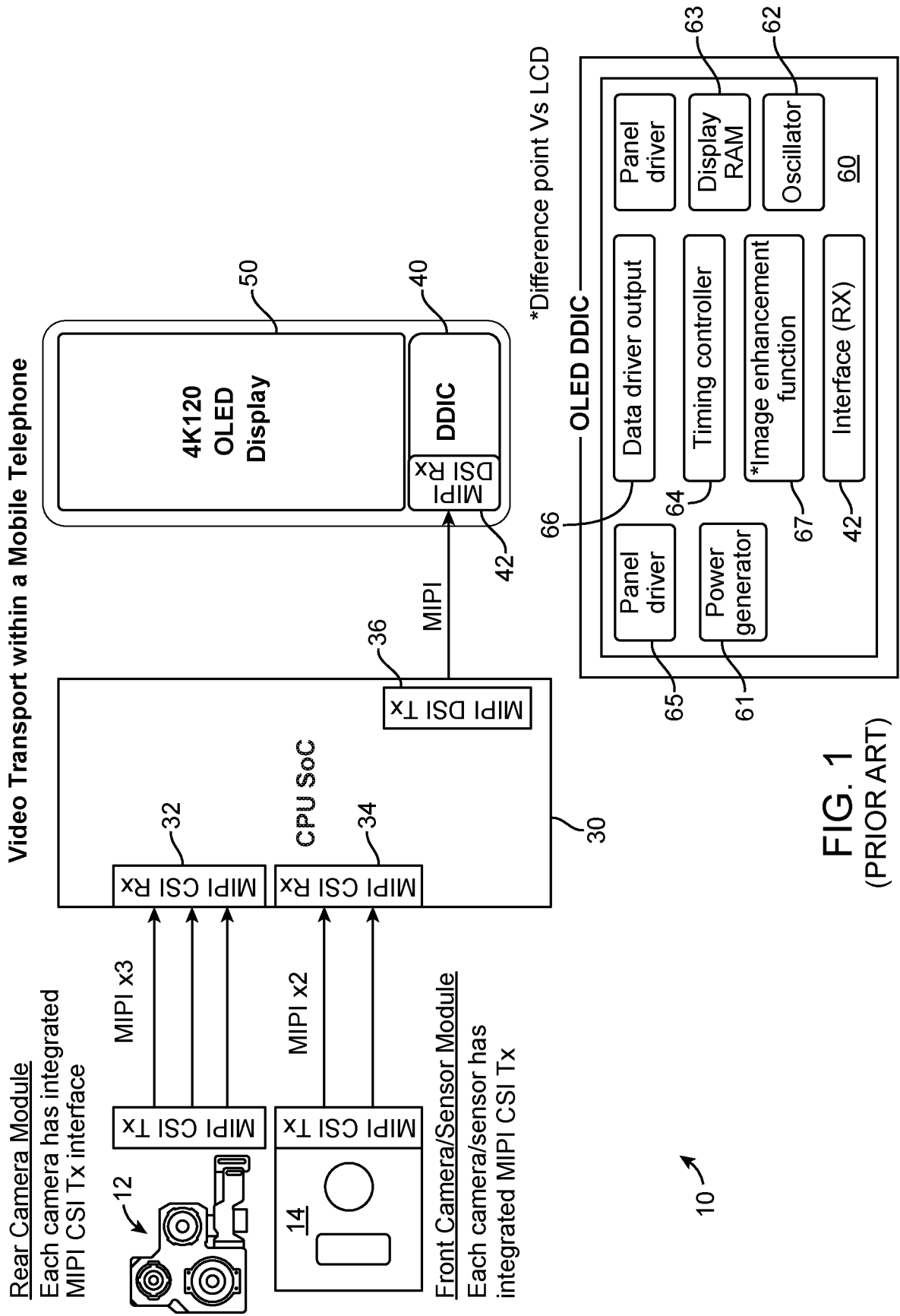
FIG. 1 illustrates prior art video transport within a mobile telephone.

FIG. 1 illustrates prior art video transport within a mobile telephone 10. Shown are components of a typical mobile telephone having a rear camera module 12 with three lenses (or image sensors), and a front camera module 14 with two lenses (or image sensors). Each camera or image sensor requires thousands of analog-to-digital converters (ADC) to convert analog video samples into digital video samples and a dedicated MIPI CSI digital interface which transmits the digital video samples to the SoC 30 of the mobile telephone. Accordingly, the SoC requires a corresponding number of digital MIPI CSI interfaces (five in this example) in order to receive the digital video samples for processing. After processing, a digital MIPI DSI transmitter 36 transmits digital video samples to the DDIC 40 of the display 50.

The DDIC 40 includes a corresponding digital MIPI DSI receiver 40 that receives the digital video samples. As the DDIC is a hybrid analog/digital chip, it includes a number of other components such as power generator 61, oscillator 62, display RAM 63, timing controller 64, panel drivers 65, and a data driver output 66. When driving an LED display (such as OLED display 50) as opposed to an LCD display, DDIC 40 typically includes an image enhancement component 67. Notably, this DDIC includes digital functionality within the timing controller 64 and image enhancement component 67, thousands of DACs (not shown), as well as display RAM 63. This architecture for video transport within a mobile telephone (including MIPI interfaces, digital transport between camera and SoC and between SoC and display, ADCs within the camera modules, digital functionality within the DDIC, and DACs within the DDIC) is disadvantageous for the reasons given above. Typically, the DDIC will be implemented in 28 nm HV CMOS.

In sum, given the high refresh rate demanded by smartphone displays, implementing a DDIC 40 within a smartphone can be challenging due to the MIPI receiver, SRAM, digital image processing, and approximately 1,000 DACs.

Architecture for Improved Video Transport within a Mobile Device

Figure 2A:
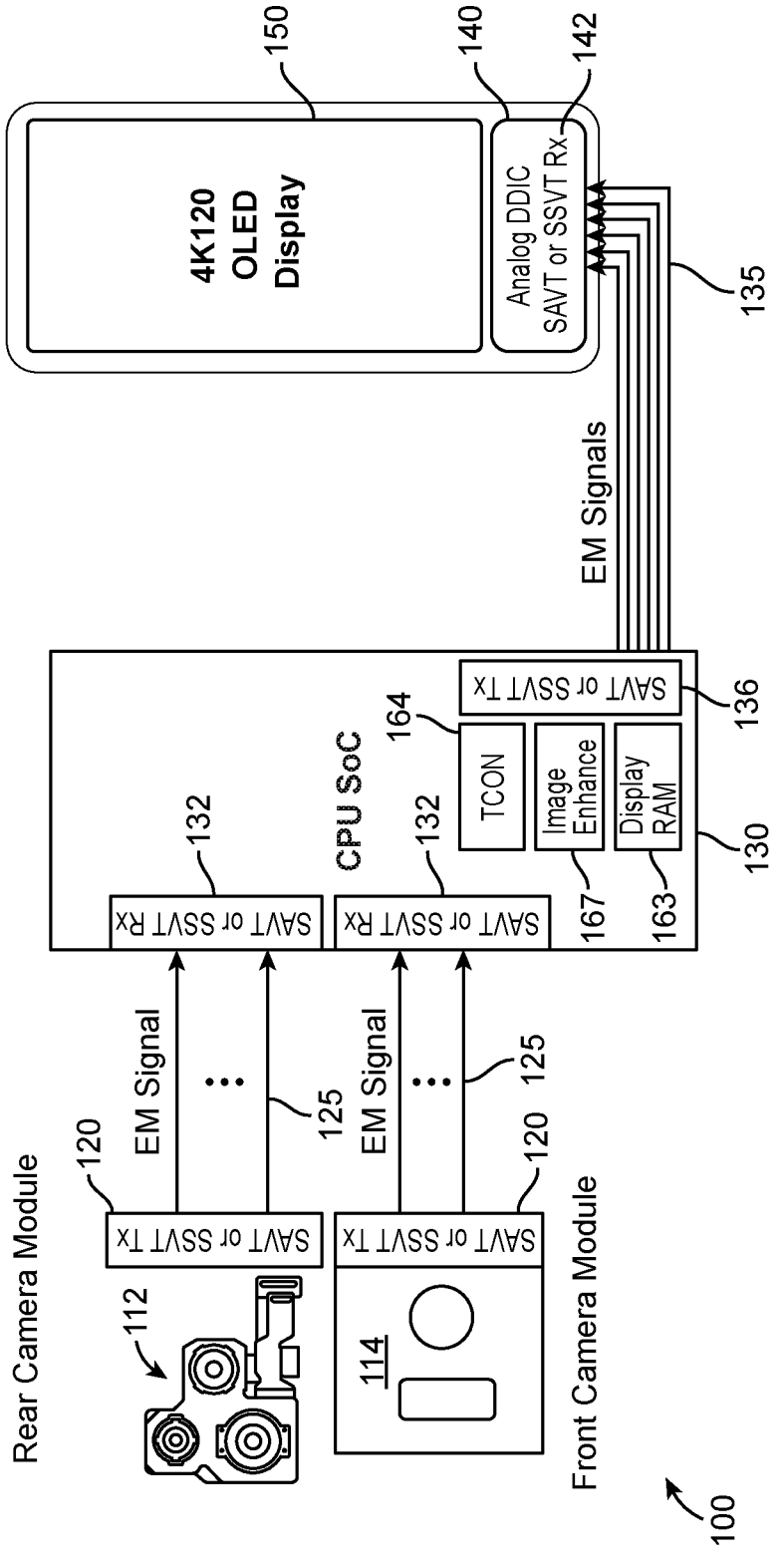
FIG. 2A illustrates improved video transport within a mobile telephone.

FIG. 2A illustrates improved video transport within a mobile telephone 100. Shown are selected components within telephone 100 including rear camera module 112, front camera module 114, SoC 130, and display 150 along with its associated improved DDIC 140. As known, a DDIC is basically one large source driver IC driving all of the columns of a small display such as in a mobile telephone, and typically there is only one DDIC implemented on a single silicon chip per display. Mobile telephone 100 may be any suitable mobile device such as a mobile telephone, cell phone, portable tablet computer, personal digital assistant, or similar. Advantageously, this architecture streamlines the mobile DDIC architecture. The architecture enables an optimal TCON and DDIC partitioning by shifting the SRAM and image processing of the DDIC to the SoC; the simplified DDIC 140 is now all analog. Only a small number of DACs in the SoC are needed for the transmitter and there are a reduced number of wires from the SoC to the DDIC. Compared to MIPI, this architecture provides lower clock rates, reduced EMI and lower power consumption. Processor 130 may be any suitable processor (e.g., a CPU) arranged to implement the embodiments below and need not necessarily be termed an "SoC."

Rear camera module 112 includes any number of cameras (or image sensors), typically one, two or three. Similarly, front camera module 114 includes any number of cameras (or image sensors), typically one or two. Further, neither the rear or front camera module nor each camera requires a MIPI CSI digital interface as the analog samples are sent using a transmitter 120 from each camera. Each rear or front camera then transmits a series of analog levels as one or more EM signals 125 using a transmitter 120 over a suitable electromagnetic pathway to a corresponding receiver 132 of the SoC. The number of EM signals 125 emitted by each camera using a transmitter 120 depends upon the type of transmitter used, bandwidth, frequency, and other implementation decisions. In an alternative embodiment, each rear or front camera module 112 or 114 aggregates the analog samples from its multiple sensors (e.g., three sensors) and uses a single transmitter to transmit the aggregated analog samples to the receiver on the SoC. The receiver and SoC then separate out the streams.

Each transmitter 120 may be a sampled analog video transport (SAVT) transmitter or may be a spread spectrum video transport (SSVT) transmitter such as is disclosed below and in the above patents and patent applications incorporated by reference. Module 112 or 114 may or may not include ADCs for converting analog video samples into digital samples depending upon the embodiment as will be discussed below. Further, neither camera module nor each camera nor the SoC 130 requires a MIPI CSI digital interface as samples are sent using analog levels in each EM signal 125 from a transmitter to its corresponding receiver.

Below is described in more detail both the SAVT technology and the SSVT technology for transporting video samples. Basically, SAVT transports analog video samples as is, whereas SSVT transports video samples in an encoded form. SAVT is typically used over shorter distances where electromagnetic interference (EMI) is not a problem, whereas SSVT is typically used over greater distances where EMI can degrade video quality to an unacceptable level. If a mobile device has a noisy environment, then SSVT may be used. Typically, all of the transmitters 120 of the front camera module and the rear camera module will use either SAVT or SSVT, although a mixture of both types of video transport is possible between the various cameras. The SAVT technology may also be referred to as "clocked-analog video transport" or CAVT.

SoC 130 includes a receiver 132 corresponding to each transmitter 120 of either the rear camera module or the front camera module. Each SAVT transmitter 120 transmits to a corresponding SAVT receiver 132 and each SSVT transmitter 120 transmits to a corresponding SSVT receiver 132. Notably, no digital MIPI CSI receivers are needed within SoC 130. Each receiver 132 receives analog levels and outputs analog video samples; an optional ADC per receiver may convert the output analog video samples into digital video samples for processing within the SoC, depending upon the embodiment implemented. As shown, the timing controller 164, image enhancement component 167 and display RAM 163 have been moved from the prior art DDIC of the mobile telephone into the improved SoC 130; implementing this digital functionality within the SoC is more efficient than implementing it within the prior art DDIC.

Also included within the SoC is transmitter 136 that transmits one or more electromagnetic (EM) signals 135 to corresponding receiver 142 within novel DDIC 140. For a mobile telephone as shown, it is contemplated that there will be one transmitter 136 (although more are possible) transmitting from two up to six EM signals 135. Typically, the electromagnetic pathway of each EM signal will be a twisted wire pair, although other pathways such as wireless, cable, optical are also possible. For example, for an SSVT Tx, six twisted pairs can provide 550 Msps (mega samples per second), while three pairs can provide 1100 Msps; more Msps are possible. For a typical mobile device (such as a mobile telephone) the analog DDIC 140 will drive 2,000 columns of the display, meaning one transmitter and six twisted wire pairs. Assuming three sub-pixels per column, that means that DDIC 140 will have 6,000 outputs. Although not shown, typically for a smaller mobile device such as a telephone, DDIC 140 will include the gate drivers and will drive the gates directly, using a technology such as "in-panel" gate drivers.

As with transmitters 120, transmitter 136 may be an SAVT transmitter or an SSVT transmitter depending upon the implementation. In the case of an SAVT transmitter, the digital video samples after being processed by the SoC are distributed into input vectors and then input into a DAC (as described below) before being transmitted as analog levels 135, although it is possible to convert the processed digital video samples into analog video samples before input into the SAVT transmitter. In another embodiment, analog video samples after analog processing by the SoC are distributed into input vectors of the SAVT transmitter and then transmitted as analog levels 135. In the case of an SSVT transmitter, the digital video samples may be encoded in digital form and then input into a DAC (as described below)

before being transmitted as analog levels 135, although it is possible to convert the processed digital video samples into analog video samples which are then encoded in analog form and then output as analog levels 135. In another embodiment, analog video samples after analog processing by the SoC are input into the SSVT transmitter 136.

Figure 4A:
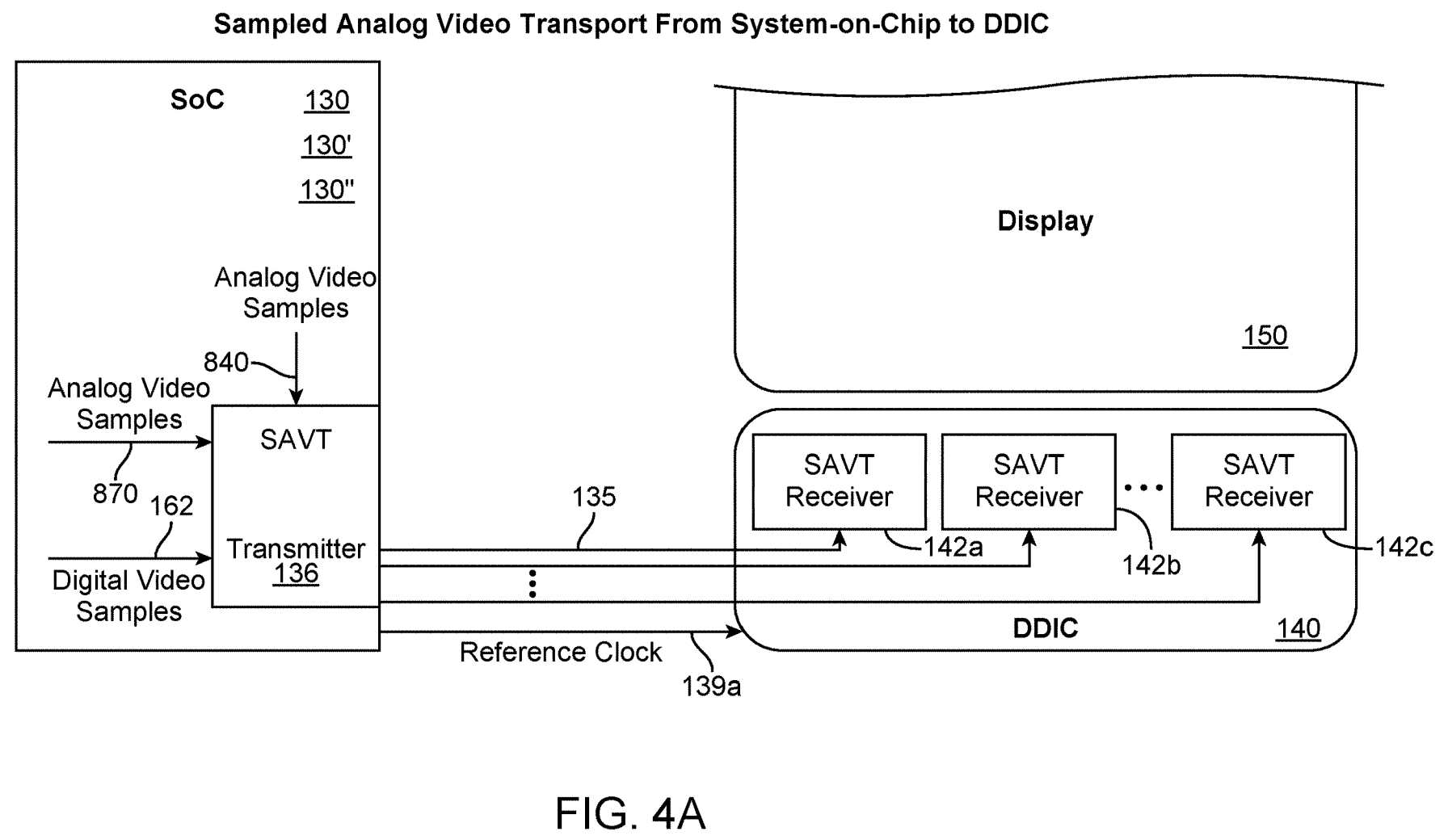
Figure 6:
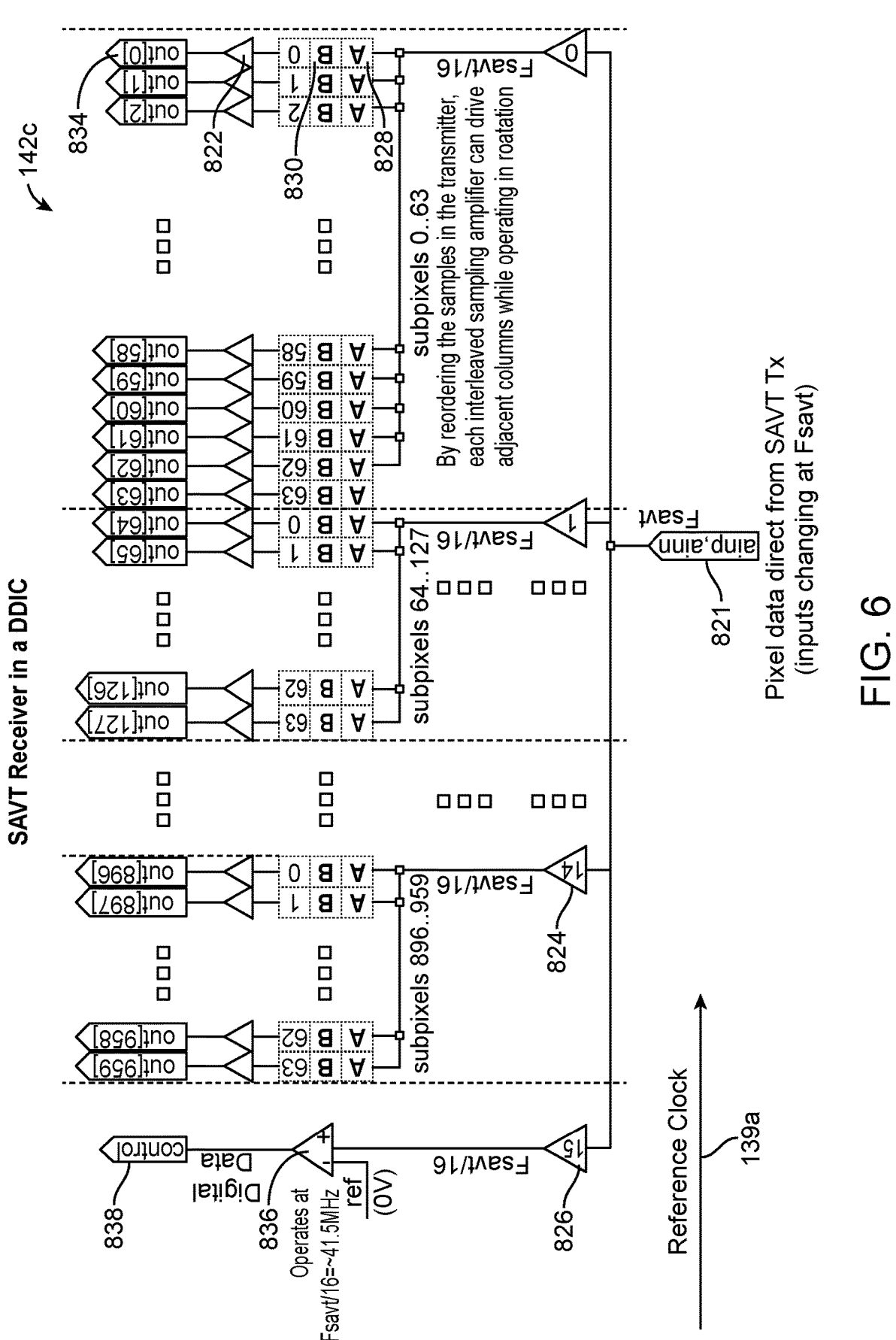
FIG. 6 illustrates an architecture of an SAVT receiver in which each amplifier drives adjacent columns and all control signals are handled by a single amplifier.

For SAVT between camera and SoC, a reference clock may be provided by a microprocessor of the camera or of transmitter 120, or the clock may be recovered from other signals. This reference clock is separate from EM signals 125. For SAVT from the SoC, TCON 164 provides a separate reference clock 139 (separate from EM signals 135 and not shown for clarity in this drawing) to each of SAVT receivers 142, i.e., the DDIC 140 has a clock input that is provided by the TCON. This reference clock may be relatively low frequency, around 10.5 MHz, for example. Reference clock 139 is also shown in FIGS. 4A and 6.

For SSVT, each SSVT receiver 132 or 142 may include a clock recovery circuit, a synchronization and acquisition circuit, or similar, in order to recover a reference clock and other timing signals at the receiver. There may be a single such circuit in each receiver, or each decoder of the receiver may have such a circuit. The reference clock may be sent inherently in EM signals 125, 135 (i.e., in the timing of the levels being sent), as a sub-band of samples, or in similar manners. Thus, the reference clock is sent using the EM signals and a separate line for a reference clock between transmitter and receiver is not needed.

Display 150 has an associated analog DDIC 140 that includes a receiver 142. As mentioned above, if a transmitter is SAVT its corresponding receiver will be SAVT and if a transmitter is SSVT its corresponding receiver will be SSVT. As with prior art DDIC 40, novel DDIC 140 is connected to, and in communication with, display 150 using well-known techniques such as the chip-on-glass (COG) technique or the chip-on-film (COF) technique; the chip-on-plastic technique may also be used but is not as desirable.

Notably, analog DDIC 140 does not include the digital functionality of the timing controller 164 nor the image enhancement component 167; also, the display RAM 163 is within the SoC and not within the DDIC 140. Implementing these three components within the digital SoC (in a <5 nm process) rather than within the DDIC is very cost effective and allows the DDIC to be incremented in a less expensive 65 nm process rather than within the more expensive 28 nm process. As mentioned earlier, DDIC 140 does not include nor need any DACs for the purpose of converting video samples. Advantageously, thousands of DACs (or their equivalent) are not needed within DDIC 140; only a handful of DACs are needed within SoC 130 in order to convert video samples from digital to analog or to convert levels from digital to analog (depending upon the embodiment used).

Figure 2B:
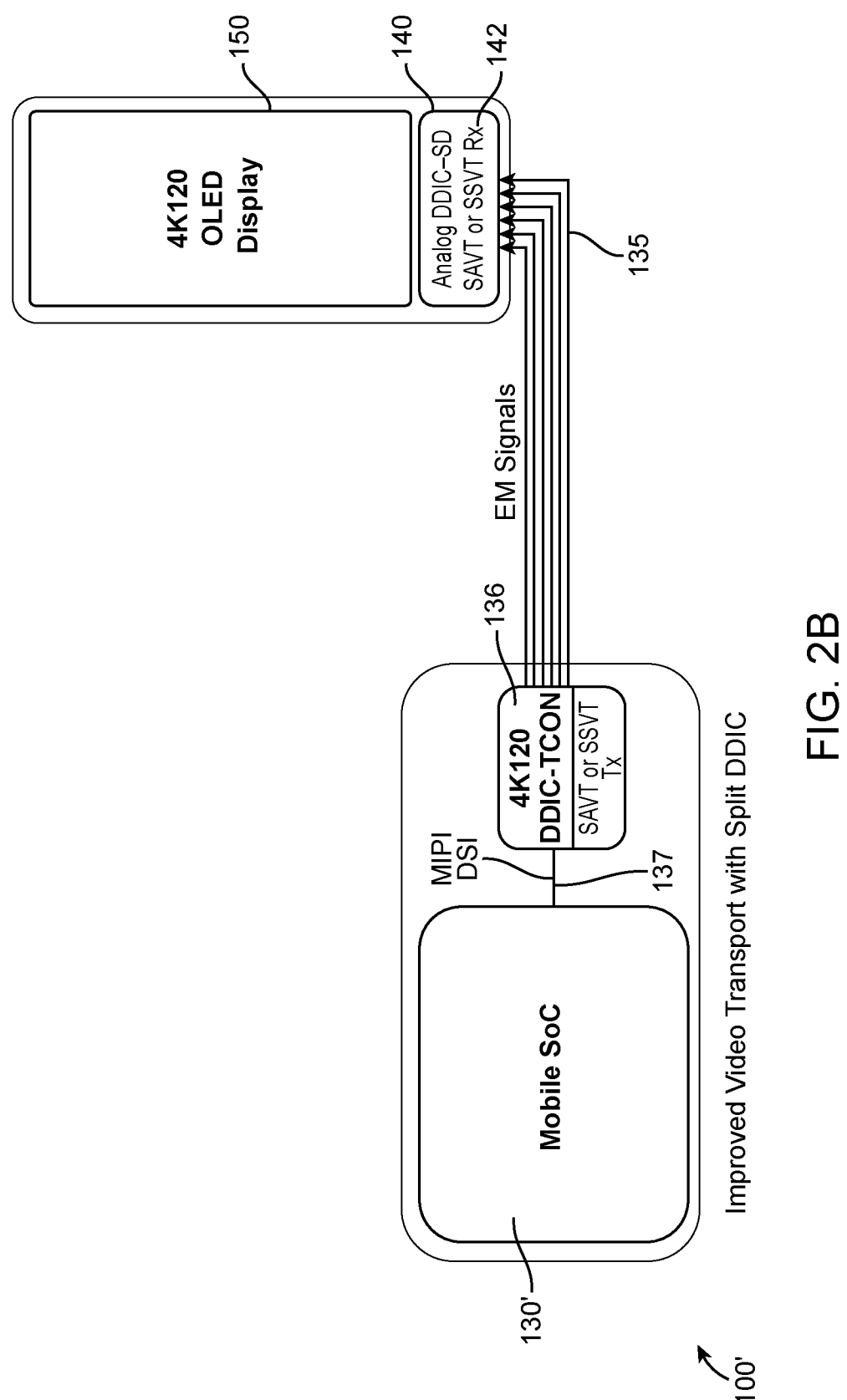
FIG. 2B illustrates improved video transport within a mobile telephone with a split DDIC.

FIG. 2B illustrates improved video transport with a split DDIC within a mobile telephone 100'. Above, FIG. 2A illustrates the digital functionality of the DDIC being integrated with the SoC. As an intermediate step, it is also possible to implement this digital functionality within a separate IC 136 along with a transmitter that is separate from SoC 130'. IC 136 includes the TCON functionality, SRAM, and image processing, while DDIC-SD 140 includes all analog functionality of the DDIC along with the integrated receiver. A MIPI DSI interface 137 only transmits digital samples a short distance. Thus, the functionality of a DDIC is split between IC 136 and IC 140. As above, for SAVT, TCON in IC 136 provides a separate reference clock 139 (not shown in this drawing) to each of SAVT receivers 142.

Figure 3A:
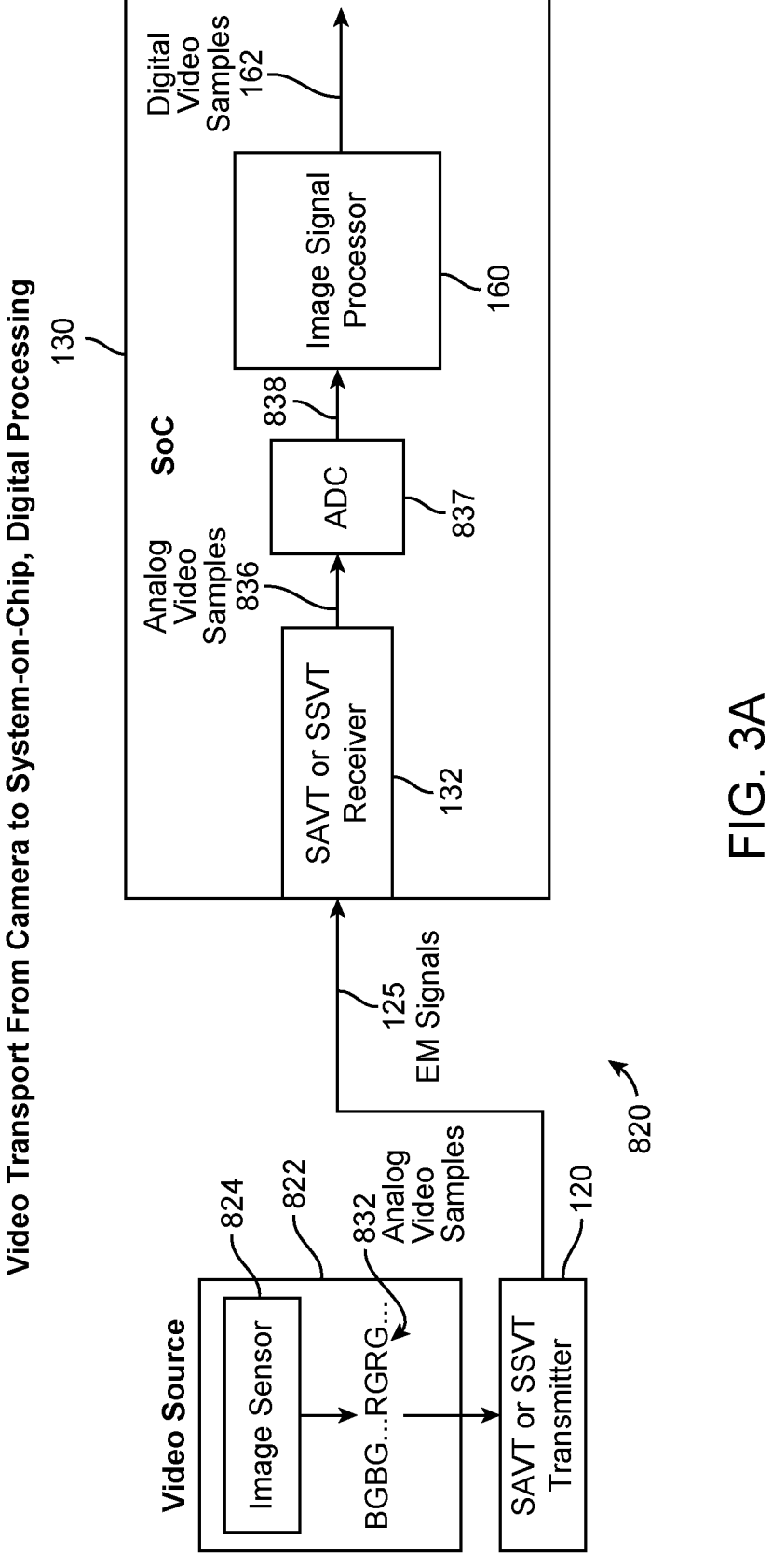
FIG. 3A illustrates in greater detail transport of analog video samples from a video source to an SoC.

Video Transport with Analog-to-Digital Conversion and Interpolation within the SoC FIG. 3A illustrates in greater detail transport of analog video samples from a video source to an SoC using an SAVT or SSVT transmitter 120 and an SAVT or SSVT receiver 132 within a system 820. Shown is a video source 822 that generates analog video samples 832. Video source 822 may be implemented within any device capable of capturing imaging information, such as but not limited to a still camera, video camera, an infrared imaging device, or any other similar imaging device capable of generating video information. Typically, within a mobile device, video source 822 includes an image sensor semiconductor die including an array and associated electronics. In this embodiment, analog-to-digital conversion of the video samples and interpolation is performed within the SoC.

Image sensor 824 is any array capable of generating an electronic signal that is proportional to an amount of measured light. For example, the image sensor is a planar array of photodiodes. Each photodiode represents a pixel location in the planar array and the number of photodiodes in the planar array may widely vary and is dependent on the size of the image sensor. Typically, video source 822 will be implemented within each of the cameras within rear camera module 112 or within front camera module 114.

Note that no analog-to-digital converters (ADCs) are required within the video source in this embodiment, thus reducing expense, space required, heat generated and complexity of the video source. The transport from the video source to the SoC is one or more (P) electromagnetic signals 125 which consists of analog levels, i.e., P>=1. There is a trade-off between analog bandwidth requirements and the number P of EM signals 125. If P is large, the bandwidth requirements go down; the maximum bandwidth requirement is when P=1. Advantageously, in this embodiment, an analog-to-digital converter 837 or converters (ADCs) are implemented within the SoC which may be a different process than the image sensor and which is more power efficient. While a prior art 4K image sensor may need approximately 4,000 ADCs in order to convert and then output digital video samples to the SoC, image sensor 824 needs no ADCs.

The output of array 824 are analog video samples 832. Image sensor 824 may be either monochromatic or color. In the case of the former, the values generated are representative of only one color. With the latter, well-known filtering techniques using a color filter array (CFA) such as a Bayer filter are typically applied. With Bayer filtering, the individual photodiodes are selectively covered with filters of a predetermined color (e.g., either Red or Blue or Green), thus generating a color sample per photodiode. In alternative embodiments, CYGM (Cyan, Yellow, Green and Magenta) CYYM (Cyan, Yellow, Yellow and Magenta), RYYB, RGBW, RCCC, RCCB and other types of filtering may be used. Regardless of the type of filter used, the magnitude of the filtered light is measured at each sample position. The output is a continuous serial stream of time-ordered analog video samples 832, each representative of a pixel in a row, from left to right, in row-major order, frame after frame, so long as image sensor 824 is sensing. Of course, a different ordering may also be used. When Bayer filtering is used, the samples are output by a row of BGBG . . . followed by a row of RGRG . . . , often referred to as RGGB format as each 2×2 pattern includes one each of RGGB.

The analog video samples 832 are input serially into transmitter 120 and then transmitted as analog levels. As mentioned before, and as will be described in greater detail below, transmitter 120 may use SAVT or SSVT. As such, the rows of analog video samples 239*d* are input serially into the SAVT transmitter of FIG. 5A, or the samples 437*d* are input serially into the SSVT transmitter of FIG. 12. In the case of SSVT, the analog levels will be an encoded representation of analog video samples 832, while in the case of SAVT, the analog levels will be the analog video samples 832 themselves. Transmitter 120 may be located in any suitable location: integrated within the die of image sensor 824, within the camera or video source 822, or in close proximity to the video source.

In either case, analog samples 832 from an SAVT transmitter are transmitted to an SAVT receiver 132 located within the SoC, or analog levels from an SSVT transmitter are transmitted to an SSVT receiver 132 located within the SoC. As such, the rows of analog video samples 239*d* are output 220 from the SAVT receiver of FIG. 5B, or the rows of samples 85*d* are output serially from the SSVT receiver of FIG. 13.

Either the SAVT or SSVT receiver 132, as the case may be, will output analog video samples 836 corresponding to the input analog video samples 832. Any number of ADCs 837 convert these samples into digital video samples 838 which are then processed by image signal processor (ISP) 160 which outputs processed digital video samples 162 for any further manipulation by the SoC 130 before the video samples are sent on to display 150 of the mobile device via a transmitter 136 of the SoC (described below). The samples may be converted serially by a single high-speed ADC or in parallel by several (e.g. 16) ADCs working at lower frequency after 16 samples have been aggregated, or by using other suitable techniques. Once the video samples are received at display 150, they are driven onto the display using either the receivers of FIG. 6 or the receiver of FIG. 15, depending upon whether SAVT or SSVT is used for transport.

As the samples are still the raw data from the image sensor (i.e., the Bayer filter output from the sensor 824), the ISP 160 performs a "demosaic" process, aka "demosaicing" using CFA interpolation and interpolates the "missing" color values at each location to create RGB samples per pixel. That is, given only a single-color measurement per pixel, the ISP algorithmically estimates the "missing" color values to create, for example, an RGB or YCbCr representation for the pixel. A variety of sophisticated and well-established image processing algorithms are available to perform color interpolation, including nearest neighbor, linear, cubic, and cubic spline techniques. If using a color ace different from RGB (i.e. using a different color filter array), the color interpolation table suitable for that color space is used to perform CFA interpolation.

ISP 160 may also: apply gamma correction on each sample; perform tone curve mapping; level shift each gamma-corrected sample, map the range (0 . . . 255) to (−128 . . . 127), in order to remove the DC component from the signal; apply the path-specific amplifier variance correction to each gamma-corrected, level-shifted sample; perform gain compensation for each sample; perform offset adjustment for each sample; and perform demura correction for each sample. Other corrections and adjustments may also be made depending upon the dynamic range of the sensor; or the target display. In order to avoid performing image processing on any control signals in the line buffer, the control signal timing and positions in buffers is known so that logic can determine that image processing of control signals should not be done.

In an alternative embodiment, an ADC or ADCs may be integrated with, or located before, either an SAVT receiver or an SSVT receiver, as will be explained in greater detail below in which case the SSVT receiver uses digital decoding and ADC 837 is not needed after receiver 132.

Advantageously, image processor 160 and associated digital logic are located within SoC 130 rather than within the image sensor 824, thus making the image sensor and its associated circuitry smaller, less complex and more power efficient. Implementing the ADCs and image processor within SoC 130 is also more cost effective and produces a better yield. Optionally, digital formatting may be performed after ADC 837 and before the image processor.

Analog Only Transport from Video Source to Display

This embodiment provides for analog transmission of video samples from a video source to the SoC, and then analog only processing within, and transmission through, the SoC and eventually to the display. Advantageously, no DACs, ADCs, nor digital processing is needed once the video information is transmitted from the video source.

Figure 4B:
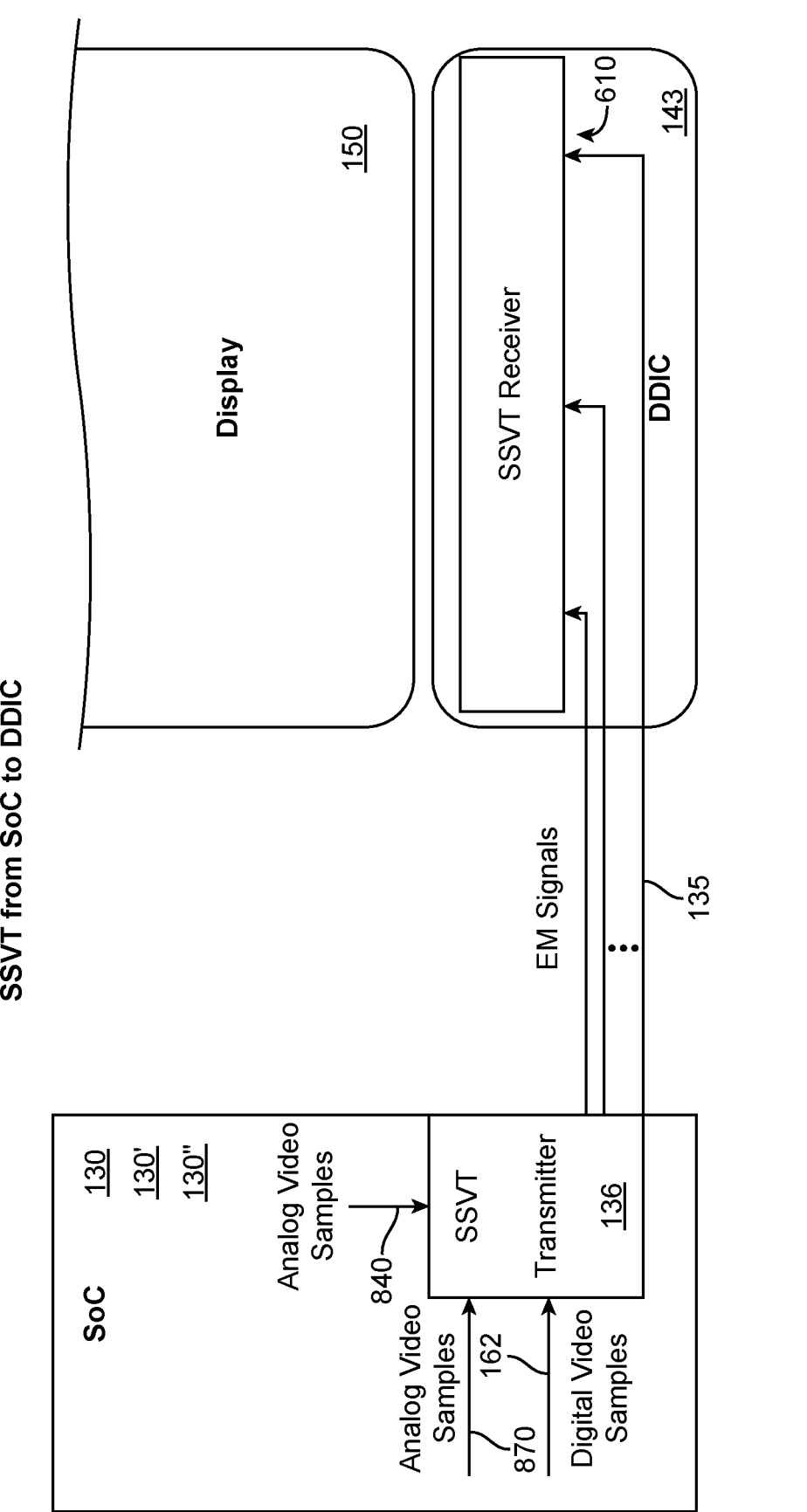
FIG. 4B illustrates in greater detail video transport from a system-on-a-chip to a novel DDIC of a display using SSVT.

This path delivering EM signals 125 from the video source to the display may be within SoC 130' or outside of it via a separate path; shown is the path within the SoC. If the stream is needed both within the SoC and outside of it, the stream may be split within the SoC to create a separate, outside path, in which case the SSVT and SAVT transmitters 136 of FIGS. 4A and 4B are also located outside of SoC 130'.

Figure 3B:
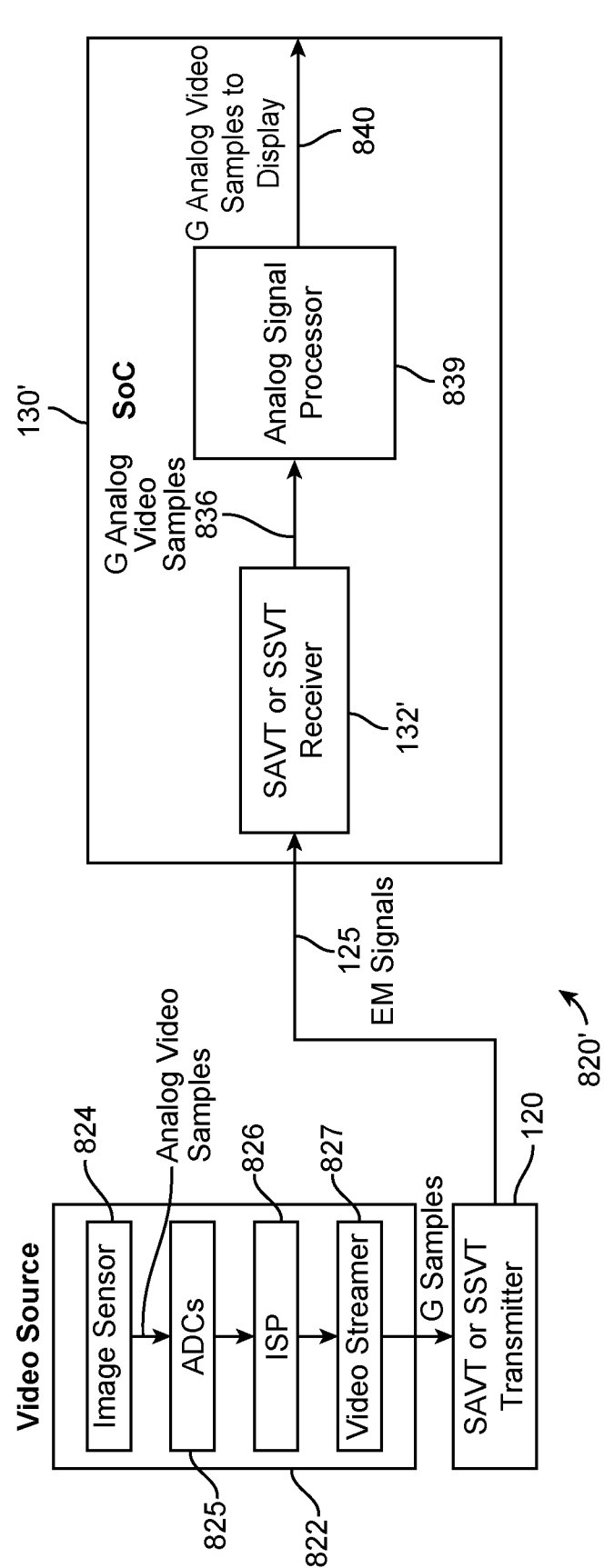
FIG. 3B illustrates transport of analog video samples from a video source to an SoC using analog processing only within the SoC in which only the green channel is transmitted.

FIG. 3B illustrates transport of analog video samples from a video source to an SoC using analog processing only within the SoC in which only the green channel is transmitted. Similar to FIG. 3A, system 820' includes a video source 822 and an SoC 130'. As above, sensor 824 and transmitter 120 operate to transmit analog levels 125 to the SoC 130'. Within the SoC, though, the analog video samples are kept in the analog domain and eventually transmitted to the display; there is no digital processing of the samples within the SoC. Advantageously, this analog bypass circuitry needs no ADCs nor digital logic (nor do the samples need to be converted back to analog at some point), thus simplifying the circuitry and maintaining the quality of the original analog samples, not to mention improving image latency. The SoC 130' may contain exclusively this analog bypass in order to deliver the analog samples to the display, or may also include the circuitry of SoC 130 of FIG. 3A if it is desirable to use digital logic of the SoC in order to digitize images, collect statistics from the image, analyze the image in order to control the camera (e.g., provide exposure compensation back to camera), etc. If the digital circuitry of SoC 130 is also present within SoC 130' then the digital video samples 162 are not sent to the display (only analog video samples 840 are) they only use for statistics, analysis, etc.

In this embodiment the analog samples coming from the sensor 824 are converted to digital in ADCs and then "demosaicing" is performed within the image signal processor (ISP), resulting in digital RGB samples per pixel. Only the green channel (i.e., one G sample per element of the array) is sent from the camera to the SoC 130' (using either SSVT or SAVT). As the green channel corresponds to the luminance (or "luma") channel there will be no loss of perceived resolution, although the display will show a monochrome image. Further, the image latency on the display is greatly reduced providing immediate feedback to the viewer for applications where near-eye displays are used such as virtual reality, augmented reality, etc.

Figure 16:
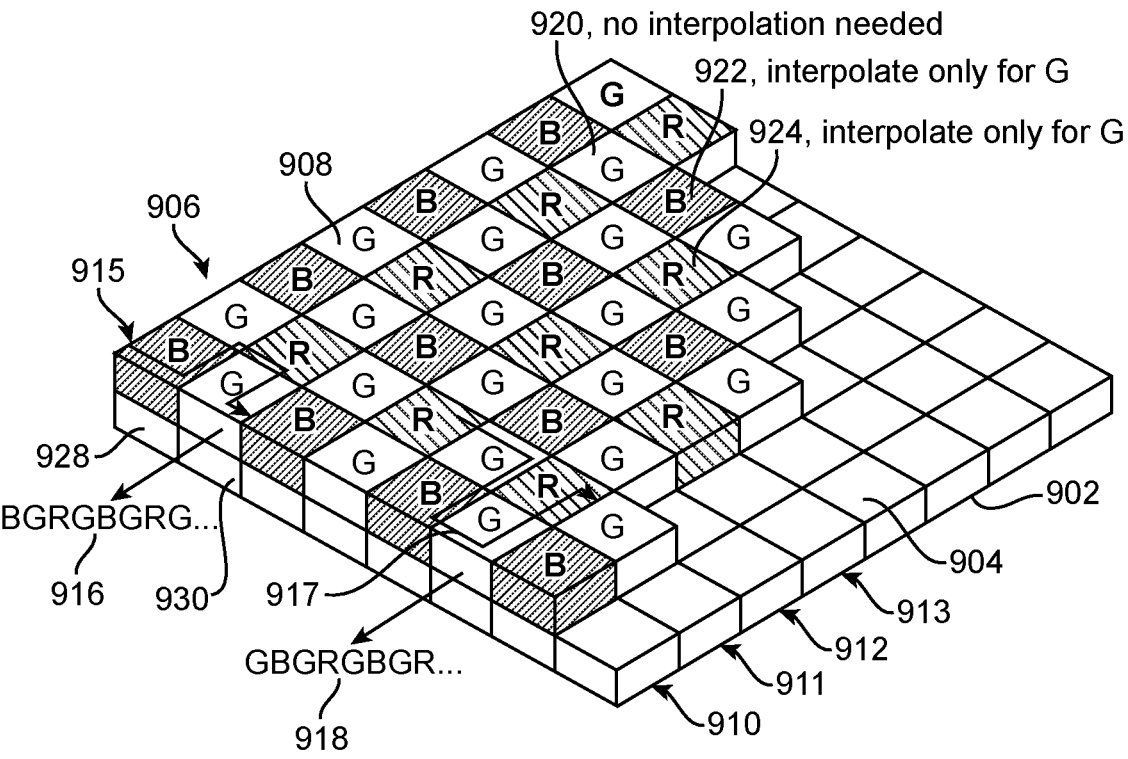
FIG. 16 illustrates an image sensor with a modified readout.

Alternatively, as only the green channel will be sent, interpolation only need be performed at the R and B elements of the sensor in order to obtain their G sample; no interpolation is needed at the G elements because the G sample already exists and the R and B sample at those G elements are not needed. For example, FIG. 16 shows an array of RGB filters; path 915 includes four elements BGRG in the lower-left corner. Only the R and B elements need to have interpolation performed in order to obtain their G sample, thus making interpolation simpler and quicker.

The digital video samples (i.e. only the G samples) are input into transmitter 120 and then transmitted as analog levels via one or more (P) electromagnetic signals 125. As mentioned before, and as will be described in greater detail below, transmitter 120 may use SAVT or SSVT. As such, the digital video samples 239c are input into the SAVT transmitter of FIG. 5A, or the samples 437c are input into the SSVT transmitter of FIG. 12. In the case of SSVT, the analog levels will be an encoded representation of the digital video samples, while in the case of SAVT, the analog levels will represent the digital video samples themselves. Transmitter 120 may be located in any suitable location: integrated within the die of image sensor 824, within the camera or video source 822, or in close proximity to the video source.

In either case, analog levels from an SAVT transmitter are transmitted to an SAVT receiver 132' located within the SoC 130', or analog levels from an SSVT transmitter are transmitted to an SSVT receiver 132' located within the SoC. As such, the rows of G analog video samples 239c are output from the SAVT receiver of FIG. 5B, or the rows of G samples 85c are output serially from the SSVT receiver of FIG. 13.

In this embodiment, the receiver 132' (and the path of these analog samples in the SoC) does not include any ADCs, thus outputting the original green analog video samples into ASP 839. Once these green analog video samples are received within ASP 839, tone curve mapping is used in order to make the best use of the sub-pixel's intrinsic dynamic range, with respect to human differentiation of brightnesses. Analog signal processor (ASP) 839 may also perform other analog signal processing such as gamma correction in order to prepare the G analog video samples for presentation on the display. Typically, SDR (standard dynamic range) signals may be processed by processor 839; HDR (high dynamic range) signals may also be processed.

Advantageously, ASP 839 is located within SoC 130' rather than within the image sensor 824, thus making the image sensor and its associated circuitry smaller, less complex and more power efficient. Implementing the ASP within SoC 130 is also more cost effective and produces a better yield.

These green analog video samples may then be manipulated further within the SoC (if desired) and then finally transmitted to the display 150 as described below with reference to FIG. 4A or FIG. 4B. Once the green samples are received at the display 150, they are driven onto the display using either the SAVT receivers of FIG. 6 or the SSVT receiver of FIG. 15, depending upon whether SAVT or SSVT is used for transport.

Analog Only Transport from Image Sensor to Display

This embodiment provides for analog transmission of video samples from the image sensor to the SoC, and then analog only processing within, and transmission through, the SoC and eventually to the display. Advantageously, no DACs, ADCs, nor digital processing of the samples is needed once the video information is transmitted from the sensor.

This path delivering EM signals 125 from the video source to the display may be within SoC 130" or outside of it via a separate path; shown is the path within the SoC. If the stream is needed both within the SoC and outside of it, the stream may be split within the SoC to create a separate, outside path, in which case the SSVT and SAVT transmitters 136 of FIGS. 4A and 4B are also located outside of SoC 130".

Figure 3C:
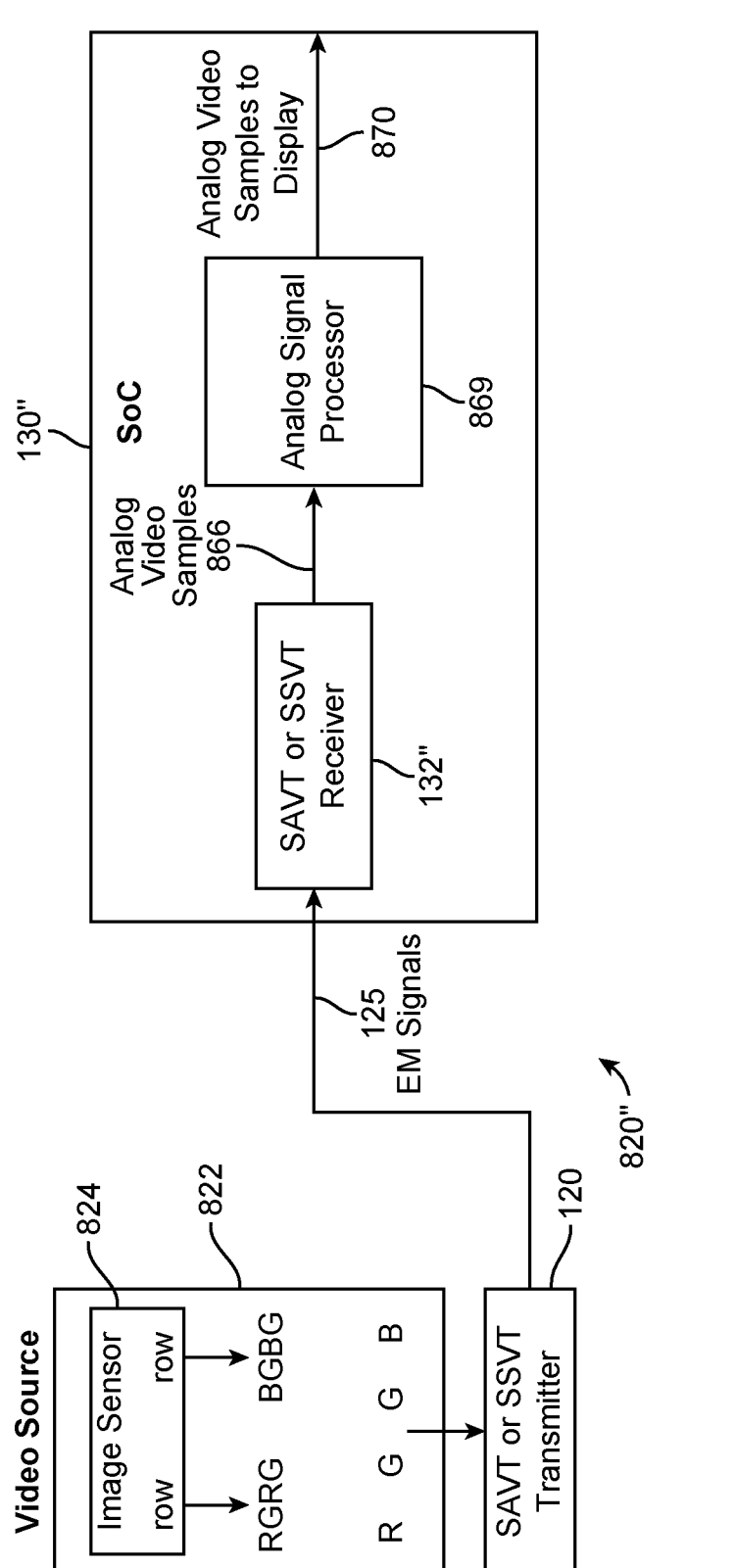
FIG. 3C illustrates transport of analog video samples from a video source to an SoC using analog processing only within the SoC in which the image sensor is read out in a different manner.

FIG. 3C illustrates transport of analog video samples from a video source to an SoC using analog processing only within the SoC in which the image sensor is read out in a different manner. Similar to FIG. 3A, system 820" includes a video source 822 and an SoC 130'. In this embodiment, though, there are no ADCs in the video source. In this second technique for handling the output from the sensor 824, the image sensor is read out in a different fashion, thus dumping the raw information from the image sensor to the SoC. As described in more detail in FIG. 16, in this second technique two rows of the array are read out at a time in order to facilitate processing in the analog domain, e.g., performing "demosaicing" in the analog domain. Using this technique, the RGB samples for each G pixel will be created by color interpolation occurring in the analog signal processor 869 of the SoC. Further, no DACs or ADCs are needed within the video source, transmitter, receiver, or SoC.

FIG. 16 illustrates an image sensor with a modified readout. As shown, the image sensor includes a pixel array 902 consisting of any number of elements 904 arranged in rows and columns. A color filter, such as a Bayer color filter 906, is arranged above the pixel array 902 such that each element senses a particular color, such as element 928 sensing B or blue as is known in the art. Prior art image sensors read out each row at a time resulting in a serial output such as BGBGBG . . . RGRGRG (i.e. the bottom row followed by the next row above it). Such an output results in a series of values where R and B are never side-by-side, making it difficult to perform color interpolation.

Accordingly, we propose modifying the readout from the image sensor and reading at least two rows simultaneously. Shown are the first two bottom rows 910 and 911 that are read out simultaneously which then outputs a serial stream of values such as BGRGBGRG . . . 916 or GBGRGBGR . . . 918. Path 915 shows the readout order: first a blue value from the first row, then green and red values from the second row, followed by a green value from the first row, etc., resulting in serial output 916. Path 917 shows an alternative readout order: first a green value from the second row, then blue and green values from the first row, followed by a red value from the second row, etc., resulting in serial output 918. Other readout orders may be used that intermix color values from two adjacent rows and the order of the pixel values may vary depending upon whether a particular row starts with a red, green or blue value.

Since two rows are read out at a time, every four values of those two rows (e.g. BG from the beginning of 910 and GR from the beginning of row 911 i.e., two Gs an R and a B) are available to output serially, thus resulting in a serial pattern such as BGRG . . . or GBGR . . . as shown. After the first two rows are read out, then rows 912 and 913 are read out, etc. Other similar outputs are possible where each grouping of four values includes two green values, a red value and a blue value. The image sensor may be read starting from any particular corner, may be read from top-to-bottom or from bottom-to-top, may be read by rows or by columns, or in other similar manners. Thus, the output from the video source is a series of values 916, 918, or similar. "Demosaicing" may then occur in the analog domain in the SoC using this series of values without the need to convert these values to digital nor use any digital processing.

Such an ordering of color values facilitates interpolation in the analog domain. Other color spaces may be used in which reading out two or more rows at a time and inter-mixing the color values from different rows in the serial output also facilitates color interpolation in the analog domain.

Returning now to FIG. 3C, the video source then outputs a pattern such as in 916 or 918, shown and referred to as "RGGB . . . " in the video source. The RGGB video samples are input serially into transmitter 120 and then transmitted as analog levels. As mentioned before, transmitter 120 may use SAVT or SSVT. As such, the analog video samples 239*a* are input into the SAVT transmitter of FIG. 5A, or the samples 437*a* are input into the SSVT transmitter of FIG. 12. In the case of SSVT, the analog levels will be an encoded representation of analog video samples, while in the case of SAVT the analog levels will be the analog video samples themselves. Transmitter 120 may be located in any suitable location: integrated within the die of image sensor 824, within the camera or video source 822, or in close proximity to the video source.

In either case, analog samples from an SAVT transmitter are transmitted to an SAVT receiver 132" located within the SoC 130", or analog levels from an SSVT transmitter are transmitted to an SSVT receiver 132" located within the SoC via one or more (P) electromagnetic signals 125. As such, the analog video samples 239*a* are output from the SAVT receiver of FIG. 5B, or the samples 85*a* are output serially from the SSVT receiver of FIG. 13.

In this embodiment, the receiver 132" (and the SoC) does not include any ADCs for converting samples, thus outputting the received analog video samples into ASP 869. Once these analog video samples are received within ASP 869, color interpretation is performed.

Figure 17:
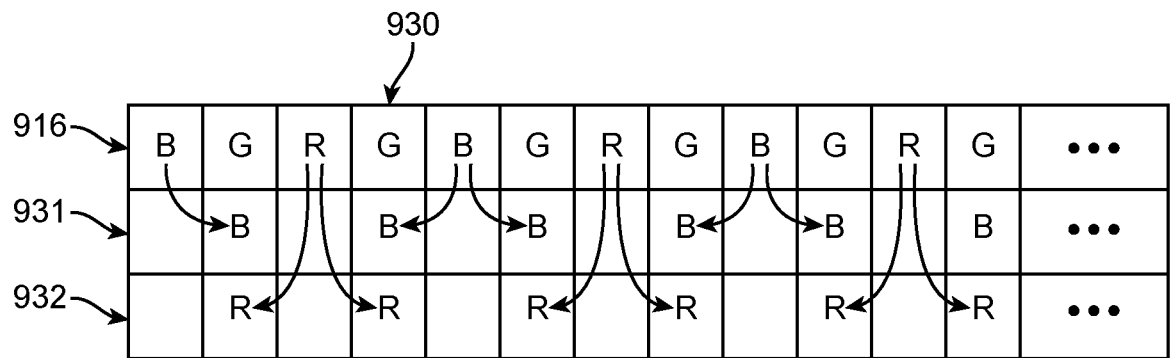
FIG. 17 illustrates color interpretation performed on a series of analog values in the analog domain to produce analog RGB signals.

FIG. 17 illustrates color interpretation performed on a series of analog values in the analog domain to produce analog RGB signals. Shown is the output 916 from FIG. 16, a series of analog values, every four values including an R, two Gs and one B. In order to produce a B value and an R value corresponding to every G value, the B value and the R value on either side of every G value is used to produce a B value 931 and an R value 932 at the location of the G value. For example, considering sensor element 930 which has a G filter and a corresponding G value, a B value and an R value are taken from either side to produce GBR values at the location of sensor element 930. As shown, this interpolation occurs for every element having a G value, thus producing an RGB signal at each G value. This RGB signal may then be sent on to the display thus producing full color albeit at lower resolution.

Analog signal processor (ASP) 839 may also perform other analog signal processing such as gamma correction in order to prepare the analog video samples for presentation on the display. Advantageously, ASP 869 is located within SoC 130" rather than within the video source 822, thus making the image sensor and its associated circuitry smaller, less complex and more power efficient. Implementing the ASP within SoC 130" is also more cost effective and produces a better yield.

Nevertheless, in an alternative embodiment, interpolation may occur in a signal processor (not shown) of the video source rather than in analog signal processor 869 of the SoC. In this embodiment, image sensor 824 outputs a pattern such as in 916 or 918, referred to above as "RGGB . . . " into an analog signal processor of the video source. As described above with respect to FIG. 17, color interpolation in the analog domain is then performed upon these RGGB video samples. Interpolation occurs for every element having a G value, thus producing an RGB signal at each G value. This RGB signal may then be input to SAVT or SSVT transmitter 120 for transmission as EM signals 125 to SoC 130". In this embodiment, ASP 869 may still be present for other processing of the RGB signal if desired.

The analog video samples 870 (whether interpolated within video source 822 or within ASP 869) may then be manipulated further within the SoC (if desired) and then finally transmitted to the display 150 as described below with reference to FIG. 4A or FIG. 4B. Once the samples are received at the display 150, they are driven onto the display using either the receivers of FIG. 6 or the receiver of FIG. 15, depending upon whether SAVT or SSVT is used for transport.

Regarding the B and R samples from each B and R element where interpolation is not performed (e.g., the first and third columns of FIG. 17), they may be simply discarded and not transmitted to the display, they may be sent on to the display and then either ignored or displayed, or a particular value may be transmitted and displayed for each (specific to R or to B, or the same for each) which enhances (or at least does not detract from) the display of the interpolated RGB signals.

SAVT Transport from SoC to Display

FIG. 4A illustrates in greater detail video transport from a system-on-a-chip to a novel DDIC of a display using SAVT. After processing by the SoC 130, 130' or 130", digital video samples 162 are input into an SAVT transmitter 136 (that includes any number of DACs in order to produce analog video samples for output). As mentioned before, a DAC or DACs may precede the SAVT transmitter, in which case DACs internal to the SAVT transmitter are not needed. Depending upon the embodiment, analog video samples 840 or 870 are input in which case no DACs are needed. An SAVT transmitter will output any number of electromagnetic signals 135 that transport the analog video samples to the DDIC.

As shown, the DDIC 140 includes an SAVT receiver 142 (shown as array of any number of separate components 142*a*, *b*, *c* for ease of illustration in FIG. 6 below), each receiver component 142 receiving one of the EM signals 135 and driving its corresponding columns of the display. As mentioned before, the SAVT receiver does not include any DACs for converting video samples. Reference clock 139 originates at the TCON of the SoC (whether on the same IC of the SoC or separate) and in input to DDIC 140 from where it is distributed to each receiver 142.

Figure 5A:
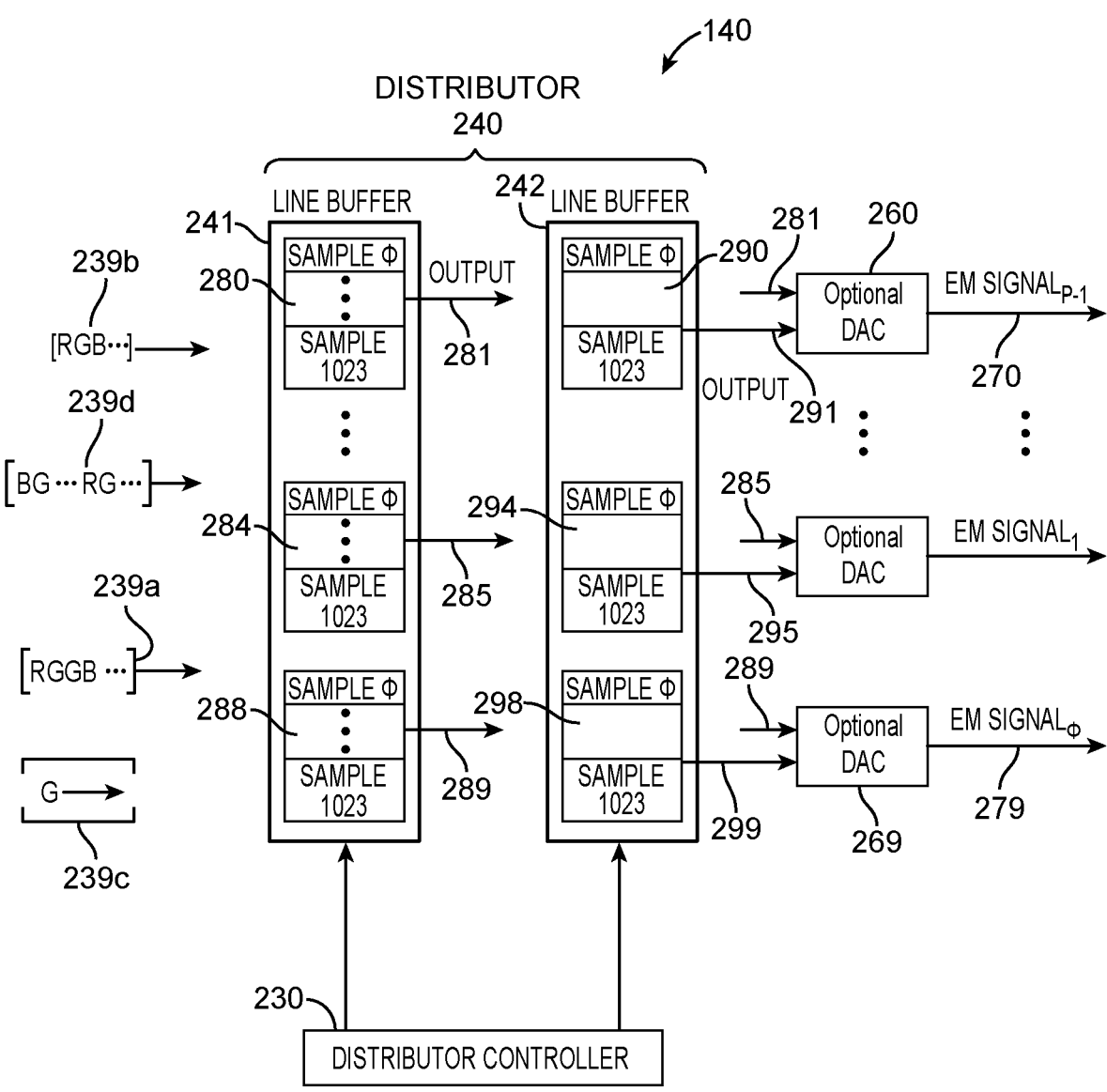
FIG. 5A shows an architecture of an SAVT transmitter within a mobile device.

In the embodiment of FIG. 3A, the digital video samples 162 (i.e., the digital RGB samples after interpolation) are input into SAVT transmitter 136 for transport (shown at 239*b* of FIG. 5A, DACs 260-269 are used). In the embodiment of FIG. 3B, the analog video samples 840 (i.e., only the green channel) are input into the transmitter for transport (shown at 239*c* of FIG. 5A, DACs 260-269 are not used). In the embodiment of FIG. 3C, the analog video samples 870 (i.e., the analog RGB samples after interpolation) are input into the transmitter for transport (shown at 239*b* of FIG. 5A, DACs 260-269 are not used).

SSVT Transport from SoC to Display

FIG. 4B illustrates in greater detail video transport from a system-on-a-chip to a novel DDIC of a display using SSVT. After processing by the SoC 130, 130' or 130", digital video samples 162 are input into an SSVT transmitter 136 (that includes any number of DACs to produce analog levels for output). As mentioned before, a DAC or DACs may precede the SSVT transmitter, in which case DACs internal to the SSVT transmitter are not needed. Depending upon the embodiment, analog video samples 840 or 870 are input in which case no DACs are needed. An SSVT transmitter will output any number of electromagnetic signals 135 that transport analog levels (the encoded form of the analog samples). As mentioned before, typically six electromagnetic pathways are used to transport the analog levels from the SoC to the DDIC. As shown, DDIC 143 includes an SSVT receiver 610 that receives any number of EM signals 135 and drives the corresponding columns of the display. As mentioned before, the SSVT receiver does not include any DACs for converting video samples.

Figure 14:
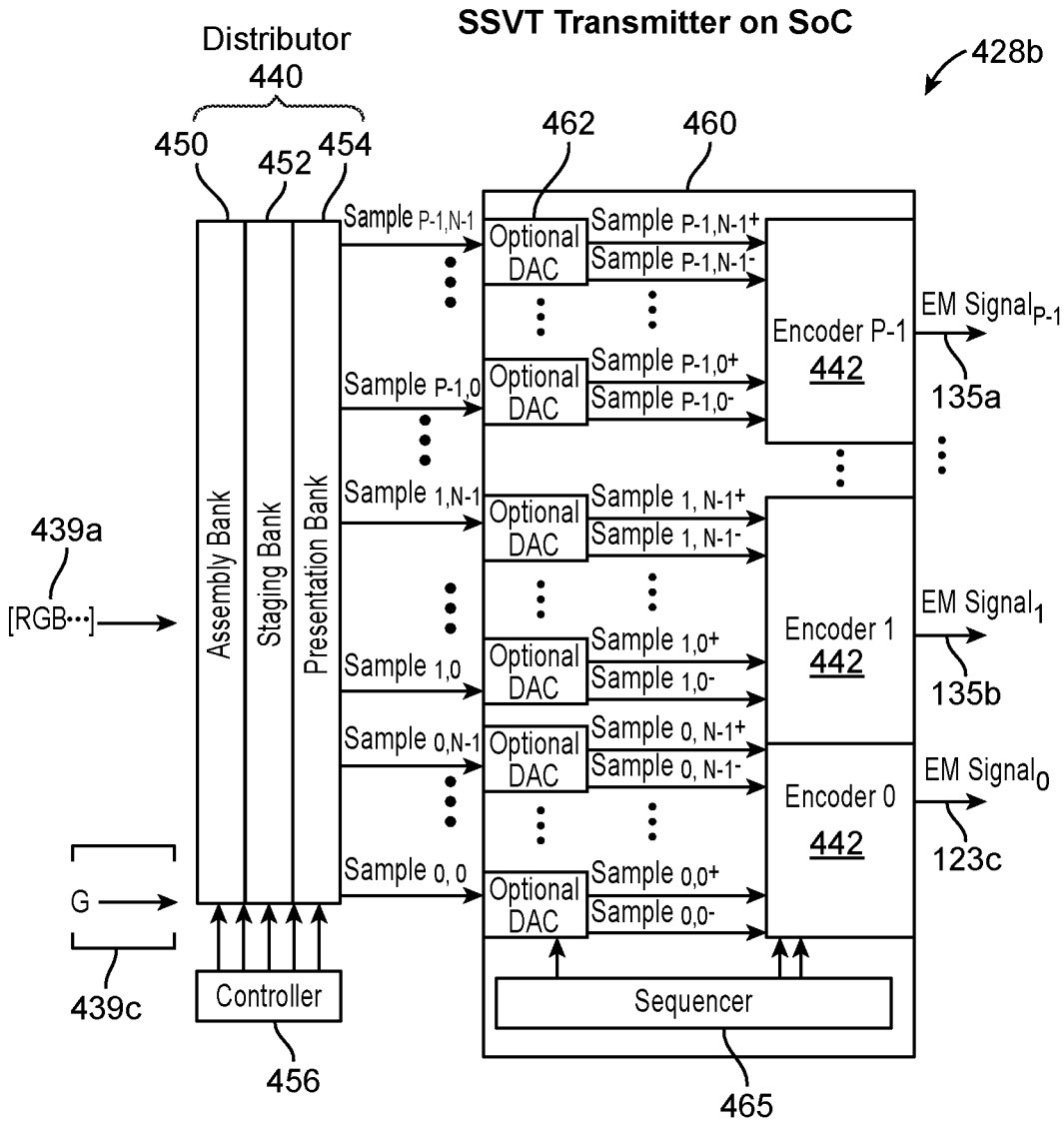
FIG. 14 illustrates in more detail the video transport within a telephone of FIG. 2A or 2B between an SoC and a telephone using SSVT.

In the embodiment of FIG. 3A, the digital video samples 162 (i.e., the digital RGB samples after interpolation) are input into SSVT transmitter 136 for transport (shown at 439a of FIG. 14, DACs 462 are used). In the embodiment of FIG. 3B, the analog video samples 840 (i.e., only the green channel) are input into the transmitter for transport (shown at 439c of FIG. 14, DACs 462 are not used). In the embodiment of FIG. 3C, the analog video samples 870 (i.e., the analog RGB samples after interpolation) are input into the transmitter for transport (shown at 439a of FIG. 5A, DACs 462 are not used).

SAVT Transmitter at Camera or SoC

An SAVT transmitter may be used to transmit video samples obtained from an image sensor to the SoC, and an SAVT transmitter may be used to transmit video samples from the SoC to a display of the mobile telephone.

FIG. 5A illustrates an architecture of an SAVT transmitter 140 which implements SAVT transmitter 120 of a video source. Shown is a distributor 240 that includes two line buffers 241 and 242 having input vectors, a distributor controller 230, optional digital-to-analog converters 260-269, and an analog EM signal 270-279 output from each input vector. In this example there are multiple EM pathways; there may be a single EM pathway or multiple EM pathways. Depending upon the implementation and design decisions, multiple outputs may increase performance but requires more pathways. In order to have as few wires as possible from transmitter 140, only a single pathway transporting a single EM signal 270 may be used.

In general, as a stream of video samples are received at the transmitter 140 from the sensor (using any suitable order), the video samples are repeatedly (1) distributed to one of the EM pathways according to a predetermined permutation (in this example, row major order, i.e., the identity permutation) and (2) sent as an analog EM signal over a transmission medium, one EM signal per EM pathway. As a result, the original stream of time-ordered video samples containing color and pixel-related information is conveyed from video source to video sink. An inverse permutation at a corresponding SAVT receiver effectively outputs the incoming samples in the same order that the samples were received at the distributor. The samples may arrive serially, e.g., R then G then B, or in parallel i.e., RGB in parallel as three separate signals. Using distributor 240, we can reorder the samples as needed.

Depending upon the embodiments discussed above, analog RGGB video samples 239a may be input, analog or digital RGB samples 239b may be input, analog or digital G samples may be input, or analog BGBG . . . RGRG samples may be input. If the samples are digital then DACs 260-269 are used. In general, the transmitter can accept analog or digital video samples from any color space used, not necessarily RGB.

Distributor 240 is arranged to receive the pixel color information exposed in the input sets of samples. The distributor 240 takes the exposed color information and writes multiple input vectors 280-288 into the first line buffer 241 (one input vector per EM pathway) according to the predefined permutation, an input vector being the set of samples of a line buffer corresponding to one of the EM signals 270-279. Once line buffer 241 is full then each input vector 280-288 is read out via its corresponding output port 281-289 onto its corresponding pathway 270-279. As these input vectors from line buffer 241 are being read out (or once line buffer 241 is full) then the next line of input samples are written into input vectors 290-298 in the second line buffer 242. Thus, once the second line buffer 242 is full, samples from the second line buffer 242 are output via their output ports 291-299. This writing to, and reading from, the first and second line buffers continues in this "ping-pong" fashion as long as input samples arrive at the transmitter.

The number of line buffers required depends on the relative time required to load the buffers and then to unload them. There is a continuous stream of data coming in on the inputs 239a, b, c or d. If it takes time T to load all the samples into a buffer and the same time T to unload them, we use two buffers (so that we can unload one while the other is being loaded). If the time taken to unload becomes shorter or longer, the buffer length can always be adjusted (i.e., adjust the number of input vectors or adjust N of each input vector) so that the number of line buffers required is always two. Nevertheless, more than two buffers may be used if desired.

Distributor controller 230 controls the operation and timing of the line buffers. In particular, the controller is responsible for defining the permutation used and the number of samples N when building the input vectors. In this example, N=1024. Of course, the number of input vectors per line buffer and the number of samples N per input vector may vary widely depending upon the embodiment being implemented, the type of signals being input, bandwidth desired, whether the transmitter is implemented at the camera or on the SoC, etc.

Controller 230 may also include a permutation controller that controls distribution of the samples to locations in the input vectors. The controller is also responsible for coordinating the clock domain crossing from a first clock frequency to a second clock frequency. In one particular embodiment, the samples are clocked in at a frequency of $F_{PIXEL}$ and the samples are clocked out from each input vector at a sampled analog video transport (SAVT) frequency of $F_{SAVT}$. It is also possible to clock in two samples at a time instead of one each, or three at a time, etc. The analog samples are transmitted along an electromagnetic pathway of a transmission medium as an analog EM signal 270-279 to the SAVT receiver.

For purposes of explanation, one possible permutation is one in which each of the input vectors includes N samples of color information. The exposed samples of the sets of samples in this example are assigned to input vectors from left to right. For example, the "R", "G", "G" and "B" values of the first set of samples, the "R", "G", "G" and "B" values of the next set of samples, etc. are assigned to input vector 280 in that order (i.e., RGGBRGGB, etc.). Once input vector 280 has been assigned its N samples, the above process is repeated for the other input vectors in order until each of the input vectors has N values. The number of N values per input vector may widely vary. As shown in this example, this predetermined permutation preserves the row-major order of the incoming samples, that is, the first input vector 280 includes sample0 through sample1023 of the first row in that order and the succeeding input vectors continue that permutation. Thus, distributor controller 230 performs a permutation by assigning the incoming samples to particular addresses within the line buffer. It should also be understood that any permutation scheme may be used by the distributor 230, and, whichever permutation scheme that is used by the transmitter, its inverse will be used by the corresponding SAVT receiver. In the situation where only one electromagnetic pathway is used and where the video samples are received at the SAVT transmitter, the distributor writes into one input vector in each line buffer.

A corresponding SAVT transmitter 136 is implemented at the SoC to transmit to a display as shown in FIG. 4A. This transmitter is implemented as is SAVT transmitter 120 described above but with the following additions. SAVT transmitter 136 inputs incoming video samples and distributes them amongst a plurality of input vectors in order to transmit analog video samples in parallel over a plurality of electromagnetic pathways 135 to an SAVT receiver 142 (shown as an array of SAVT receivers 142a, b, c) of FIG. 4A. There may be a single EM pathway or multiple EM pathways and typically there may be six pathways for a mobile telephone. If there are six pathways 270-279 and N=1080 this means a total of 6480 samples per line of the display, which is suitable for a 4K display (4096×2160 pixels) having 2160 pixels horizontally or 6480 sub-pixels in one line. The values of N=1080 and six pathways of FIG. 5A is suitable for the transmitter on the SoC transmitting to the display 150.

At each SAVT receiver component 142a, b or c an incoming analog EM signal is received at an input terminal and each analog sample in turn is distributed via sampling circuitry to a storage cell of a particular column driver using the inverse of the predetermined permutation used in the transmitter. Once all samples for each receiver are in place they are driven onto the display. As a result, the original stream of time-ordered video samples containing color and pixel-related information is conveyed from video source to video sink. The inverse permutation effectively stores the incoming samples as a row in the storage array (for display) in the same order that the row of samples was received at the distributor. It should be understood that any permutation scheme may be used by the distributor 230; and, whichever permutation scheme that is used by the transmitter, its inverse will be used by control logic in each receiver in order to distribute the incoming samples to the column drivers.

In one embodiment, four control signals for every 60 video samples are inserted into the stream of samples in the distributor 240 to be sent to each receiver. As shown, each input vector 280 in the line buffer includes a total of 1024 values, including the four control signals per every 60 video samples. The control signals may be inserted into various positions in the input vector, by way of example, "samples" 960-1023 of the input vectors 280-288 may actually be control signals. Any number of control signals in each input vector may be used. Further, an arbitrary but finite number of control signals is possible. The more control signals that are transmitted, the higher the data transmission rate needed. Ideally, the number of control signals is limited to what fits into the blanking periods so that there can be a correspondence between transmit rate and displayed lines (thus reducing the amount of storage required, or any additional resynchronization). And further, the control signals may be inserted into the stream of samples at the distributor or insertion of control signals be performed in another location.

In one particular embodiment, each line buffer 241 or 242 has input ports for the incoming samples and the samples are clocked in at a frequency of $F_{PIXEL}$; each line buffer also has six output ports, e.g., 281 or 291 (in the case where there are six EM signals, each being sent to one of six receiver components) and the samples are clocked out from each input vector at a sampled analog video transport (SAVT) frequency of $F_{SAVT}$. It is also possible to clock in two R, two G and two B samples at a time instead of one each, or three at a time, etc. In one embodiment, $F_{SAVT}=663.552$ MHz for 24 channels.

SAVT Receiver at SoC

Figure 5B:
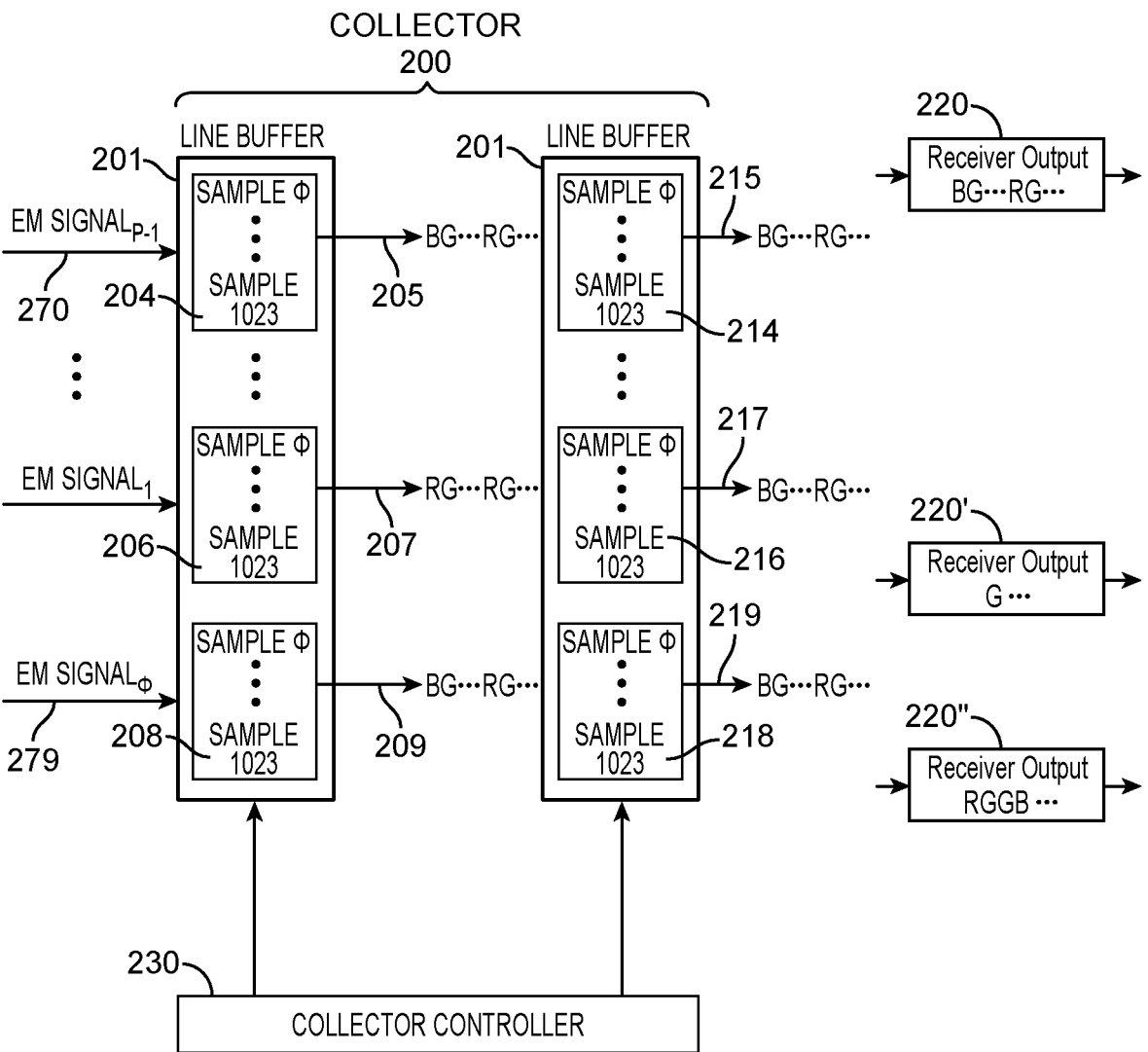
FIG. 5B shows an architecture of an SAVT receiver within a mobile device.

FIG. 5B illustrates an SAVT receiver 132 at the SoC. The receiver receives any number of EM signals 270-279 and inputs those into a collector 200 that has two line buffers 201 and 202. Similar to the distributor of the SAVT transmitter of FIG. 5A, each line buffer has any number of output vectors 204, 206, 208 (or 214, 216, 218), each vector holding any number of video samples corresponding to the input vectors (e.g. N=1024). In operation, each output vector 204-208 of the first line buffer 201 is filled with samples from its corresponding EM signal 270-279 and while buffer 201 is outputting its samples (via outputs 205, 207, 209) into receiver output 220 the second line buffer 202 is being filled from corresponding EM signals 270-279. Once the first line buffer is empty it begins refilling while the second line buffer outputs into receiver output 220.

As with the SAVT transmitter of FIG. 5A, there are preferably two line buffers but more may be used if necessary and the buffer length may be adjusted as mentioned. In the case of collector 200, the output is serial or parallel, and the output from each buffer may be in parallel (i.e., all N samples at a time from each output vector) and may take a longer time to output per sample than does the input sampling. Thus, if you output 100 samples at a time, you can transfer to output 100 times more slowly than the input sampling (assuming the input sampling were one at a time).

The collector controller 230 sequences the loading of samples from the inputs 270 . . . 279, as well as controls the timing for unloading the samples for further processing. Since the input stream is continuous, the collector controller loads samples into one line buffer while the other line buffer samples are transferred to the output for further processing.

Shown is an embodiment of the receiver suitable for use with the embodiment of FIG. 3A in which rows of the image sensor 822 are output serially, sent via the SAVT transmitter shown in FIG. 5A (using input 239d, i.e., BG . . . RG . . . ) to collector 200, and then output from collector 200 in the same format as input, namely, BG . . . RG . . . . Once output, the samples are sent on to ADC 837. As mentioned, the output from collector 200 may be in parallel if parallel input into ADC 837 is desired. Whichever permutation is used in the corresponding SAVT transmitter in order to distribute incoming samples into the line buffers, the inverse permutation is used in the SAVT receiver such that receiver output 220 outputs samples in the order they were received at the SAVT transmitter (i.e., as received at 239d). In embodiments of FIGS. 3B and 3C the collector inputs all G samples or RGGB samples (as the case may be) and outputs these analog samples to the analog signal processor 839 or 869 for further processing via receiver output 220' as [G . . . ]

samples or receiver output 220″ as [RGGB . . . ] samples, corresponding to original inputs 239*c* or 239*a*.
SAVT Receiver in a DDIC FIG. 6 illustrates an architecture of one of the SAVT receiver components 142*c* of FIG. 4A, each of the other receiver components 142*a*, 142*b*, etc. being implemented in a similar manner and driving its respective columns. In this architecture, each amplifier drives adjacent columns and all control signals are handled by a single amplifier, the advantage being that the columns being collected are relatively local to a S/H amplifier. But other permutations of amplifiers with respect to columns are possible, for example, a permutation may be used to minimize the transmission bandwidth to the input (Ainp, Ainn); there are a large number of other possible permutations (maps) from input sample number to column.

Shown is an input terminal 821 which distributes the incoming pixel data and control signals from the SAVT transmitter to S/H amplifiers 824 (inputting the pixel data numbered from 0 to 14) and to amplifier 826 which receives the control signals. The pixel data from amplifiers 824 is transferred to either storage array A 828 or to storage array B 830 as is described above and the control signal is handled by component 836 and output at 838. The pixel data from either storage array is then input into column drivers 832 and output onto the columns 834 as has been described above. Not shown is control logic for controlling the timing of the input amplifiers, storage arrays and column drivers. As the pixel data is received sequentially on a single channel per chip (or possibly multiple channels per chip), it is stored into the A/B collectors sequentially (one Fsavt cycle apart), although it is also possible to store 15 sub-pixels into the array in parallel from the 15 SHA amplifiers. S/H amplifiers 824 perform de-multiplexing (aka de-interleaving) and full de-multiplexing is not complete until the samples have been distributed to each of the columns. The A/B collectors also perform part of this task in that the collectors are sampled sequentially into separate rows (a de-multiplexing function) and then the columns are further processed.

Thus, 15 interleaved S/H amplifiers receive the incoming pixel data and each drives 64 columns which are adjacent, i.e., 64 video tracks, thereby minimizing the span of columns that are driven by each amplifier. This architecture provides 15 blocks of 64 video samples plus one sub-band channel (control signals) of 64 bits per display line (per receiver component). For example, amplifier 0 drives columns 0-63, the second amplifier drives columns 64-127, etc., the 15th amplifier drives columns 896-959 and amplifier 826 drives the control signals. Having all control signals on one channel means no difference in amplitude, delays or other from one signal to the next (if they were on different channels). It is also possible that the control signals arrive on channel zero (i.e., amplifier 0) instead of amplifier 15; that is advantageous in that the control information arrives earlier than the pixel data. Another advantage of this architecture is that control signal extraction needs to look at only one de-interleaving amplifier output rather than be distributed across all amplifiers, simplifying synchronization. Of course, there may be fewer or greater than 15 S/H amplifiers depending upon the implementation.

In this figure there are 15 video amplifiers, each driving 64 subpixels=960 subpixels/chip. There is one channel devoted to control, carrying 64 symbols per line (per receiver component). If we use MFM for timing synchronization, the 64 symbols will be transition encoded, and after accounting for flag and command bits, that will leave 24 or 25 control bits per line.

As shown, the control channel receives a control signal at amplifier 826 which is input to comparator 836 having a reference voltage of 0 V and operating at a 16th of $F_{SAVT}$ or approximately 41.5 MHz. Assuming that the control signals are in the range of −0.5 V up to +0.5 V, the comparator will detect if the control signal is greater than 0 V (meaning a digital 1) or if the control signal is less than 0 V (meaning a digital zero). This digital data is then output at 838 and thus provides a single control bit every 16 samples. Control signals provide synchronization and phase alignment. From an implementation perspective, the comparator may simply be a zero crossing detector, in which case a reference voltage is not required. Reference clock 139 arrives from the TCON.

This particular embodiment is for a 4K 120 OLED display and example parameter values are shown in Table 1 below. One of skill in the art will find it straightforward to modify the architecture, permutation, etc., in order to suit other display sizes and speeds, such as the resolution of various other mobile telephones. One particular example of a source driver is shown in U.S. provisional patent application Nos. 63/447,241 and 63/500,341, and in U.S. patent application Ser. No. 18/442,491 referenced above.

TABLE 1

| Example Values | | |
| --- | --- | --- |
| Parameter | Value | Units |
| Hpix | 3840 | Pixels |
| Vpix | 2250 | Pixels |
| Screen Refresh | 120 | H_z |
| RxChips | 1 | Chips/system |
| Hsubpix | 11520 | Subpixels/line |
| SubpixRate | 2.986 | GSamples/sec |
| SubpixelOverhead | 1.08x | =65/60 (synch. and control overhead) |
| SampleRate per chip | 3.22 | GSamples/sec |
| Ref. Clock Freq. (Fsavt/64) | 50,388,480 | Hz |
| Input Sampling Aperture(Tsavt) | 0.30 | ns |
| Scan Line Duration | 3.46 | us |

Figure 7:
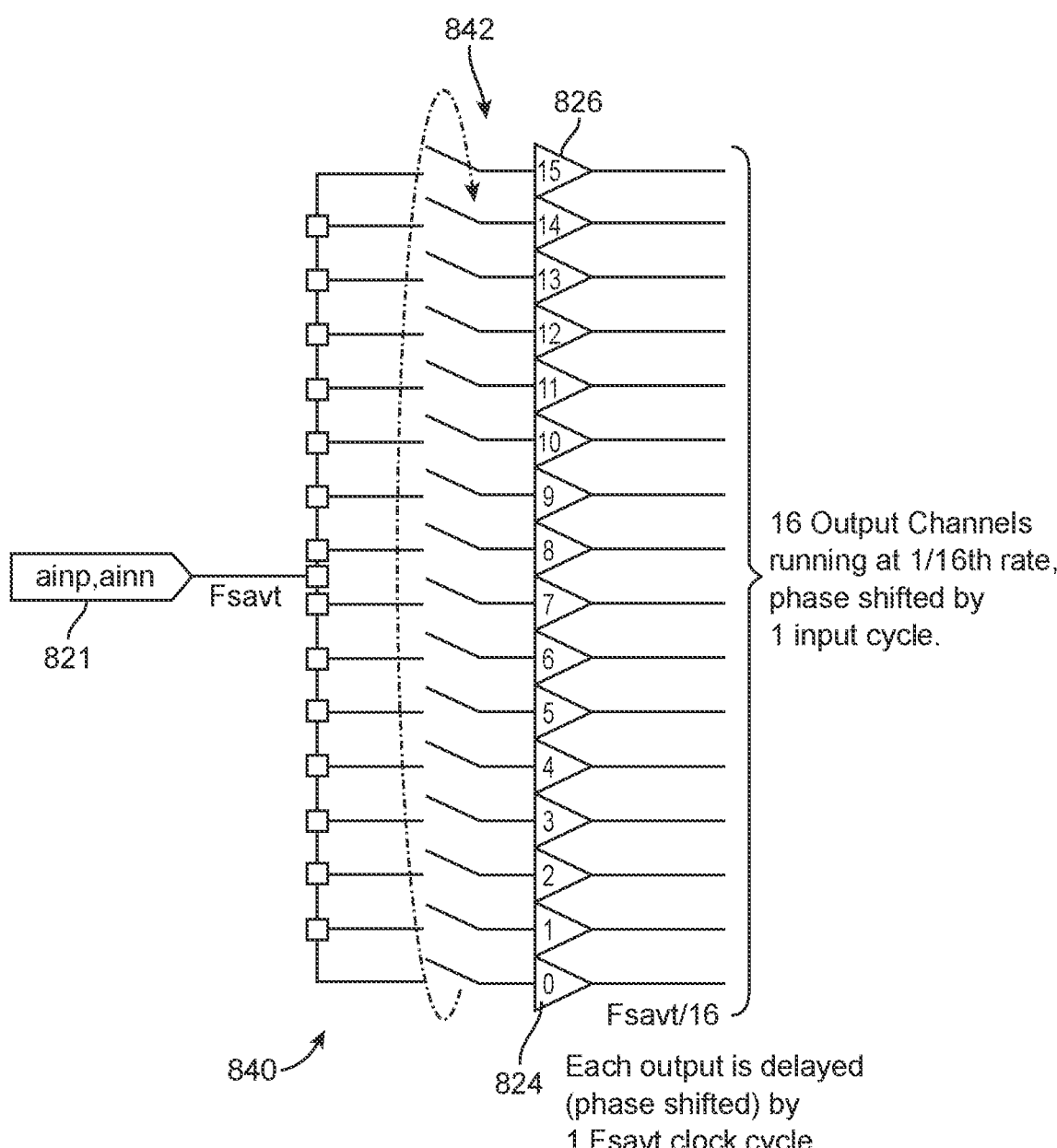
FIG. 7 illustrates an input of an SAVT receiver for interleaving multiple input amplifiers which allows speed requirements to be met.

FIG. 7 illustrates an input of SAVT receiver 142*c* for interleaving multiple input amplifiers which allows speed requirements to be met. (It is possible to use a single amplifier but transmission speed would be reduced.) Shown is the input terminal 821, distribution amplifiers 0-14 824 and amplifier 826 and associated switches 842 which rotate in order to effectively connect one amplifier at a time to receive one of the incoming sub-pixels or control signal, as the case may be. Not shown are sampling capacitors on the inside of the switches, important to achieve the speed required, thus reducing the bandwidth requirements of the amplifiers themselves. Thus, the input is interleaved 16 ways and the outputs of the switch are de-multiplexed into 16 channels running at ¹⁄₁₆ the data rate. Each of the 960 sub-pixels in a line are conveniently grouped into 15 groups of 64 sub-pixels each and one channel is dedicated for detection of, and handling of, control signals.

FIG. 8 is a summary of a pixel transmission order 300 showing how pixels 0-959 and control signals 0-63 are transmitted from the SAVT transmitter 136 of the SoC to the receiver 142*c* of FIG. 6 and to which amplifier each is assigned. Shown is the natural order of sub-pixels as delivered via CEDS (clock-embedded differential signaling), for example, the sub-pixels arriving as read from left-to-right and then from top-to-bottom. Because of the 16-way interleaving of the input data at the receiver, the preferred method of transmitting the sub-pixels to the receiver is starting at the top left from top-to-bottom and then from left-to-right, i.e., the indices of the sub-pixels (and control signals) transmitted are 0, 64, 128, etc. Shown are indices for the S/H amplifiers 302, an example of a sub-pixel index 304 and control track 306 of the 16th amplifier.

In this permutation, 15 of the amplifiers (0-14) each drive 64 adjacent columns with sub-pixel values, while amplifier 15 handles all 64 of the control signals. This variation minimizes the hardware in the receiver and also minimizes the wiring load on the input amplifiers. Further, this variation allows for the slowest possible SAVT transmission rate as padding is not required in the data sequences. In order to best display text and other sharp transitions in intensity, it is preferable that the sampling amplifiers should be able to settle to a new value every 1/Fsavt, or approximately 1.5 ns per sample. In order to implement this architecture, the sequence of sub-pixel indices for transmission in a transmitter is: 0, 64, 128, . . . 832, 896; 1, 65, . . . 897; . . . ; 63, 127, 191, . . . 895, 959.

FIG. 9 is a block diagram of an input vector 320 of an SAVT transmitter having a predetermined permutation that provides for the sequence of sub-pixel transmission required by FIG. 8. As described earlier, as the sub-pixels arrive in the distributor from the timing controller they are distributed into input vector 320 in the order shown. When full, the samples in the input vector are then output via output port 321, converted if necessary, and then transmitted to an SAVT receiver having an architecture as is described in FIG. 6. Not shown are other input vectors of the line buffer; each input vector will have a similar permutation and the receivers corresponding to each input vector will have the same architecture as shown in FIG. 6.

The above architecture of receiver 142c along with the above transmission order provides the advantages above and also retains the slowest possible SAVT clock rate. Accurate sampling of each sub-pixel within the time available may be provided by synchronization.

Figure 10A:
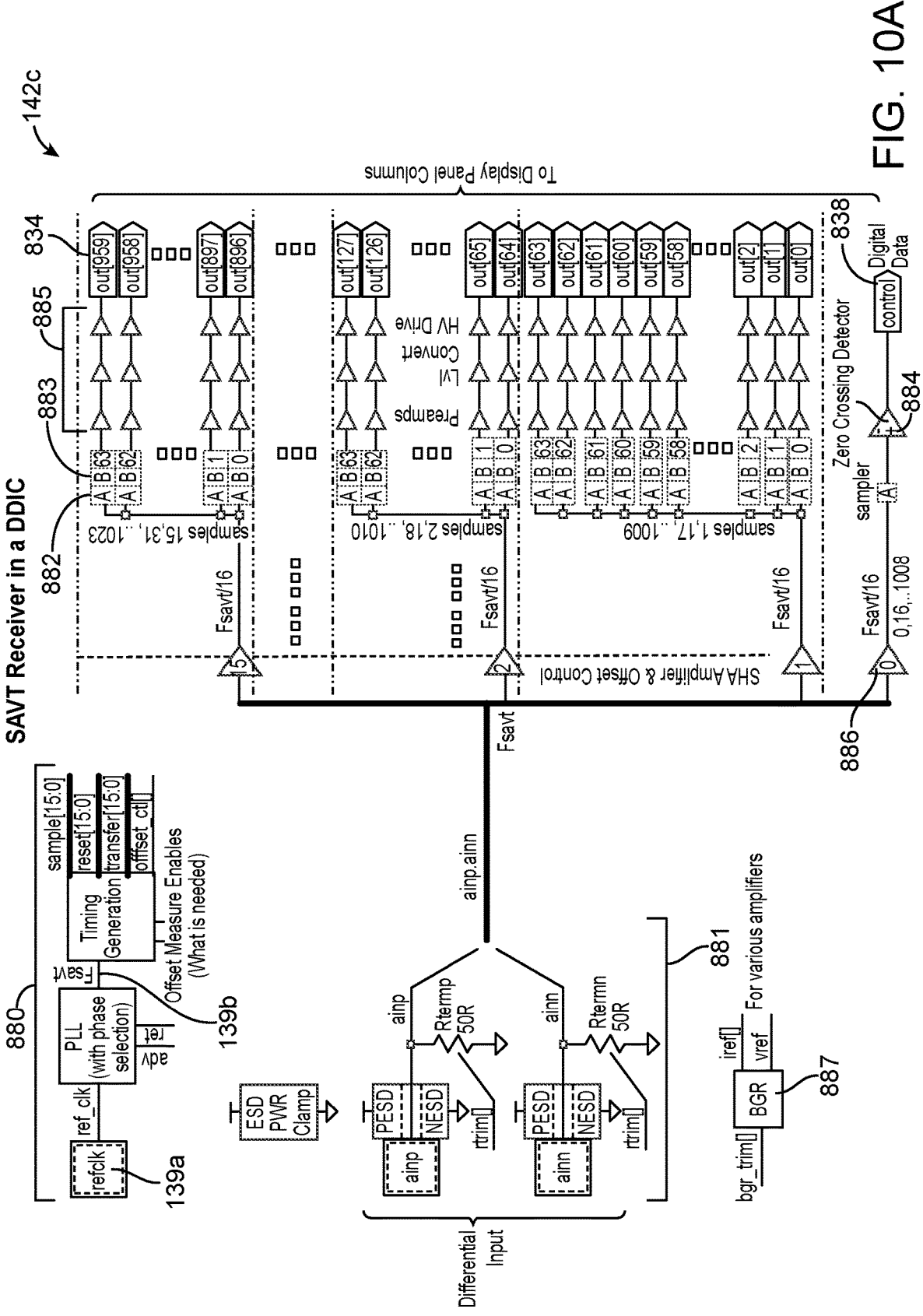
FIG. 10A illustrates another embodiment of one of the SAVT receiver components of the DDIC of FIG. 4A.

FIG. 10A illustrates another embodiment of one of the SAVT receiver components 142c of the DDIC of FIG. 4A, each of the other receiver components 142a, 142b, etc. being implemented in a similar manner and driving its respective columns.

Shown is timing generation 880, input terminal 881, and sampling blocks 882, 883. Comparator 884 is a comparator for control signal extraction. Amplifier 885 is an amplifier stage including a pre-amplifier, level conversion and a high-voltage driver. Shown are 16 interleaved sampling amplifiers with offset cancellation (SHA amplifier and offset control) including amplifier 886. Preferably, in this embodiment we use amplifier 0 (886) for control signals (rather than amplifier 15 as in FIG. 6) so that the control information arrives with time to spare before the end of the display line time. This provides for a small amount of time to decode the control channel and set up signals that will be used within the next line time.

In this embodiment, it is realized that synchronization requires only a single comparator 884 (a zero crossing detector) on a single SHA channel and does not need DACs to set comparison thresholds. The algorithm for synchronization runs in the digital domain (the zero crossing detector output) and can perform both clock-level synchronization (alignment of SHA outputs so that the side-channel is seen on one particular SHA output) and phase-level synchronization (choosing the optimal sampling phase within a clock cycle).

At input terminal 881, there is one analog input differential with 50 ohms termination (100R differential) and ESD protection. This is driven by a 50R source impedance per side through a 50R transmission line. Hence, there will be a 50% reduction in voltage received compared to the voltage transmitted. The PLL of 880 multiplies the relatively slow reference clock 139a from the TCON (e.g., Fsavt/64) up to the full speed Fsavt clock 139b (e.g., approximately 675 MHz) with 11 phases, selectable per clock cycle. There is also high-speed timing generation to generate sampling strobes, reset signals and output transfer strobes for the SHA amplifiers 0-15. A 16-way de-interleaver 840 is built using the SHA amplifiers as shown in FIG. 7; its ON switch rotates such that effectively only one is on at a time. Thus, 16 consecutive samples are de-interleaved across 16 amplifiers sequentially, allowing each amplifier more time to settle. As shown, each of 15 SHAs drive 64 adjacent sub-pixel columns, consisting of pre-amplifiers, level shifters (differential to single ended) and high-voltage drivers to drive the display columns. One of the SHAs drives control samples (note that each control sample is 16 samples apart). The control samples represent digital values to make the system robust, using transition coding (MFM) to provide timing and control information. Bandgap voltage reference circuit 887 provides current and voltage references for the various input amplifiers.

Figure 10B:
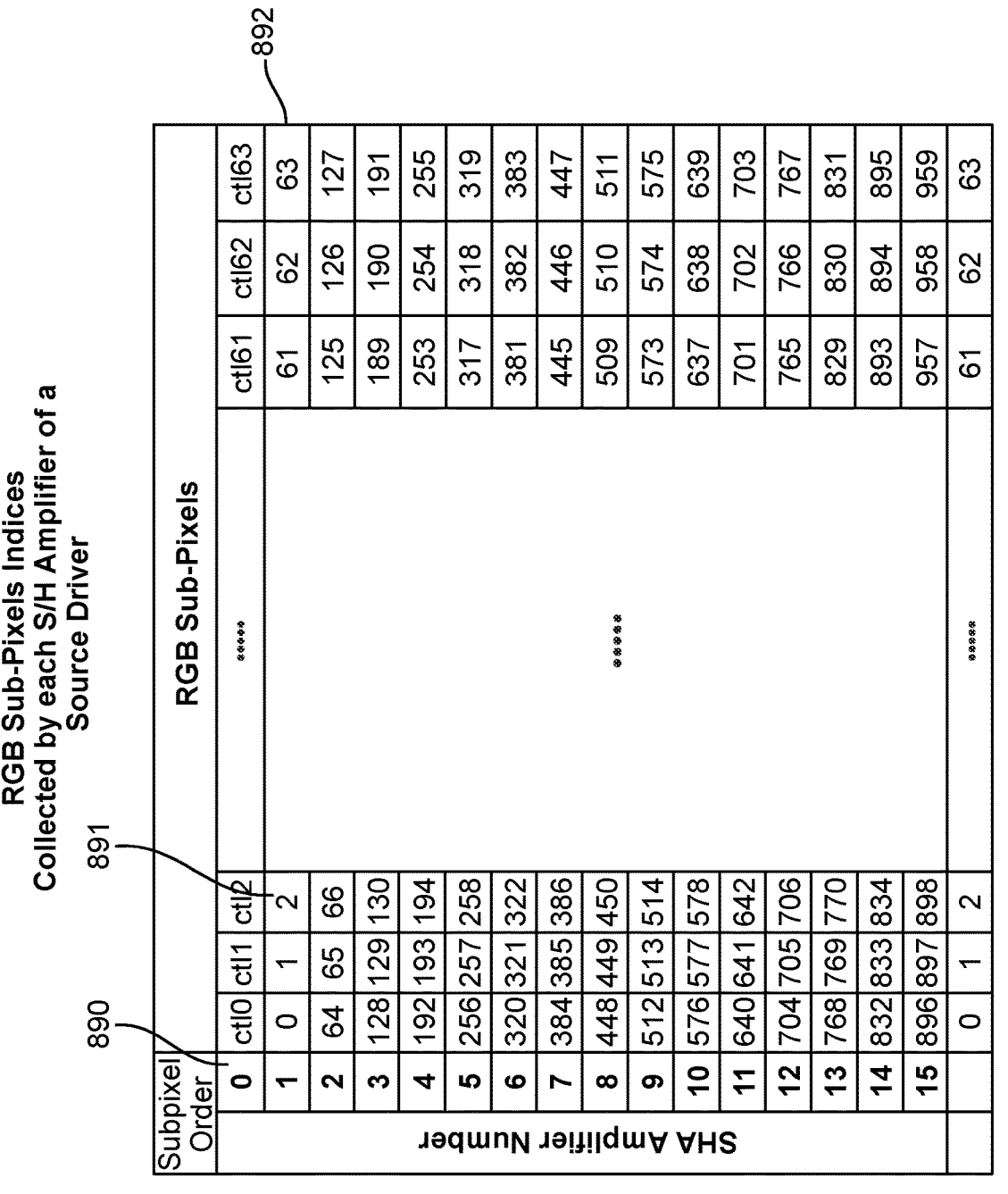
FIG. 10B is a summary of a sub-pixel order collected by the input amplifiers of FIG. 10A.

FIG. 10B is a summary of a sub-pixel order collected by the input amplifiers of FIG. 10A. The summary shows how pixels 0-959 and control signals 0-63 are transmitted to the SAVT receiver of FIG. 10A and to which amplifier each sub-pixel is assigned. Because of the 16-way interleaving at the source driver, the preferred method of transmitting the sub-pixels to the source driver is starting at the top left from top-to-bottom and then from left-to-right, i.e., the indices of the sub-pixels (and control signals) transmitted are ctrl0, 0, 64, 128, etc., to the 16 amplifiers in turn. Shown are indices for the S/H amplifiers 890, an example of a sub-pixel index 891 and control signals 892 of the 0th amplifier 886.

This sub-pixel order minimizes the hardware in the source driver and also minimizes the wiring load on the input amplifiers. In order to best display text and other sharp transitions in intensity, it is preferable that the sampling amplifiers should be able to settle to a new value every 1/Fsavt, or approximately 1.5 ns per sample. As shown, SHA 0 carries control and timing; SHA 1-15 carries video data such that each SHA drives 64 adjacent columns of the display. Since the SHAs are sequentially sampled, this leads to a transmission order of: CTL[0], V[0], V[64], . . . V[896], CTL[1], V[1], V[65], . . . V[897], . . . , CTL[63], V[63], V[127], . . . V[959]. The order provides 64 control bits per line and 960 video samples per line and a total of 1,024 samples transmitted per line (per SAVT receiver).

As mentioned above, other permutations are possible. Another possible permutation (not shown) minimizes SAVT bandwidth requirements and thus uses a permutation whereby all the sub-pixels of each color are transmitted as a group, with blanked transition bands between groups to lower the bandwidth between groups. By way of example, all of the red sub-pixels are first transmitted from the SAVT transmitter to the receiver 142c, followed by the green, then the blue sub-pixels.

Video Transport System Embodiment

Figure 11:
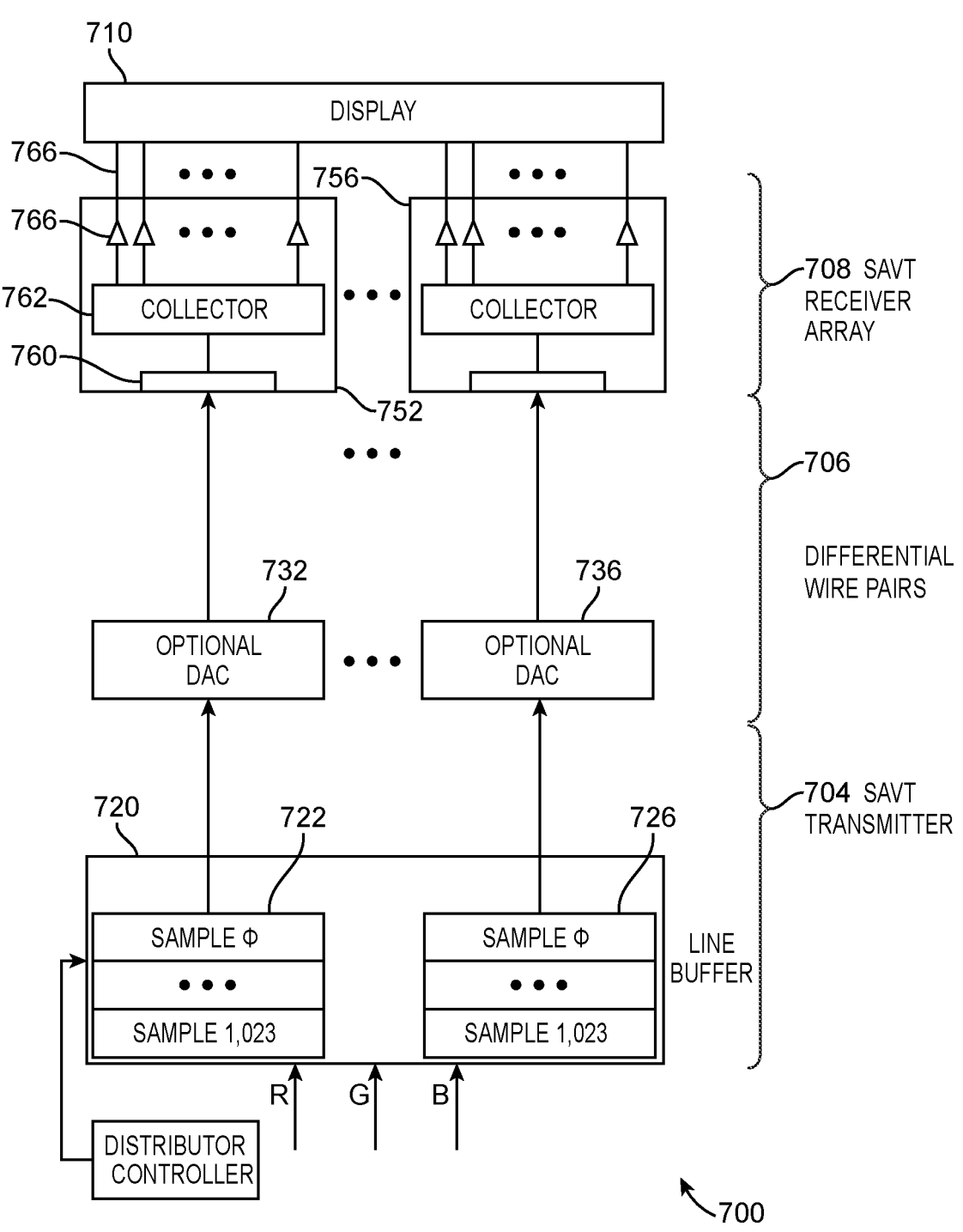
FIG. 11 illustrates a video transport system within a mobile device.

FIG. 11 illustrates a video transport system 700 within a mobile device. This figure provides a high-level view of the transport from SAVT transmitter 136 of the SoC to the SAVT receiver array 142 of the DDIC 140. An SoC outputs sets of color samples as described above, such as sub-pixel values in digital or analog form representing brightness values from an image or video to be displayed upon display 710. The samples are input into SAVT transmitter 704, converted into analog (if necessary) and transmitted over twisted pair wires or traces, cables, or suitable EM pathways 706 within a mobile telephone to an SAVT receiver array 708 for display upon display 710.

A distributor of the transmitter includes line buffer 720, any number of input vectors (or banks) 722-726, and a distributor controller 728. The RGB samples (or black-and-white, or any other color space) are received continuously at the distributor and are distributed into the input vectors according to a predetermined permutation which is controlled by the distributor controller 728. In this example, a row-major order permutation is used and the first portion of the row of the incoming video frame (or image) from left to right is stored into input vector 722, and so on, with the last portion of the row being stored in input vector 726. Accordingly, line buffer 720 when full, contains all of the pixel information from the first row of the video frame which will then be transported and displayed in the first line of a video frame upon display panel 710. Each input vector is read out into its corresponding DAC 732-736 (if necessary) and each sample is converted into analog for transport. As samples arrive continuously from SoC 702 they are distributed, converted, transported and eventually displayed as video on display 710.

Connecting the transmitter 704 to the receiver array 708 are EM pathways of the mobile telephone 706 consisting of differential wire pairs, metallic traces, etc. 742-746, each wire pair transporting a continuous stream of analog samples (an electromagnetic or EM signal) from one of the DACs 732-736. Each differential wire pair terminates at the input 760 of one of the receivers 752-756. Other transmission media (e.g., wireless, optical) are also possible.

Each receiver of the receiver array such as receiver 752 includes an input terminal 760, a collector 762 and a number of column drivers 764 (corresponding to the number of samples in each input vector, in this example, 1,024). Samples are received serially at the terminal 760 and then are collected into collector 762 which may be implemented as a one-dimensional storage array or arrays having a length equal to the size of the input vector. Each collector may be implemented using the storage arrays shown above. Once each collector is full, then all collected samples are output in parallel into all of the column drivers 764 of all receivers, amplified to the appropriate voltage required by the display, and output onto columns 766 using a single-ended format. As samples arrive continuously over the pathways, each collector continues to collect samples and output them to the display, thus affecting presentation of video. In one embodiment, each collector 762 is implemented using the A/B storage cells shown above. In other words, each column of the collector will have a pair of input samplers. The SHA amplifiers may be considered part of collector 762.

SSVT Transmitter at Camera Module

Figure 12:
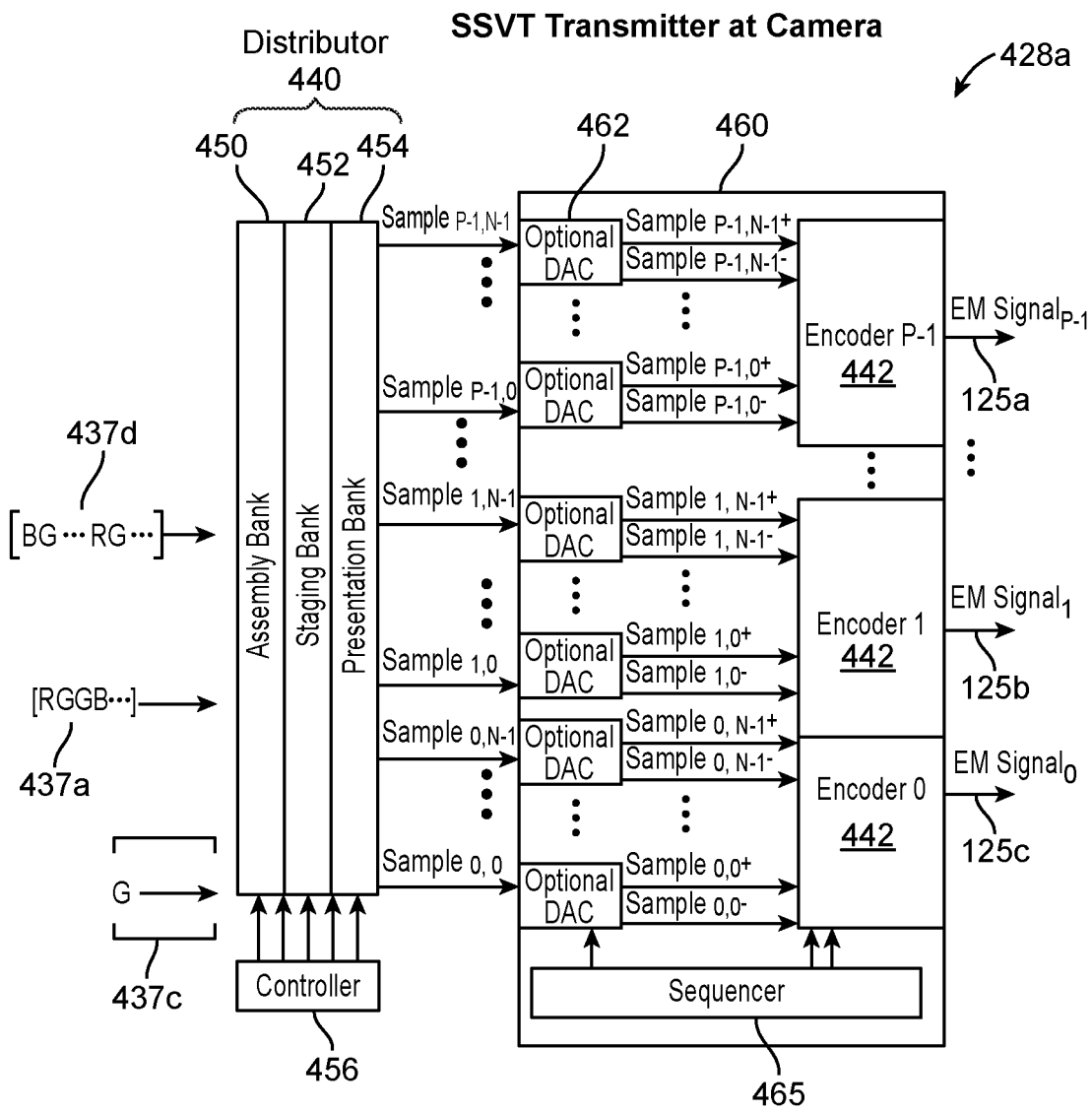
FIG. 12 illustrates a logic block diagram of a specific implementation of an SSVT transmitter at a camera.

FIG. 12 illustrates a logic block diagram of a specific implementation of an SSVT transmitter 428a at a camera. The transmitter may be implemented within the camera itself, within the video source, or located in close proximity to the video source. Distributor 440 includes an assembly bank 450, a staging bank 452, a presentation bank 454 and a controller 456. An encoder block 460 includes a bank of optional digital-to-analog converters (DACs) 462 and three encoders 442, one for each EM pathway of a transmission medium. As mentioned herein, a stream of samples from a single source (such as a camera, image sensor, another sensor, etc.) arrives at transmitter 428a for encoding. As shown, the stream of video samples may arrive in parallel, serially, may arrive in any suitable grouping as shown at 437a-d, and may represent any desirable color space. Each encoder 442 encodes one input vector and produces a series of output levels as an EM Signal. Accordingly, there may be any number (P) of encoders, one encoder per EM pathway.

The distributor 440 is arranged to receive the exposed color information (e.g., RGB) for the stream of sets of samples, one after the other. In response, the assembly bank 450 builds three input vectors $V_0$, $V_1$, and $V_2$ from the exposed color information (e.g., RGB) for the incoming stream of sets of samples. As the sets of samples are received, they are stored in assembly bank 450 according to a predetermined permutation. Distributor 440 may use any number of different permutations when building the vectors containing N samples each and using distributor 240, we can reorder the samples as needed.

The staging bank 452 facilitates the crossing of the N samples of each of the three vectors $V_0$, $V_1$, and $V_2$ from a first clock frequency (or first timing domain) into a second clock frequency (or second domain) used for the encoding and transmission of the resulting EM signals over the transmission medium.

In various embodiments, the first clock frequency can be faster, slower or the same as the second clock frequency. The first clock frequency f_pix is determined by the video format selected by a video source. The second clock frequency f_ssvt is a function of f_pix, the number P of EM pathways in the transmission medium, the number S of samples in each set of input/output samples, and the SSVT transform parameters N (the number of input/output vector locations) and L (the length of each SSDS code), where f_ssvt= (f_pix*S*L)/(P*N). With this arrangement, the input clock (pix_clk) oscillates at one rate, and the SSVT clock (ssvt_clk) oscillates at another rate. These rates can be the same or different. The encoder performs the encoding while the next input vector is prepared. The presentation bank 454 presents the N samples of each of the three encoder input vectors $V_0$, $V_1$, and $V_2$ to the encoder block 460 (e.g., vector $V_0$ includes $Sample_{0,0}$ through $Sample_{0,N-1}$).

Controller 456 controls the operation and timing of assembly bank 450, the staging bank 452, and the presentation bank 454. In particular, the controller is responsible for defining the permutation used and the number of samples N when building the three encoder input vectors. The controller 456 is also responsible for coordinating the clock domain crossing from the first clock frequency to the second clock frequency as performed by the staging bank 452. The controller 456 is further responsible for coordinating the timing of when the presentation bank 454 presents the N samples of each of the three encoder input vectors to the encoder block 460.

Within the encoder block 460, any number of optional digital-to-analog converters (DACs) 462 are provided, each arranged to receive one of the P*N samples ($Sample_{0,0}$ through $Sample_{P-1,N-1}$) assigned to the three encoder input vectors collectively. Each DAC 462 converts its received sample from the digital domain into a differential pair of voltage signals having a magnitude that is proportional to its incoming digital value. The output of the DACs 462 may range from a maximum voltage to a minimum voltage.

The three encoders 442 are provided for the three encoder input vectors respectively. Each encoder 442 receives the differential pair of signals for each of the N samples for its encoder input vector, modulates each of the N differential pair of voltage signals using chips from a code corresponding to each sample, accumulates the modulated values and then generates a differential EM signal output. Since there are three encoders 442 in this example, there are three EM signals 125a, 125b and 125c (Signal$_0$ through Signal$_2$) that are simultaneously transmitted over the transmission medium.

A sequencer circuit 465 coordinates the timing of the operation of the DACs 462 and the encoders 442. The sequencer circuit 465 is responsible for controlling the clocking of the DACs 462 and the encoders 442. The sequencer circuit 465 is also responsible for generating two clock phase signals, "clk 1" and "clk 2", that are responsible for controlling the operation of the encoders 442.

A receiver corresponding to transmitter 428a may be used to receive the output levels, decode, and collect the samples into RGB signals that were input (for example), as will be appreciated by one of skill in the art upon a reading of this disclosure. Analog encoding or digital encoding (and decoding) may be used. DACs or ADCs may precede or follow the encoders (or decoders) as the case may be and as required by an implementation. For example, as each EM signal is a series of analog levels, if digital encoding is used then a DAC follows each encoder. SSVT encoding and decoding may be performed as described in the applications and patents incorporated by reference.

SSVT Receiver at SoC

Figure 13:
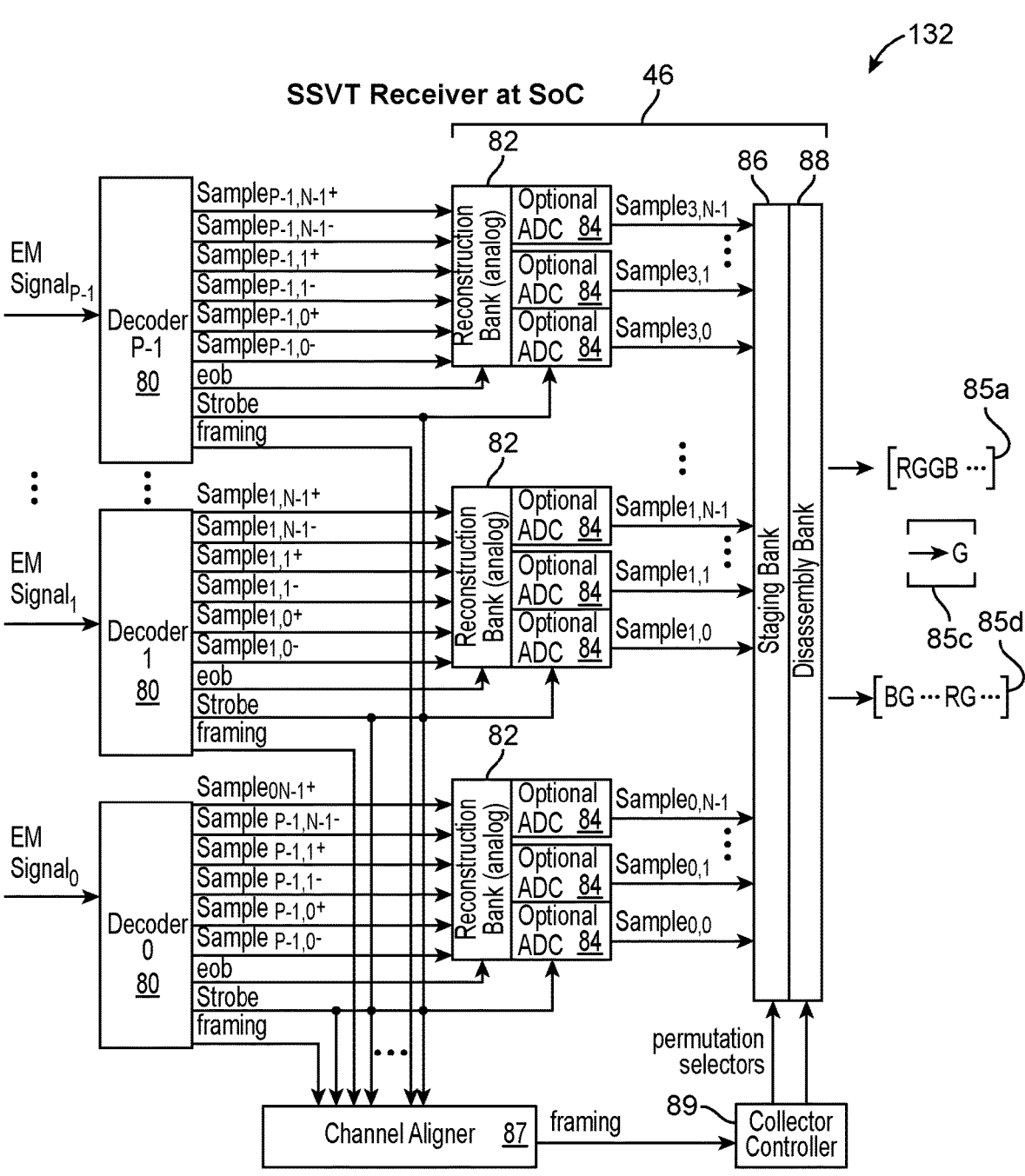
FIG. 13 illustrates a block diagram of a SSVT receiver located at the SoC.

FIG. 13 is a block diagram of SSVT receiver 132 located at the SoC. On the receive side, SSVT receiver 132 is responsible for decoding the stream of differential EM signals received over each transmission medium back into the stream of video samples originally presented to the corresponding SSVT transmitter. After processing within the SoC, the video content (e.g., signals S) contained in the samples can be delivered to and presented on video display 150, frame after frame. As a result, the video captured by the video source is re-created by the video sink. Alternatively, the decoded video information can be stored for display at a later time.

Receiver 132 performs the inverse of the encoding performed by the SSVT transmitter 428a on the transmit side. Receiver 132 uses any number of decoders 80 and a collector 46. The decoders 80 reconstruct the differential EM level signals into three decoder output vectors (in this example). The collector 46 then assigns the samples of the decoder output vectors to the original stream of sets of samples, which each include S reconstructed signals corresponding to the original S.

The P decoders 80 (labeled 0 through P−1) are arranged to receive differential EM level signals Level$_0$ through Level$_{P-1}$ respectively. In response, each of the decoders 80 generates N differential pairs of reconstructed samples (Sample$_0$ through Sample$_{N-1}$). In the case where there are three decoders 80 (P=3), three output vectors V$_0$, V$_1$, and V$_2$ are constructed respectively.

Reconstruction banks 82 sample and hold each of the differential pairs of N reconstructed samples (Sample$_0$ through Sample$_{N-1}$) for each of the three decoder output vectors at the end of each decoding interval respectively. An optional analog-to-digital converter (ADC) 84 is provided for each of the N samples (Sample$_0$ through Sample$_{N-1}$) for each of the three vectors respectively. Each ADC converts its received differential pair of voltage signals into a corresponding digital value, resulting in digital samples (Sample$_{N-1}$ through Sample$_0$) for each of the three vectors respectively. The ADCs operate at a clock rate=f_ssvt/L. Alternatively, each EM signal is input to an ADC before each decoder and the decoding is digital, in which case ADCs 84 are not required.

The collector 46 includes a staging bank 86 and a disassembly bank 88. The staging bank 86 receives all the reconstructed samples (N$_{n-1}$ through N$_0$) for each of the three decoder output vectors. The disassembly bank 88 (a) disassembles the samples (Sample$_{N-1}$ through Sample$_0$) for each of the three decoder output vectors back into the exposed color information (e.g., the S signals) for the stream of sets of samples (e.g., in this example, "S=3 for RGB pixels") using the same permutation scheme as used on the transmit side and (b) crosses the reconstructed samples from the second clock domain back to the first clock domain. The output samples are shown at 85a-d and correspond to the samples that were input into the transmitter at the camera, samples 437a-d. Receiver 132 also includes a channel aligner 87 and a collector controller 89, which receives framing information and aperture information from each decoder 80. The framing signal signifies the timing for constructing video frames on the display panel.

The collector controller 89 coordinates the timing of the staging bank 86 and the disassembly bank 88 to ensure that all the samples presented to the disassembly bank come from a common time interval in which the level signals were sent by the SSVT transmitter 428a. As a result, (a) the disassembly by the bank 88 may be delayed until all samples are received and (b) the individual channels of the transmission medium do not necessarily have to all be the same length since the disassembly bank 88 compensates for any timing differences. The collector controller 89 is also responsible for keeping track of any permutations and making sure that disassembly bank 88 applies the same permutation that was used in constructing the input vectors on the transmit side.

SSVT Transmitter from SoC to DDIC

FIG. 14 illustrates in more detail the video transport of FIG. 2A or 2B between SoC 130 and telephone 100 using SSVT. As shown, SSVT transmitter 428b may input either digital video samples or analog video samples (depending upon which implementation is used as described above, e.g., digital or analog RGB samples 439a or analog G samples 439c) and transmits any number of EM signals 135 to DDIC 143 as shown in FIG. 4B. DDIC 143 is typically a single silicon chip.

As mentioned, the incoming video samples 439a or 439c may be either analog or digital, if analog, there is no need for DACs 462 and the encoding within encoders 442 will be analog encoding, thus outputting the analog output levels of the EM signals. Even if the video samples from the SoC are digital, a DAC or DACs may proceed the SSVT transmitter in which case analog encoding occurs as above. In the case in which the video samples input to the SSVT transmitter are digital, DACs 462 are used in which case analog encoding is used. Or, DACs 462 may be removed, the encoding is digital, and each encoder 442 is followed by a DAC in order to provide the analog output levels. In any case, each EM signal 135 from an encoder transmits SSVT-encoded analog output levels as described herein.

SSVT transmitter 428b may be implemented as described above as is SSVT transmitter 428a of FIG. 12, although the inputs to SSVT transmitter 428b may be different as shown.

SSVT Receiver in a DDIC

Figure 15:
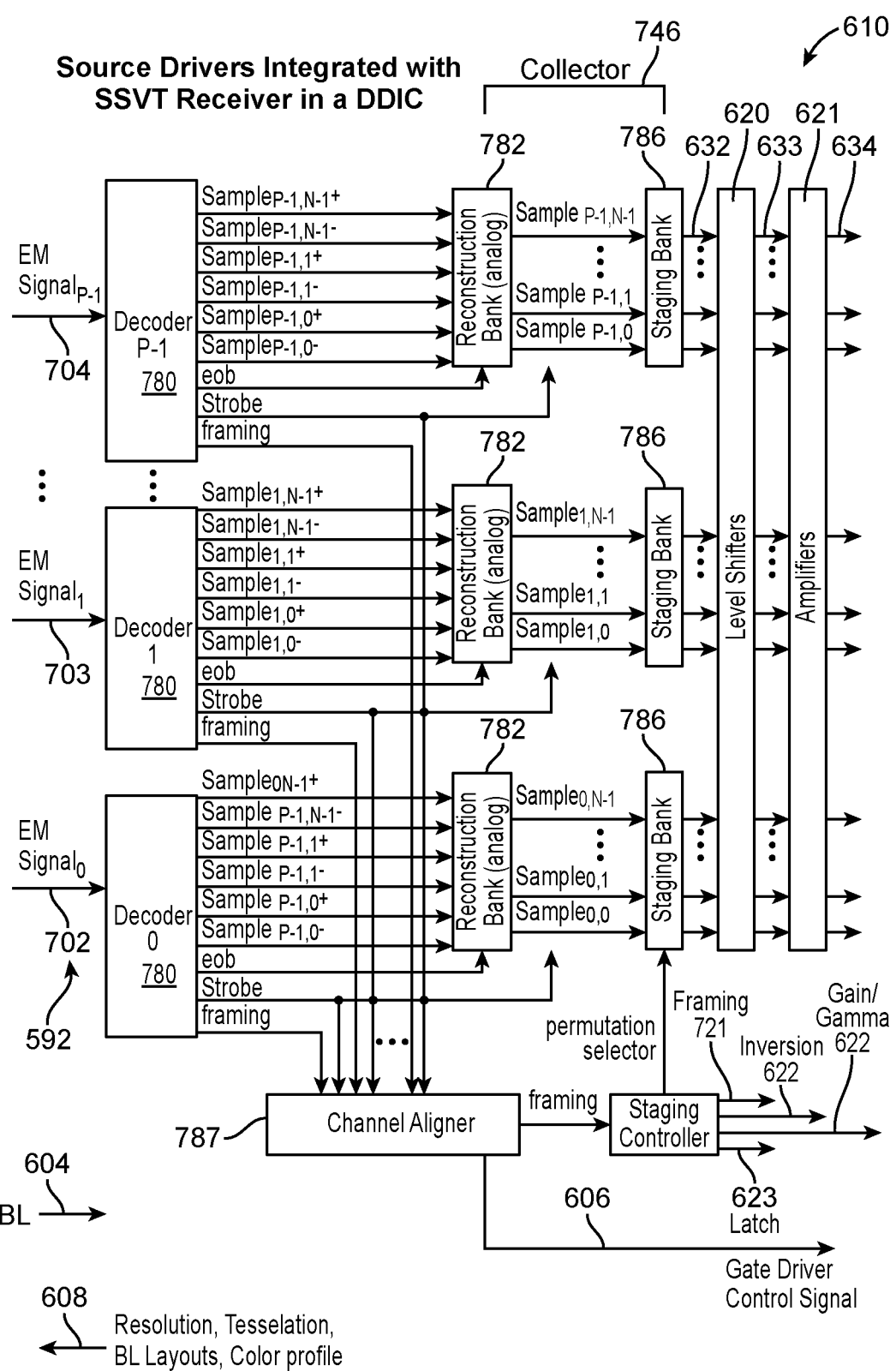
FIG. 15 illustrates in greater detail an SSVT receiver of the novel DDIC.

FIG. 15 illustrates in greater detail an SSVT receiver 610 of the DDIC. As shown, each EM signal 702-704 is input into a decoder 780 where analog decoding is performed, and the recovered analog samples (i.e., voltages) are output directly to the level shifters, amplifiers and finally 634 to the display of the mobile telephone. Effectively, SSVT receiver 610 is made up of circuitry for handling each incoming EM signal, each including a decoder, reconstruction bank, staging bank, and its own level shifters, amplifiers, etc. Each decoder is responsible for decoding the differential analog levels received over the transmission medium back into a format suitable for display. Once in the suitable format, the video content contained in the samples can be presented on a video display, frame after frame. As a result, the video capture from any video source can be re-created by a video sink. As shown, integrated receiver 610 does not require any DACs (for converting digital samples into analog samples for display) as required in prior art source drivers and DDICs.

Each decoder 780 outputs to its corresponding collector (reconstruction bank 782 and staging bank 786). P represents the number of input electromagnetic pairs, each pair carrying an SSVT signal independent from the others, except that they are isochronous signals, known to have been generated in lockstep with one another by encoders on the transmit side. In one particular embodiment, P=6, thus, there are 6 decoders. Each decoder 780 performs the inverse transform of its paired encoder on the transmit side and reconstructs its input differential level signals into an output vector of N reconstructed samples (although single-ended inputs rather than differential inputs may be used). The collector 746 assigns the decoder output vector samples (or, "reconstructed samples") to their predetermined positions in the analog samples 634. These samples 634 will be driven onto columns of the display.

The P decoders 780 (labeled 0 through P−1) are arranged to receive differential EM signals$_0$ through EM signals$_{P-1}$ respectively, 702-704. In response, each of the decoders 780 generates N differential pairs of reconstructed samples (Sample$_0$ through Sample$_{N-1}$). The number of samples, N, is equal to the number of orthogonal codes used for the earlier encoding i.e., there are N orthogonal codes used, meaning N codes from the code book.

Reconstruction banks 782 sample and hold each of the differential pairs of N reconstructed samples (Sample$_0$ through Sample$_{N-1}$) for each of the decoder output vectors at the end of each decoding interval respectively. These received differential pairs of voltage signals are then output as samples (Sample$_{N-1}$ through Sample$_0$) for each of the output vectors respectively. Each reconstruction bank may also convert from a differential pair to a single-ended voltage. As differential pairs are used to maintain accuracy in low voltages (they are more resistant to external influences than single-ended voltages), it can be preferable to convert into single-ended voltages as late as possible in the signal chain (by establishing a reference ground level). Thus, conversion to single-ended voltages need not occur in the reconstruction banks, but may occur later, such as in the column drivers, e.g., within the level shifters. Conversion is typically performed for all signals (samples, control signals, etc.) and may occur in different locations depending upon the signal type and implementation.

Each staging bank 786 receives all of the reconstructed samples (Sample$_{n-1}$ through Sample$_0$) from each of the decoder output vectors and serves as an analog output buffer. Once the samples are moved into a staging bank 786 they are triggered by a latch signal 623 derived from the decoded EM signals. Once the samples are released from the staging bank 786 they are sent to level shifters 620.

Also included are a channel aligner 787 and a staging controller 789 that receives framing information and aperture information from each decoder 780. The framing signal 721 signifies the timing for constructing video frames and is sent on to the display panel. The staging controller 789 coordinates the timing of the staging banks 786 to ensure that all the samples come from a common time interval in which the level signals were sent by the SSVT transmitter. As a result, the individual channels of the transmission medium do not necessarily have to all be the same length since the channel aligner 787 and staging controller 789 compensate for any timing differences. The staging controller 789 also keeps track and provides to the staging banks 286 the proper permutation selection to use.

The SSVT receiver decodes the SSVT signals and outputs numerous reconstructed analog voltage samples 632 in parallel from its collector 746. Because these analog outputs 632 may not be in the voltage range required by the display panel, they may be input into level shifters 620 which shifts the voltages into a voltage range for driving the display 150 using an analog transformation; amplification may occur as well using amplifiers 621. Any suitable level shifters may be used as known in the art, such as latch type or inverter type and amplifiers are known in the art. Level shifting and amplification typically occurs in the column drivers of the display.

By way of example, the voltage range of each sample coming out of the collector 746 may be 0 to 1 V and the voltage range coming out of the level shifters 620 may be −8 up to +8 V (using the inversion signal 622 to inform the level shifters to flip the voltage every other frame, i.e., the range will be −8 to 0 V for one frame and then 0 V to +8 V for the next frame). In this way, the EM signals do not need to have their voltages flipped every frame; the SSVT receiver provides a positive voltage range (for example) and the level shifters flip the voltage every other frame as expected by the display panel. The SSVT receiver may also implement line inversion and dot inversion. The inversion signal tells the level shifters which voltages to switch. Some display panels such as OLED do not require this voltage flipping every other frame in which case the inversion signal is not needed and the level shifters do not flip voltages every other frame. Display panels such as LCD do require this voltage flipping. The inversion signal 622 is recovered from the EM signals.

Also input into the level shifters 620 can be gain and gamma values; gain determines how much amplification is applied and the gamma curve relates the luminous flux to the perceived brightness which linearizes human's optical perception of the luminous flux. Typically, in prior art source drivers and DDICs both gain and gamma are set values determined by the manufactured characteristics of a display panel. In the analog level shifters 620 gain and gamma may be implemented as follows. Gamma may be implemented in the digital part of the system and level shifting and gain are implemented by setting the output stage amplification. In the case of gamma, implementation is also possible in the output driver, by implementing a non-linear amplification characteristic. (Another gamma correction is also performed in the timing controller or system-on-chip, but that gamma correction is not described here.)

Once shifted, the samples 633 are input into amplifiers 621 which amplify each sample to the correct voltage range required by the particular display. Once amplified, the samples 634 are output and are used to drive the source electrodes in their corresponding column of the display panel as is known in the art.

In order to properly encode an SSVT signal for eventual display on a particular display various physical characteristics or properties of that display are needed by the SoC (or other display controller) or whichever entity performs the SSVT encoding. These physical characteristics 608 include, among others, resolution, tessellation, backlight layout, color profile, aspect ratio, and gamma curve. Resolution is a constant for a particular display; tessellation refers to the way of fracturing the plane of the display into regions in a regular, predetermined way and is in units of pixels; backlight layout refers to the resolution and diffusing characteristic of the backlight; color profile is the precise luminance response of all primary colors, providing accurate colors for the image; and the aspect ratio of a display will have discrete, known values.

These physical characteristics of a particular display may be delivered to, hardwired into, or provided to a particular display controller in a variety of manners. In one example, signals 608 deliver values for these physical characteristics directly from the display (or from another location within a mobile device) to the SSVT transmitter. Or, an SSVT transmitter embedded within a particular display comes with these values hardcoded within the transmitter. Or, a particular display controller is meant for use with only particular types of displays and its characteristic values are hardcoded into that display controller.

Input to the display can also be a backlight signal 604 that instructs the LEDs of the backlight, i.e., when to be switched on and at which level. In other words, it is typically a low-resolution representation of an image meaning that the backlight LEDs light up where the display needs to be bright and they are dimmed where the display needs to be dim. The backlight signal is a monochrome signal that can also be embedded within the EM signal, i.e., it can be another parallel and independent EM signal traveling along with the other parallel video signals (for example), and may be low or high resolution.

Also output from channel aligner 787 is a gate driver control signal 606 that shares timing and control information with gate drivers on the left edge of the display in order to synchronize the gate drivers with the column drivers. Typically, each SSVT receiver includes a timing acquisition circuit that obtains the same timing and control information for the gate drivers and one or more of the column driver flex foils (typically leftmost and/or rightmost column driver) will conduct that timing and control information to the gate drivers. The timing and control information for the gate drivers may be embedded within one of the EM signals and is recovered from that signal using established spread spectrum techniques.

Typically, a conventional source driver of a display is connected directly to glass using "COF" (Chip-on-Flex or Chip-on-Foil) integrated circuit packages. It is possible to replace these drivers by the novel integrated SSVT receiver described herein, thus turning an existing display into an SSVT-enabled display. The inputs of these ICs are usually connected together by a PCBA, providing the input signals from a video source and timing controller. These can be close to or far away from the display, transferring the video and control signals across an inexpensive wire.

SSVT Signal, Encoding and Decoding

As mentioned above, various embodiments of the present invention disclose that SSVT is used for sample transmission. An electromagnetic signal (EM signal) is a variable represented as electromagnetic energy whose amplitude changes over time. EM signals propagate through EM paths, such as a wire pair (or cable), free space (or wireless) and optical or waveguide (fiber), from a transmitter terminal to a receiver terminal. EM signals can be characterized as continuous or discrete independently in each of two dimensions, time and amplitude. "Pure analog" signals are continuous-time, continuous-amplitude EM signals; "digital" signals are discrete-time, discrete-amplitude EM signals; and "sampled analog" signals are discrete-time, continuous-amplitude EM signals. SSVT is an encoded discrete-time, continuous-amplitude EM signal that is an improvement over existing SSDS-CDMA signals. SSVT refers to the transmission of electromagnetic signals over an EM pathway or pathways using an improved spread-spectrum direct sequence (SSDS)-based modulation.

Code Division Multiple Access (CDMA) is a well-known channel access protocol that is commonly used for radio communication technologies, including cellular telephony. CDMA is an example of multiple access, wherein several different transmitters can send information simultaneously over a single communication channel. In telecommunications applications, CDMA allows multiple users to share a given frequency band without interference from other users. CDMA employs Spread Spectrum Direct Sequence (SSDS) encoding which relies on unique codes to encode each user's data. By using unique codes, the transmission of the multiple users can be combined and sent without interference between the users. On the receive side, the same unique codes are used for each user to demodulate the transmission, recovering the data of each user respectively.

An SSVT signal is different from CDMA. As a stream of input video (for example) samples is received at encoders, they are encoded by applying an SSDS-based modulation to each of multiple encoder input vectors to generate the SSVT signals. The SSVT signals are then transmitted over a transmission medium. On the receive side, the incoming SSVT signals are decoded by applying the corresponding SSDS-based demodulation in order to reconstruct the samples that were encoded. As a result, the original stream of time-ordered video samples containing color and pixel-related information is conveyed from a single video source to a single video sink, unlike CDMA which delivers data from multiple users to multiple receivers.

Figure 18:
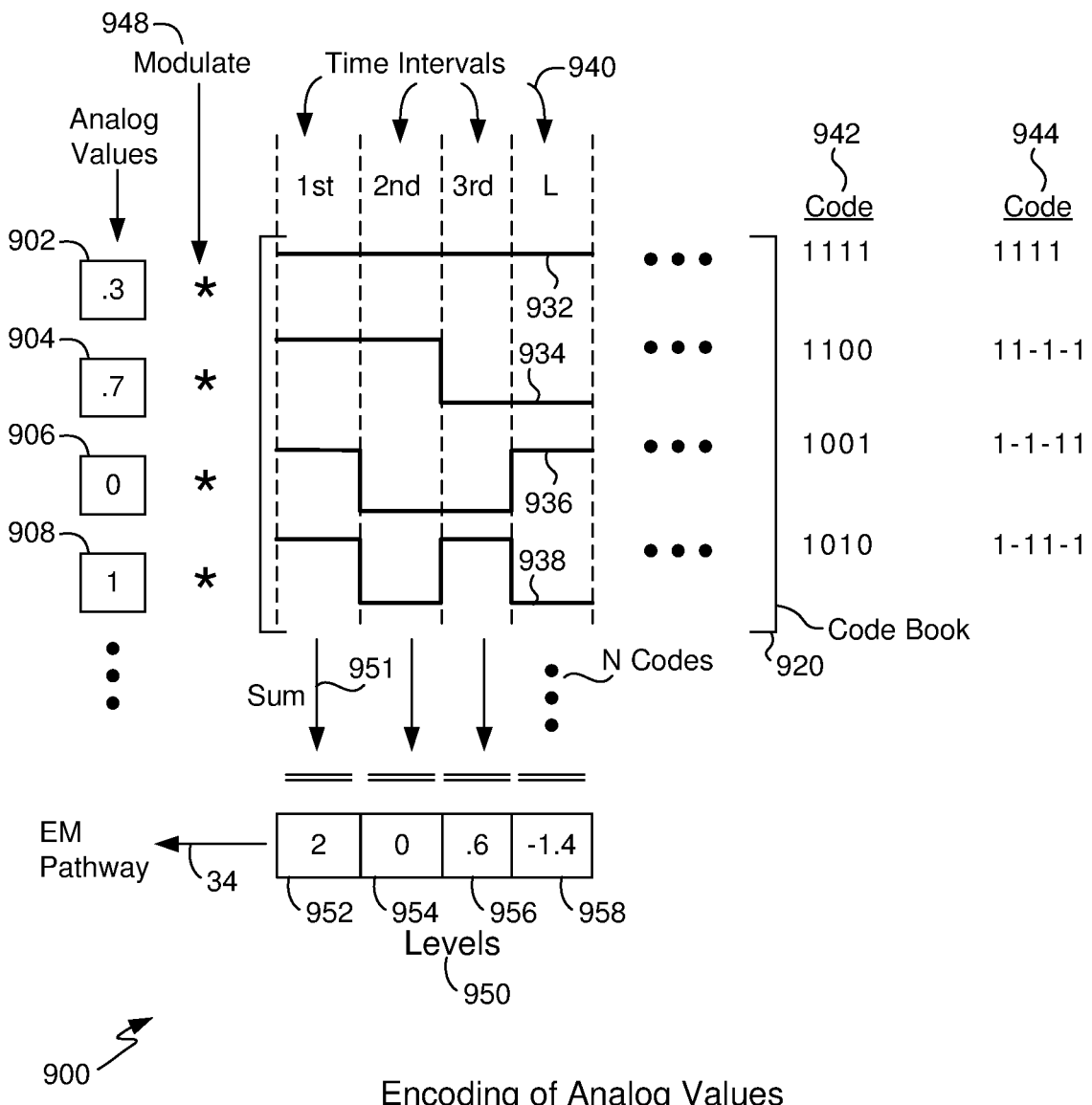
FIG. 18 illustrates an example showing how signal samples, in this case, analog values, are encoded within an encoder and then sent over an electromagnetic pathway.

FIG. 18 illustrates a simplistic example showing how signal samples, in this case, analog values, are encoded within an encoder and then sent over an electromagnetic pathway. Shown is an input vector of N analog values 902-908 which represent voltages of individual pixels within a video frame. These voltages may represent luminosity of a black-and-white image or luminosity of a particular color value in a pixel, e.g., an R, G or B color value of the pixel, i.e., each value represents a sensed or measured amount of light in the designated color space. Although pixel voltages are used in this example, this encoding technique may be used with voltages representing any of a variety of signals from a sensor such LIDAR values, sound values, haptic values, aerosol values, etc., and the analog values may represent other samples such as current, etc. Signal samples that are digital values may also be encoded and this digital encoding is explained below. Further, even though one encoder and one EM pathway is shown, an embodiment of the invention works well with multiple encoders, each transmitting over an EM pathway.

Preferably, the range of these voltages is from 0 to 1 V for efficiency, although a different range is possible. These voltages typically are taken from pixels in a row of a frame in a particular order, but another convention may be used to select and order these pixels. Whichever convention is used to select these pixels and to order them for encoding, that same convention will be used at the receiving end by the decoder in order to decode these voltages in the same order and then to place them in the resulting frame where they belong. By the same token, if the frame is in color and uses RGB, the convention in this encoder may be that all of the R pixel voltages are encoded first, and then the G and B voltages, or the convention may be that voltages 902-906 are the RGB values of a pixel in that row and that the next three voltages 908-912 represent the RGB values of the next pixel, etc. Again, the same convention used by this encoder to order and encode voltages will be used by the decoder at the receiving end. Any particular convention for ordering analog values 902-908 (whether by color value, by row, etc.) may be used as long as the decoder uses the same convention. As shown, any number of N analog values 902-908 may be presented for encoding at a time using code book 920, limited only by the number of entries in the code book.

As mentioned, code book 920 has any number of N codes 932-938; in this simple example, the code book has four codes meaning that four analog values 902-908 are encoded at a time. A greater number of codes such as 127 codes, 255 codes, etc., may be used, but due to practical considerations such as circuit complexity, fewer codes are preferably used. As known in the art, code book 920 includes N mutually-orthogonal codes each of length L; in this example L=4. Typically, each code is an SSDS code, but need not necessarily be a spreading code as discussed herein. As shown, each code is divided into L time intervals (also called "chips") and each time interval includes a binary value for that code. As shown at code representation 942, code 934 may be represented in the traditional binary form "1100", although that same code may also be represented as "1 1 −1 −1" as shown in code representation 944 for ease-of-use in modulating the value as will be explained below. Codes 932 and 936-938 may also be represented as in 942 or in 944. Note that each code of length L is not associated with a different computing device (such as a telephone), a different person or a different transmitter, as is done in CDMA.

Therefore, in order to send the four analog values 902-908 over a transmission medium 34 to a receiver (with a corresponding decoder) the following technique is used. Each analog value will be modulated by each chip in the representation 944 of its corresponding code; e.g., value 902, namely 0.3, is modulated 948 by each chip in the representation 944 of code 932 sequentially in time. Modulation 948 may be the multiplication operator. Thus, modulating 0.3 by code 932 results in the series "0.3, 0.3, 0.3, 0.3". Modulating 0.7 by code 934 becomes "0.7, 0.7, −0.7, −0.7"; value "0" becomes "0, 0, 0, 0"; and "value "1" becomes "1, −1, 1, −1". Typically, the first chip of each code modulates its corresponding analog value, and then the next chip of each code modulates its analog value, although an implementation may also modulate a particular analog value by all the chips of its code before moving on to the next analog value.

Each time interval, the modulated analog values are then summed at 951 (perceived vertically in this drawing) to obtain analog output levels 952-958; e.g., the summation of modulated values for these time intervals results in output levels of 2, 0, 0.6, −1.4. These analog output levels 952-958 may be further normalized or amplified to align with a transmission line's voltage restrictions, and may then be sent sequentially in time as they are produced over an electromagnetic pathway (such as a differential twisted-pair) of transmission medium 34 in that order. A receiver then receives those output levels 952-958 in that order and then decodes them using the same code book 920 using the reverse of the encoding scheme shown here. The resultant pixel voltages 902-908 may then be displayed in a frame of a display at the receiving end in accordance with the convention used. Thus, analog values 902-908 are effectively encoded synchronously and sent over a single electromagnetic pathway in a sequential series of L analog output levels 952-958. Numerous encoders and electromagnetic pathways may also be used as shown and described herein. Further, the number of N samples that can be encoded in this manner depends upon the number of orthogonal codes used in the code book.

Advantageously, even though the use of robust SSDS techniques (such as spreading codes) results in a significant drop in bandwidth, the use of mutually-orthogonal codes, the modulation of each sample by chips of its corresponding code, summation, and the transmission of N samples in parallel using L output levels results in a significant bandwidth gain. In contrast with traditional CDMA techniques in which binary digits are encoded serially and then summed, the present invention first modulates the entire sample (i.e., the entire analog or digital value, not a single bit) by each chip in a corresponding code, and then sums those modulations at each time interval of the codes to obtain a resultant analog voltage level for each particular time interval, thus exploiting the amplitude of the resultant waveform. It is these analog output levels that are sent over a transmission medium, not representations of binary digits. Further, the present invention facilitates sending analog voltages from one video source to another video sink, i.e., from endpoint to endpoint, unlike CDMA techniques which allow for multiple access by different people, different devices or different sources, and send to multiple sinks. Moreover, compression is not required for the transport of the sample values.

Figure 19:
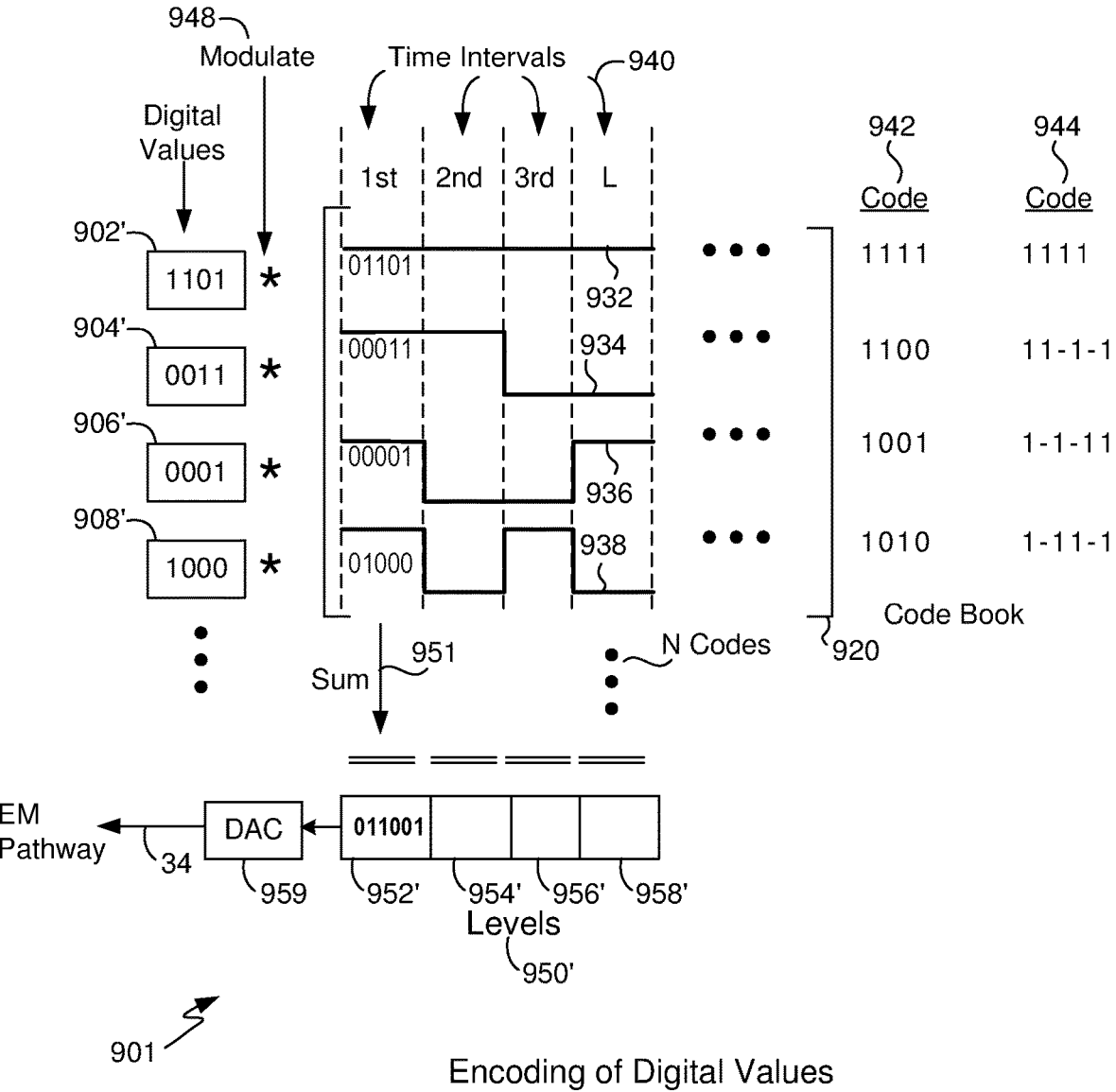
FIG. 19 illustrates a novel encoding technique as being applicable to signal samples that are digital values.

FIG. 19 illustrates this novel encoding technique as being applicable to signal samples that are digital values. Here, digital values 902'-908' are digital representations of voltages. Using a different example of voltages, value 902' is "1101" value 904' is "0011," value 906' is "0001," and value 908' is "1000." Each digital value is modulated (digitally multiplied) by the representation 944 of each code, that is by "1" or by "−1" depending upon the chip of the code corresponding to the digital value to be modulated. Considering only the first time interval 940 of each code, and adding a most significant bit (MSB) which is the sign bit, modulating "1101" yields "01101" (the MSB "0" meaning a positive value), modulating "0011" yields "00011", modulating "0001" yields "00001," and modulating "1000" yields "01000." These modulated values are shown annotated on the first time interval. (Although not shown, modulating by a −1 chip yields a negative value which may be expressed in binary using a suitable binary representation for negative values.)

Summing digitally, these modulated values in the first time interval yields digital value 952' "011001" (again, the MSB is the sign bit); the other digital values 954'-958' are not shown in this example, but are calculated in the same way. Considering this summation in base 10, one can verify that the modulated values 13, 3, 1 and 8 do sum to 25. Although not shown in this example, typically additional MSBs will be available for the resultant levels 952'-958' in that the sum may require more than five bits. For example, if values 902'-908' are represented using four bits, then levels 952'-958' may be represented using up to ten bits, in the case where there are 64 codes (adding log 2 of 64 bits). Or, if 32 modulated values are summed then five more bits will be added. The number of bits needed for the output levels will depend upon the number of codes.

The output levels 950' may be first normalized to adjust to the DAC's input requirements and then fed sequentially into a DAC 959 for conversion of each digital value into its corresponding analog value for transmission over the EM pathway. DAC 959 may be a MAX5857 RF DAC (includes a clock multiplying PLL/VCO and a 14-bit RF DAC core, and the complex path may be bypassed to access the RF DAC core directly), and may be followed by a bandpass filter and then a variable gain amplifier (VGA), not shown. In some situations the number of bits used in levels 950' are greater than the number allowed by DAC 959, e.g., level 952' is represented by ten bits but DAC 959 is an 8-bit DAC. In these situations, the appropriate number of LSBs are discarded and the remaining MSBs are processed by the DAC, with no loss in the visual quality of the resultant image at the display.

Advantageously, entire digital values are modulated, and then these entire modulated digital values are summed digitally to produce a digital output level for conversion and transmission. This technique is different from CDMA which modulates each binary digit of a digital value and then sums these modulated bits to produce outputs. For example, assuming that there are B bits in each digital value, with CDMA, there will be a total of B*L output levels to send, whereas with this novel digital (or analog) encoding technique there will only be a total of L output levels to send, thus having an advantage.

Figure 20:
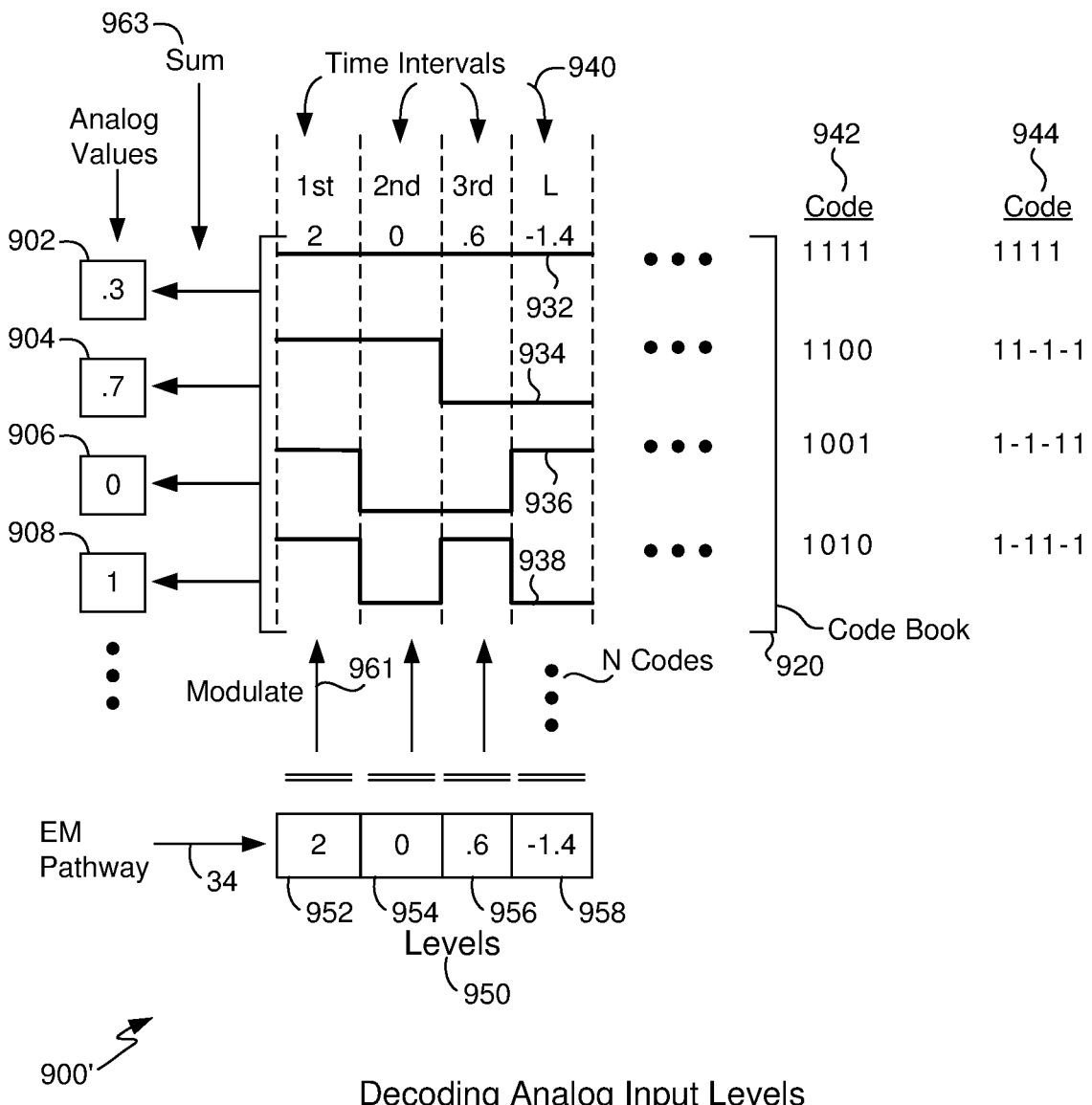
FIG. 20 illustrates decoding of analog input levels that were encoded using the analog encoder above.

FIG. 20 illustrates the decoding of analog input levels that were encoded using the analog encoder above. As shown, L input levels 950 have been received over a single electromagnetic pathway of a transmission medium 34. As described herein and noted earlier, code book 920 includes N orthogonal codes 932-938 that will be used to decode input levels 950 to produce an output vector of N analog values 902-908, i.e., the same analog values 902-908 that were encoded above. To perform decoding, as indicated by the vertical arrows, each input level 952-958 is modulated 961 by each chip of each code corresponding to a particular index in the output vector 902-908. Considering modulation of levels 952-958 by the first code 932, such modulation produces the series of modulated values "2, 0, 0.6, −1.4". Modulation of levels 952-958 by the second code 934 produces the series of modulated values "2, 0, −0.6, 1.4". Modulation by the third code 936 produces "2, 0, −0.6, −1.4", and modulation by the fourth code 938 produces "2, 0, 0.6, 1.4".

Next, as indicated by the horizontal arrows, each series of modulated values is summed in order to produce one of the analog values 902-908. For example, the first series is summed to produce the analog value "1.2" (which becomes "0.3" after being normalized using the scale factor of "4"). In a similar fashion, the other three series of modulated values are summed to produce the analog values "2.8", "0" and "4", and after being normalized yield the output vector of analog values 902-908. Each code may modulate the input levels and then that series may be summed, or, all may modulate the input levels before each series is summed. Thus, the output vector of N analog values 902-908 has been transported in parallel using L output levels.

Not shown in these examples is an example of decoding digital input levels, although one of skill in the art will find it straightforward to perform such decoding upon reading the encoding of digital values in the above description.

Figure 21A:
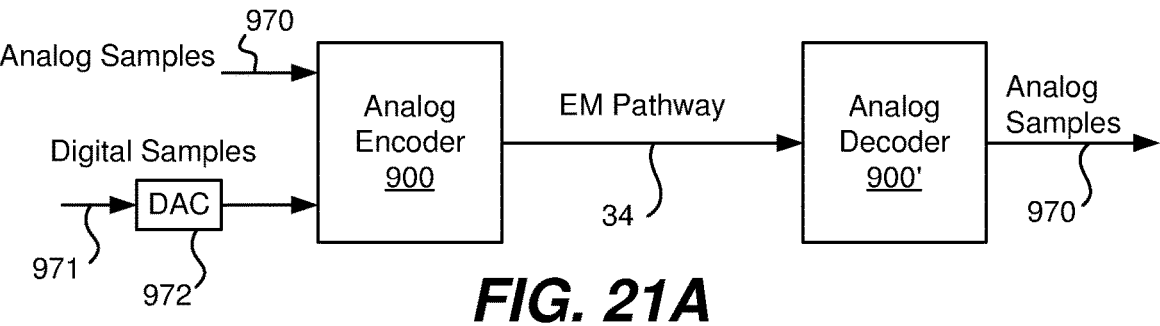
FIG. 21A illustrates use of an analog encoder and a corresponding analog decoder.
Figure 21B:
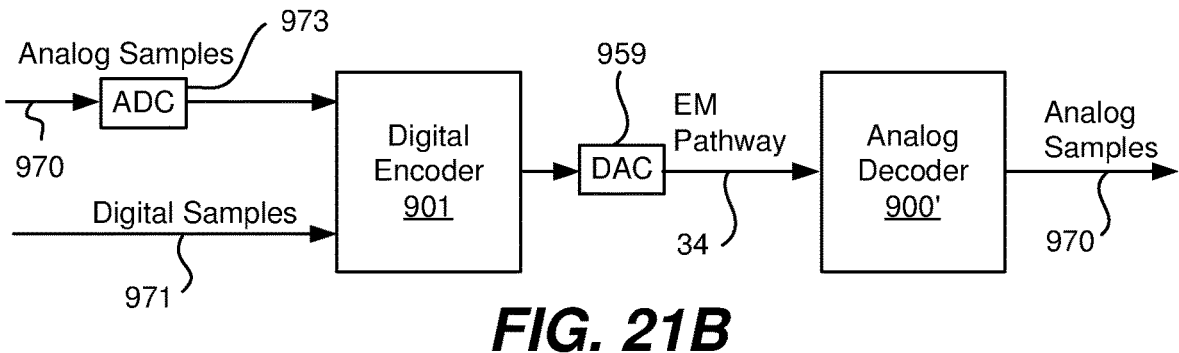
FIG. 21B illustrates use of a digital encoder and a corresponding analog decoder.
Figure 21C:
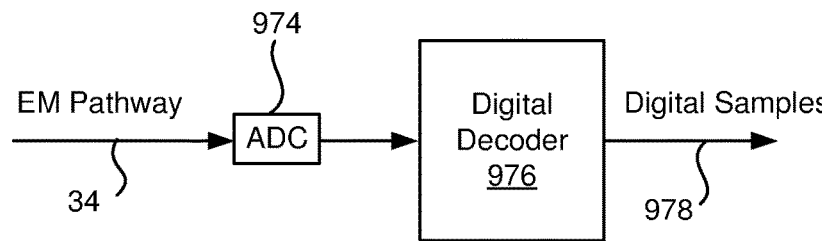
FIG. 21C illustrates use of a digital decoder to decode encoded analog signals that have arrived over an electromagnetic pathway.

FIGS. 21A, 21B and 21C illustrate that the encoders and decoders may operate upon either analog samples or digital samples; the various analog and digital encoders and decoders have previously been described above. As explained above, there may be more than one EM pathway and accordingly more than one encoder/decoder pair and a corresponding number of DACs or ADCs as the case may be.

FIG. 21A illustrates use of an analog encoder and a corresponding analog decoder. Input into analog encoder 900 are either analog samples 970 or digital samples 971 that have been converted into analog by a DAC 972 located at the analog encoder. In this fashion, either analog or digital samples that arrive at the analog encoder may be encoded for transmission over an electromagnetic pathway on transmission medium 34. Analog decoder 900' decodes the encoded analog samples to produce analog samples 970 for output. Analog samples 970 may be used as is or may be converted into digital samples using an ADC (not shown).

FIG. 21B illustrates use of a digital encoder and a corresponding analog decoder. Input into digital encoder 901 are either digital samples 971 or analog samples 970 that have been converted into digital by an ADC 973 located at the digital encoder. As the encoder is digital, a DAC 959 located at the encoder converts the encoded samples into analog before transmission over the electromagnetic pathway. In this fashion, either analog or digital samples that arrive at the digital encoder may be encoded for transmission over an electromagnetic pathway on transmission medium 34. Analog decoder 900' decodes the encoded analog samples to produce analog samples 970 for output. Analog samples 970 may be used as is or may be converted into digital samples using an ADC (not shown).

FIG. 21C illustrates use of a digital decoder to decode encoded analog signals that have arrived over an electromagnetic pathway on transmission medium 34. The encoded analog signals may be transmitted using either the analog encoder or the digital encoder described immediately above. An ADC 974 located at digital decoder 976 receives the encoded analog samples sent via the electromagnetic pathway and converts the samples into digital. These encoded digital samples are then decoded by digital decoder 976 into digital samples 978 (corresponding to the values of an input vector of samples that was originally encoded before transmission over the electromagnetic pathway). Digital samples 978 may be used as is or may be converted into analog samples using a DAC.

Figure 22:
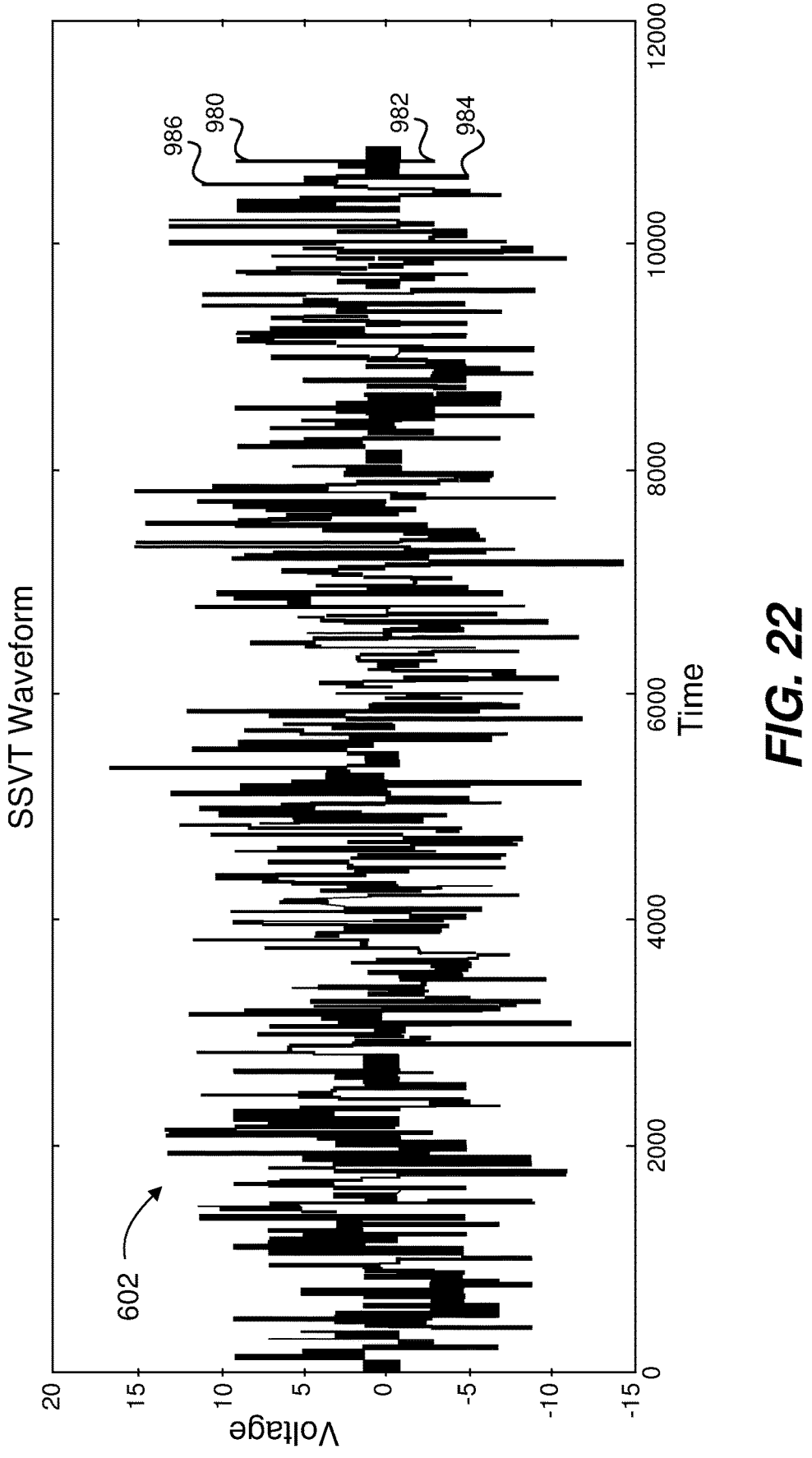
FIG. 22 shows a simulation of an SSVT waveform sent via an electromagnetic pathway.

FIG. 22 shows a simulation (similar to an idealized oscilloscope trace) of an SSVT waveform 602 sent via an electromagnetic pathway after being output from an analog encoder (or after being digitally encoded and then converted by a DAC). The vertical scale is voltage, and the horizontal scale is a 100 ps oscilloscope measurement time interval. Note that SSVT signal 602 is an analog waveform rather than a digital signal (i.e., the signal does not represent binary digits) and in this embodiment can transport a range of voltages from about −15 V up to about +15 V. The voltage values of the analog waveform are (or at least can be) fully analog. Also, voltages are not limited to some maximum value, although high values are impractical.

As previously explained, analog voltage levels are sent sequentially over an electromagnetic pathway, each level being the summation of modulated samples per time interval, such as the analog output levels 952-958 above or the digital output levels 952'-958' above (after being passed through a DAC). When sent, these output levels then appear as a waveform such as waveform 602. In particular, voltage level 980 represents the summation in a particular time interval of modulated samples (i.e., an output level). Using a simplistic example, sequential voltage levels 980-986 represent the transmission of four output levels. In this example, 32 codes are used, meaning that 32 samples may be transmitted in parallel; thus, voltage levels 980-986 (followed by a number of subsequent voltage levels, depending upon the number of chips in a code, L) form the transmission in parallel of 32 encoded samples (such as pixel voltages from a video source). Subsequent to that transmission, the next set of L voltage levels of waveform 602 represent the transmission of the next 32 samples. In general, waveform 602 represents the encoding of analog or digital values into analog output levels, and the transmission of those levels in discrete time intervals to form a composite analog waveform.

Due to such phenomena as attenuation, reflections due to impedance mismatches, and impinging aggressor signals, every electromagnetic pathway degrades electromagnetic signals that propagate through it, and thus measurements taken of input levels at a receiving terminal are always subject to error with respect to corresponding output levels made available at the transmitting terminal. Hence, scaling of input levels at a receiver (or normalization or amplification of output levels at a transmitter) may be performed to compensate, as is known in the art. Further, due to process gain (i.e., due to an increase in L which also increases electrical resilience) decoded input levels at a decoder are normalized by a scale factor using the code length to recover the transmitted output levels as is known in the art. Further, as herein described, although it is preferable that $L >= N >= 2$, in some situations it is possible that L will be less than N, i.e., $N > L >= 2$.

Additional Embodiments

The invention includes these additional embodiments.

L1. In a mobile device, a method of transporting video samples, said method comprising:
   receiving color digital video samples that originate at an image sensor of said mobile device after color interpolation;
   distributing out of each set of received color samples only the G video samples into at least one electromagnetic pathway of a transmitter; and
   transmitting said G video samples as analog levels over said electromagnetic pathways to a processor of said mobile device.

L2. A method as recited in claim L1 wherein said analog levels are said G video samples.

L3. A method as recited in claim L2 further comprising:
   distributing said G video samples into first and second line buffers; and
   alternating outputting said G video samples onto each of said at least one electromagnetic pathway from said first and second line buffers.

L4. A method as recited in claim L1 further comprising:
   encoding each vector of N G video samples input to each of said at least one electromagnetic pathway using a set of N mutually-orthogonal spreading codes to produce L of said analog levels, wherein $L >= N >= 2$, and wherein each of said codes being used to encode one of said G video samples.

M1. In a processor of a mobile device, a method of transporting video samples, said method comprising:
   receiving over at least one electromagnetic pathway, at a receiver of said processor, input analog levels representing G video samples originating at an image sensor of said mobile device;
   collecting said G analog video samples into a stream of analog video samples;
   performing analog processing upon said G analog video samples; and
   transmitting said processed G analog video samples as output analog levels from said processor to a display of said mobile device.

M2. A method as recited in claim I1 further comprising:
   transporting said processed G analog video samples over a MIPI interface to a DDIC-TCON before said transmitting.

M3. A method as recited in claim M1, said transmitting further comprising:
   distributing said processed G analog video samples into first and second line buffers; and
   alternating outputting said processed G analog video samples onto each of at least one electromagnetic pathway from said first and second line buffers.

M4. A method as recited in claim M1, said transmitting further comprising:
   encoding each vector of N processed G analog video samples input to each of at least one electromagnetic pathway using a set of N mutually-orthogonal spreading codes to produce L of said output analog levels, wherein $L >= N >= 2$, and wherein each of said codes being used to encode one of said processed G analog video samples.

N1. In a DDIC (Display Driver Integrated Circuit) of a mobile device, a method of displaying color signals, said method comprising:
   receiving over at least one electromagnetic pathway, at said DDIC, analog levels representing G analog video samples from a processor of said mobile device;
   collecting said G analog video samples corresponding to said analog levels at a collector of said DDIC; and
   driving said G analog video samples onto a display of said mobile device, wherein said DDIC does not include any digital-to-analog converters (DACs) used to convert digital video samples into said G analog video samples.

N2. A method as recited in claim N1 wherein said G analog video samples are said analog levels, said method further comprising:
   collecting said G analog video samples into first and second line buffers; and
   alternating outputting said G analog video samples onto said display from said first and second line buffers.

N3. A method as recited in claim N1 further comprising:
   before said collecting, decoding each set of L analog levels from each of said at least one electromagnetic pathway using a set of N mutually-orthogonal spreading codes to produce N of said G analog video samples, wherein $L >= N >= 2$, and wherein each of said codes being used to produce one of said G analog video samples.

O1. In a mobile device, a method of transporting video samples, said method comprising:
   transmitting only the G analog video samples out of sets of color video samples that originate at an image sensor of said mobile device as analog levels over at least one electromagnetic pathway to a processor of said mobile device.
   performing analog processing upon said G analog video samples; and
   transmitting said G analog video samples as analog levels from said processor to a DDIC of said mobile device, said processor not including any analog-to-digital converters (ADCs) used to convert said G analog video samples; and
   driving said G analog video samples corresponding to said analog levels onto a display of said mobile device, wherein said DDIC does not include any digital-to-analog converters (DACs) used to convert digital video samples into said G analog video samples.

O2. A method as recited in claim O1, further comprising:
transmitting said G analog video samples by distributing said G analog video samples into first and second line buffers and alternating outputting said G analog video samples onto each of said at least one electromagnetic pathway from said first and second line buffers.

O3. A method as recited in claim O1, further comprising:
transmitting said G analog video samples by encoding each vector of N G analog video samples input to each of at least one electromagnetic pathway using a set of N mutually-orthogonal spreading codes to produce L of said input analog levels, wherein $L >= N >= 2$, and wherein each of said codes being used to encode one of said G analog video samples.

P1. In a mobile device, a method of transporting video samples, said method comprising:
reading out samples from an image sensor of said mobile device in which two rows of samples are intermixed while being read out producing a stream of intermixed analog video samples;
receiving, at a transmitter, said intermixed stream of analog video samples;
distributing said analog video samples into at least one electromagnetic pathway; and
transmitting said analog video samples as analog levels over said electromagnetic pathways to a processor of said mobile device, wherein no analog-to-digital converters (ADCs) are used to convert said analog video samples.

P2. A method as recited in claim P1 wherein said analog levels are said analog video samples.

P3. A method as recited in claim P2 further comprising:
distributing said analog video samples into first and second line buffers; and
alternating outputting said analog video samples onto each of said at least one electromagnetic pathway from said first and second line buffers.

P4. A method as recited in claim P1 further comprising:
encoding each vector of N analog video samples input to each of said at least one electromagnetic pathway using a set of N mutually-orthogonal spreading codes to produce L of said analog levels, wherein $L >= N >= 2$, and wherein each of said codes being used to encode one of said analog video samples.

Q1. In a processor of a mobile device, a method of transporting video samples, said method comprising:
receiving over at least one electromagnetic pathway, at a receiver of said processor, input analog levels representing a stream of analog video samples originating at an image sensor of said mobile device, said stream including an intermixture of two rows of samples of said image sensor;
collecting said analog levels into said stream of analog video samples;
performing color interpolation upon said stream of analog video samples to produce analog color video samples; and
transmitting said analog color video samples as output analog levels from said processor to a display of said mobile device.

Q2. A method as recited in claim I1 further comprising:
transporting said analog color video samples over a MIPI interface to a DDIC-TCON before said transmitting.

Q3. A method as recited in claim Q1, said transmitting further comprising:
distributing said analog color samples into first and second line buffers; and alternating outputting said analog color samples onto each of at least one electromagnetic pathway from said first and second line buffers.

Q4. A method as recited in claim Q1, said transmitting further comprising:
encoding each vector of N analog color samples input to each of at least one electromagnetic pathway using a set of N mutually-orthogonal spreading codes to produce L of said output analog levels, wherein $L >= N >= 2$, and wherein each of said codes being used to encode one of said analog color samples.

R1. In a DDIC (Display Driver Integrated Circuit) of a mobile device, a method of displaying color signals, said method comprising:
receiving over at least one electromagnetic pathway, at said DDIC, analog levels representing analog color video samples from a processor of said mobile device;
collecting said analog color video samples corresponding to said analog levels at a collector of said DDIC; and
driving said analog color video samples onto a display of said mobile device, wherein said DDIC does not include any digital-to-analog converters (DACs) used to convert digital video samples into said analog color video samples.

R2. A method as recited in claim R1 wherein said analog color video samples are said analog levels, said method further comprising:
collecting said analog color video samples into first and second line buffers; and
alternating outputting said analog color video samples onto said display from said first and second line buffers.

R3. A method as recited in claim R1 further comprising:
before said collecting, decoding each set of L analog levels from each of said at least one electromagnetic pathway using a set of N mutually-orthogonal spreading codes to produce N of said analog color video samples, wherein $L >= N >= 2$, and wherein each of said codes being used to produce one of said analog color video samples.

S1. In a mobile device, a method of transporting video samples, said method comprising:
reading out samples from an image sensor of said mobile device in which two rows of samples are intermixed while being read out producing a stream of intermixed analog video samples;
transmitting said stream of intermixed analog video samples as input analog levels over at least one electromagnetic pathway to a processor of said mobile device, wherein no analog-to-digital converters (ADCs) are used to convert said analog video samples;
performing color interpolation upon said stream of analog video samples to produce analog color video samples;
transmitting said analog color video samples as output analog levels from said processor to a DDIC of said mobile device; and
driving said analog color samples corresponding to said analog levels onto a display of said mobile device, wherein said DDIC does not include any digital-to-analog converters (DACs) used to convert digital video samples into said analog color video samples.

S2. A method as recited in claim S1, further comprising:
transmitting said intermixed analog video samples by distributing said intermixed analog video samples into first and second line buffers and alternating outputting said intermixed analog video samples onto each of said at least one electromagnetic pathway from said first and second line buffers.

S3. A method as recited in claim S1, further comprising:

transmitting said intermixed analog video samples by encoding each vector of N intermixed analog video samples input to each of at least one electromagnetic pathway using a set of N mutually-orthogonal spreading codes to produce L of said input analog levels, wherein $L>=N>=2$, and wherein each of said codes being used to encode one of said intermixed analog video samples.

A1. A transmitter comprising:

a distributor arranged to receive a plurality of streams of digital video samples originating at a system-on-chip of a mobile device and to distribute said digital video samples into a plurality of input vectors according to a predetermined permutation; and a plurality of digital-to-analog converters (DACs), each DAC arranged to receive said digital video samples from one of said input vectors and to convert said digital video samples of said one input vector into a series of analog video samples and to output said series of analog video samples on an electromagnetic pathway to a display of said mobile device.

A2. A transmitter as recited in claim A1, wherein said distributor further includes a first line buffer that stores said plurality of input vectors; and a second line buffer that stores a plurality of second input vectors, wherein said distributor being further arranged to alternately distribute a line of said digital video samples between said input vectors of said first line buffer and said second input vectors of said second line buffer, and wherein said DACs alternately read from said first line buffer while said distributor writes into said second line buffer and read from said second line buffer while said distributor writes into said first line buffer.

A3. A transmitter as recited in claim A1 wherein said digital video samples distributed into said input vectors make up a line of an image.

A4. A transmitter as recited in claim A1 wherein said digital video samples are distributed into said input vectors at a first frequency and wherein said digital video samples are output from each of said input vectors at a second frequency different from said first frequency.

A5. A transmitter as recited in claim A1 wherein said predetermined permutation permits that each sampling amplifier of a source driver that receives one of said series of analog video samples may output said analog video samples to contiguous storage locations.

A7. A transmitter as recited in claim A1 wherein said transmitter is integrated with a timing controller of said SoC, said integrated transmitter and timing controller further comprising:

gate driver control signals that are output to gate drivers of said display panel.

A8. An integrated transmitter and timing controller as recited in claim A7 wherein said integrated transmitter and timing controller are located within said system-on-chip.

A10. A transmitter as recited in claim A5 wherein said predetermined permutation permits that one of said sampling amplifiers samples exclusively control signals.

A11. A transmitter as recited in claim A1 further comprising:

a plurality of image processors, each image processor arranged to read from one of said input vectors said digital video samples of said one input vector, to perform at least Gamma correction on said digital video samples of said one input vector, and to output said corrected digital video samples of said one input vector to one of said corresponding DACs.

B1. A source driver of a mobile device comprising:

an input terminal that receives an analog electromagnetic signal over an electromagnetic pathway that includes a continuous series of analog video samples;

a plurality of sampling amplifiers each arranged to sample exclusively a portion of said analog video samples and to write said portion of analog video samples into positions in a storage array designated for said each sampling amplifier; and a plurality of column drivers each arranged to read one of said analog video samples from one of said positions in said storage array, to amplify said one of said analog video samples and to drive said one of said amplified analog video samples into a column of a display of said mobile device.

B2. A source driver as recited in claim B1 further comprising a second storage array having positions designated for each sampling amplifier, wherein said sampling amplifiers being further arranged to alternately write said respective portions of said analog video samples into said storage array or into said second storage array, and wherein said column drivers alternately read from said storage array while said sampling amplifiers write into said second storage array and read from said second storage array while said sampling amplifiers write into said storage array.

B3. A source driver as recited in claim B2 further comprising:

control logic circuitry arranged to enable each of said sampling amplifiers to sample said portion of said analog video samples, to enable said sampling amplifiers to write into said storage array or into said second storage array, and to enable said column drivers to read from said storage array or from said second storage array.

B3. A source driver as recited in claim B1 wherein said electromagnetic signal includes control signals used for synchronization and are not driven into columns of said display panel, said source driver further comprising:

a sampling amplifier dedicated to sampling said control signals.

B4. A source driver as recited in claim B1 wherein said source driver does not include any digital-to-analog-converters (DACs) used to convert video samples.

B5. A source driver as recited in claim B2 wherein said column drivers are further arranged to read in parallel from said storage array when said storage array is full or to read in parallel from said second storage array when said second storage array is full.

B6. A source driver as recited in claim B1 wherein said series of analog video samples arrive in a predetermined permutation that permits that each sampling amplifier to output its respective portion of analog video samples to contiguous storage locations in said storage array.

B7. A source driver as recited in claim B6 wherein said predetermined permutation indicates that one of said sampling amplifiers samples exclusively control signals.

E1. A video transport apparatus of a mobile device comprising:

a transmitter including a distributor arranged to receive a stream of digital video samples and to distribute said digital video samples into a plurality of input vectors in a line buffer according to a predetermined permutation, and a digital-to-analog converter (DAC) per input vector, each DAC arranged to receive from its corresponding input vector the digital video samples from said correspond-
ing input vector and to convert said digital video
samples into a series of analog video samples;
a plurality of electromagnetic pathways, each arranged to
transport one of said series of analog video samples to a
display of said mobile device; and,
a source driver array including a source driver correspond-
ing to each of said DACs, each source driver including
a collector arranged to receive said series of analog video
samples from said each DAC and to store said analog
video samples of said corresponding input vector, and
a plurality of column drivers arranged to receive said
stored analog video samples in parallel from said
collector and to amplify each of said stored analog
video samples onto a column of said display.
E2. A video transport apparatus as recited in claim E1
wherein said predetermined permutation permits each col-
lector to store its respective analog video samples into
contiguous storage locations.
E3. A video transport apparatus as recited in claim E1
wherein said predetermined permutation permits that a sam-
pling amplifier of said collector samples exclusively control
signals.
C1. An apparatus that integrates a timing controller with
a transmitter, said apparatus comprising:
a distributor arranged to receive a plurality of streams of
digital video samples originating at a system-on-chip of
a mobile device and to distribute said digital video
samples into a plurality of input vectors according to a
predetermined permutation;
a plurality of digital-to-analog converters (DACs), each
DAC arranged to receive said digital video samples
from said input vector and to convert said digital video
samples into a series of analog video samples and to
output said series of analog video samples on an
electromagnetic pathway to a display of said mobile
device; and
gate driver control signals that are output to gate drivers
of said display.
C2. An apparatus as recited in claim C1 wherein said
distributor further includes
a first line buffer that stores said plurality of input vectors;
and
a second line buffer that stores a plurality of second input
vectors, wherein said distributor being further arranged
to alternately distribute a line of said digital video
samples between said input vectors of said first line
buffer and said second input vectors of said second line
buffer, and wherein said image processors alternately
read from said first line buffer while said distributor
writes into said second line buffer and read from said
second line buffer while said distributor writes into said
first line buffer.
C3. An apparatus as recited in claim C1 wherein said digital
video samples distributed into said input vectors make up a
line of an image.
C4. An apparatus as recited in claim C1 wherein said digital
video samples are distributed into said input vectors at a first
frequency and wherein said digital video samples are output
from each of said input vectors at a second frequency
different from said first frequency.
C8. An apparatus as recited in claim C1 wherein said
apparatus is located within said system-on-chip.
C10. An apparatus as recited in claim C9 wherein said
apparatus is integrated within said system on-chip of said
mobile device.

C11. An apparatus as recited in claim C1 further comprising:
a plurality of image processors, each image processor
arranged to read from one of said input vectors said
digital video samples of said one input vector and to
perform at least Gamma correction on said digital video
samples of said one input vector.
C12. An apparatus as recited in claim C1 further comprising:
a display RAM arranged to store video samples for said
display of said mobile device.
C13. An apparatus as recited in claim C12 wherein said
apparatus is integrated within said system on-chip of said
mobile device.
C14. An apparatus as recited in claim C13 further compris-
ing:
an image enhancement component.
D1. An analog DDIC-SD (Display Driver Integrated
Circuit-Source Driver) of a mobile device comprising:
an input terminal arranged to receive an analog electro-
magnetic signal over an electromagnetic pathway that
includes a continuous series of analog video samples;
a plurality of sampling amplifiers each arranged to sample
exclusively a portion of said analog video samples and
to write said portion of analog video samples into
positions in a storage array designated for said each
sampling amplifier; and
a plurality of column drivers each arranged to read one of
said analog video samples from one of said positions in
said storage array, to amplify said one of said analog
video samples and to drive said one of said amplified
analog video samples into a column of a display of said
mobile device.
D2. An analog DDIC-SD as recited in claim D1 further
comprising a second storage array having positions desig-
nated for each sampling amplifier, wherein said sampling
amplifiers being further arranged to alternately write said
respective portions of said analog video samples into said
storage array or into said second storage array, and wherein
said column drivers alternately read from said storage array
while said sampling amplifiers write into said second storage
array and read from said second storage array while said
sampling amplifiers write into said storage array.
D3. An analog DDIC-SD as recited in claim D2 further
comprising:
control logic circuitry arranged to enable each of said
sampling amplifiers to sample said portion of said
analog video samples, to enable said sampling ampli-
fiers to write into said storage array or into said second
storage array, and to enable said column drivers to read
from said storage array or from said second storage
array.
D3. An analog DDIC-SD as recited in claim D1 wherein a
portion of said analog video samples are used for synchro-
nization and are not driven into columns of said display.
D4. An analog DDIC-SD as recited in claim D1 wherein said
analog DDIC-SD does not include any digital-to-analog-
converters (DACs) used to convert video samples.
D5. An analog DDIC-SD as recited in claim D2 wherein said
column drivers are further arranged to read in parallel from
said storage array when said storage array is full or to read
in parallel from said second storage array when said second
storage array is full.
D6. An analog DDIC-SD as recited in claim D1 wherein said
series of analog video samples arrive in a predetermined
permutation that dictates that each sampling amplifier out-
puts its respective portion of analog video samples to
contiguous storage locations in said storage array.

D7. An analog DDIC-SD as recited in claim D1 wherein said electromagnetic signal includes control signals used for synchronization and are not driven into columns of said display panel, said source driver further comprising:

a sampling amplifier dedicated to sampling said control signals.

D8. An analog DDIC-SD as recited in claim D1 wherein said analog DDIC-SD does not include a timing controller.

D9. An analog DDIC-SD as recited in claim D8 wherein said analog DDIC-SD does not include an image enhancement component.

D8. An analog DDIC-SD as recited in claim D8 wherein said analog DDIC-SD does not include a display RAM.

F1. A video transport apparatus comprising:

a transmitter including a distributor arranged to receive a stream of digital video samples from a system-on-chip of a mobile device and to distribute said digital video samples into a plurality of input vectors in a line buffer according to a predetermined permutation, and a digital-to-analog converter (DAC) per input vector, each DAC arranged to receive serially from its corresponding input vector the digital video samples from said corresponding input vector and to convert said digital video samples into a series of analog video samples;

a plurality of electromagnetic pathways, each arranged to transport one of said series of analog video samples to a display of said mobile device; and, a source driver array including a source driver corresponding to each of said DACs, each source driver including:

a collector arranged to receive said series of analog video samples from said each DAC and to store said analog video samples of said corresponding input vector; and a plurality of column drivers arranged to receive said stored analog video samples in parallel from said collector and to amplify each of said stored analog video samples onto a column of said display.

F2. An apparatus as recited in claim F1 wherein said transmitter is integrated with a timing controller, said apparatus further comprising:

gate driver control signals that are output to gate drivers of said display.

F3. An apparatus as recited in claim F2 wherein said transmitter is located within said system-on-chip of said mobile device.

F4. An apparatus as recited in claim F2 wherein said transmitter is integrated within a single integrated circuit of said mobile device.

F6. An apparatus as recited in claim F1 wherein each source driver is within an analog DDIC-SD (Display Driver Integrated Circuit-Source Driver) of a mobile device.

F7. An apparatus as recited in claim F6 wherein said analog DDIC-SD does not include any digital-to-analog-converters (DACs) used to convert video samples.

G1. A video transport apparatus of a mobile device comprising:

a transmitter that receives a stream of analog video samples from an image sensor of said mobile device and transmits said stream to a system-on-chip (SoC) of said mobile device;

an electromagnetic pathway that receives said stream from said transmitter and transports said stream to said SoC of said mobile device; and a receiver of said SoC that receives said stream and delivers said stream for processing in said SoC.

G2. An apparatus as recited in claim G1 wherein said transmitter is integrated with a camera module of said mobile device.

G3. An apparatus as recited in claim G1 wherein said camera module does not include ADCs for converting video samples.

G4. An apparatus as recited in claim G1 wherein said stream is not transported using MIPI.

G5. An apparatus as recited in claim G1 wherein said camera module does not include a MIPI interface.

G6. An apparatus as recited in claim G1 wherein said SoC does not include a MIPI interface.

G7. An apparatus as recited in claim G1 further comprising:

an ADC located after said receiver that converts said stream into a stream of digital video samples for processing within said SoC, said ADC being within said SoC.

We claim:

1. In a mobile device, a method of transporting video samples, said method comprising:

receiving, at a transmitter, analog video samples read out from an image sensor of said mobile device, wherein said transmitter is located at a video source that includes said image sensor;

distributing said analog video samples onto at least one electromagnetic pathway; and transmitting said analog video samples as analog levels over said electromagnetic pathways to a system-on-chip (SoC) of said mobile device, wherein no analog-to-digital converters (ADCs) are used to convert said analog video samples.

2. The method as recited in claim 1 wherein said analog levels are said analog video samples.

3. The method as recited in claim 2 further comprising:

distributing said analog video samples into first and second line buffers; and alternating outputting said analog video samples onto each of said at least one electromagnetic pathway from said first and second line buffers.

4. The method as recited in claim 1 further comprising:

encoding each vector of N analog video samples input to each of said at least one electromagnetic pathway using a set of N mutually-orthogonal spreading codes to produce L of said analog levels, wherein $L >= N >= 2$, and wherein each of said codes being used to encode one of said analog video samples.

5. The method as recited in claim 1 wherein said transmitter is located within said video source.

6. The method as recited in claim 5 wherein said transmitter is located within the same die as said image sensor.

7. The method as recited in claim 1 wherein said transmitter is located in close proximity to said video source.

8. The method as recited in claim 1 wherein said video source is a camera module and said transmitter is located within said camera module.

9. The method as recited in claim 1 wherein said analog levels are transmitted over said electromagnetic pathways to a processor of said system-on-chip (SoC) of said mobile device.

10. In a processor of a mobile device, a method of transporting video samples, said method comprising:

receiving over at least one electromagnetic pathway, at a receiver of said processor, received analog levels representing analog video samples originating at an image sensor of said mobile device;

collecting said analog video samples into a stream of analog video samples; and converting said analog video samples into digital video samples using at least one analog-to-digital converter (ADC);

performing color interpolation upon said digital video samples to produce color samples; and transmitting said color samples as output analog levels from said processor over at least one electromagnetic pathway to a DDIC of a display of said mobile device.

11. The method as recited in claim 10 further comprising:

transporting said color signals over a MIPI interface to a DDIC-TCON before said transmitting; and transmitting said color samples as output analog levels from said DDIC-TCON of said processor to a DDIC-SD of said display of said mobile device.

12. The method as recited in claim 10, said transmitting further comprising:

distributing said color samples into first and second line buffers; and alternating outputting said color samples onto each of at least one electromagnetic pathway from said first and second line buffers.

13. The method as recited in claim 10, said transmitting further comprising:

encoding each vector of N color samples produced using a set of N mutually-orthogonal spreading codes to produce L of said output analog levels, wherein L>=N>=2, and wherein each of said codes being used to encode one of said color samples; and transmitting, from said transmitter, said L output analog levels of said each vector over one of said at least one electromagnetic pathway corresponding to said each vector to said DDIC of said mobile device.

14. The method as recited in claim 10 wherein said processor is a system-on-chip (SoC) of said mobile device.

15. In a DDIC (Display Driver Integrated Circuit) of a mobile device, a method of displaying color signals, said method comprising:

receiving over at least one electromagnetic pathway, at said DDIC, a set of analog levels representing digital video samples from a system-on-chip (SoC) of said mobile device;

collecting analog video samples corresponding to said set of analog levels at a collector of said DDIC; and driving said analog video samples onto a display of said mobile device, wherein said DDIC does not include any digital-to-analog converters (DACs) used to convert said digital video samples into said analog video samples.

16. The method as recited in claim 15 wherein said analog video samples are said set of analog levels, said method further comprising:

collecting said analog video samples into first and second line buffers; and alternating outputting said analog video samples onto said display from said first and second line buffers.

17. The method as recited in claim 15 further comprising:

before said collecting, decoding each set of L analog levels from each of said at least one electromagnetic pathway using a set of N mutually-orthogonal spreading codes to produce N of said analog video samples, wherein L>=N>=2, and wherein each of said codes being used to produce one of said analog video samples.

18. The method as recited in claim 15 wherein said analog levels are received from a processor of said system-on-chip (SoC) of said mobile device.

19. In a mobile device, a method of transporting video samples, said method comprising:

transmitting analog video samples read out from an image sensor of said mobile device as input analog levels over at least one electromagnetic pathway to a processor of said mobile device, wherein no analog-to-digital converters (ADCs) are used to convert said analog video samples before said transmitting;

converting, at said processor, said analog video samples into digital video samples using at least one analog-to-digital converter (ADC);

performing color interpolation upon said digital video samples to produce digital color samples;

transmitting said digital color samples as output analog levels from said processor to a DDIC of said mobile device; and driving analog samples corresponding to said output analog levels onto a display of said mobile device, wherein said DDIC does not include any digital-to-analog converters (DACs) used to convert said digital color samples into said analog video samples.

20. The method as recited in claim 19, further comprising:

transmitting said analog video samples by distributing said analog video samples into first and second line buffers and alternating outputting said analog video samples onto each of said at least one electromagnetic pathway from said first and second line buffers.

21. The method as recited in claim 19, further comprising:

transmitting said analog video samples by encoding each vector of N analog video samples input to each of at least one electromagnetic pathway using a set of N mutually-orthogonal spreading codes to produce L of said input analog levels, wherein L>=N>=2, and wherein each of said codes being used to encode one of said analog video samples.

22. The method as recited in claim 19 wherein said processor is a system-on-chip (SoC) of said mobile device.

23. In a mobile device, a method of transporting video samples, said method comprising:

receiving, at a transmitter, analog video samples read out from an image sensor of said mobile device;

distributing said analog video samples into first and second line buffers of said transmitter;

alternating outputting said analog video samples onto at least one electromagnetic pathway from said first and second line buffers; and transmitting said analog video samples from said transmitter over said at least one electromagnetic pathway to a processor of said mobile device, wherein no analog-to-digital converters (ADCs) are used to convert said analog video samples.

24. The method as recited in claim 23 wherein said transmitter is located at a video source that includes said image sensor.

25. The method as recited in claim 24 wherein said transmitter is located within said video source.

26. The method as recited in claim 23 wherein said transmitter is located within the same die as said image sensor.

27. The method as recited in claim 23 wherein said transmitter is located in close proximity to said video source.

28. The method as recited in claim 23 wherein said video source is a camera module and said transmitter is located within said camera module.

29. In a mobile device, a method of transporting video samples, said method comprising:

receiving, at a transmitter, analog video samples read out from an image sensor of said mobile device;

distributing said analog video samples into at least one vector of N analog video samples each; and encoding each vector of N analog video samples using a set of N mutually-orthogonal spreading codes to produce L analog levels, wherein $L>=N>=2$, and wherein each of said codes being used to encode one of said N analog video samples of said each vector; and transmitting, from said transmitter, said L analog levels of said each vector over an electromagnetic pathway corresponding to said each vector to a processor of said mobile device, wherein no analog-to-digital converters (ADCs) are used to convert said analog video samples.

30. The method as recited in claim 29 wherein said transmitter is located at a video source that includes said image sensor.

31. The method as recited in claim 30 wherein said transmitter is located within said video source.

32. The method as recited in claim 31 wherein said transmitter is located within the same die as said image sensor.

33. The method as recited in claim 29 wherein said transmitter is located in close proximity to said video source.

34. The method as recited in claim 29 wherein said video source is a camera module and said transmitter is located within said camera module.

35. In a DDIC (Display Driver Integrated Circuit) of a mobile device, a method of displaying color signals, said method comprising:

receiving over at least one electromagnetic pathway, at said DDIC, analog levels representing digital video samples from a processor of said mobile device;

collecting said analog levels into first and second line buffers at a collector of said DDIC;

alternating outputting said analog video samples onto a display of said mobile device from said first and second line buffers; and driving said analog levels onto said display of said mobile device, wherein said DDIC does not include any digital-to-analog converters (DACs) used to convert said digital video samples into said analog levels.

36. In a DDIC (Display Driver Integrated Circuit) of a mobile device, a method of displaying color signals, said method comprising:

receiving over at least one electromagnetic pathway, at said DDIC, a set of analog levels representing digital video samples for each at least one electromagnetic pathway from a processor of said mobile device;

decoding each set of L analog levels from said each at least one electromagnetic pathway using a set of N mutually-orthogonal spreading codes to produce N analog video samples, wherein $L>=N>=2$, and wherein each of said codes being used to produce one of said analog video samples;

after said decoding, collecting said N analog video samples corresponding to said each at least one electromagnetic pathway at a collector of said DDIC; and driving said N analog video samples corresponding to said each at least one electromagnetic pathway onto a display of said mobile device, wherein said DDIC does not include any digital-to-analog converters (DACs) used to convert said digital video samples into said each set of analog video samples.

* * * * *